United States Patent
Hughes et al.

(10) Patent No.: US 9,670,078 B2
(45) Date of Patent: Jun. 6, 2017

(54) TREATING LIQUIDS WITH ELECTROMAGNETIC FIELDS

(71) Applicant: Reverse Ionizer Systems, LLC, Bethesda, MD (US)

(72) Inventors: Patrick J. Hughes, Vienna, VA (US); Desmond A. Fraser, Herndon, VA (US); Hossein Ghaffari Nik, Fairfax, VA (US); Richard B. McMurray, Fairfax, VA (US); Shelley Marie Grandy, Fairfax, VA (US); Akrem Hassen Adem Aberra, Fairfax, VA (US)

( * ) Notice: Subject to any disclaimer, the term of this patent is extended or adjusted under 35 U.S.C. 154(b) by 0 days.

(21) Appl. No.: 15/339,578

(22) Filed: Oct. 31, 2016

(65) Prior Publication Data

US 2017/0096352 A1    Apr. 6, 2017

Related U.S. Application Data

(63) Continuation of application No. 14/821,604, filed on Aug. 7, 2015, now Pat. No. 9,481,588, which is a continuation-in-part of application No. 14/820,550, filed on Aug. 6, 2015, now Pat. No. 9,481,587, which is a continuation-in-part of application No. 14/624,552, filed on Feb. 17, 2015, which is a continuation-in-part of application No. 14/170,546, filed on Jan. 31, 2014.

(60) Provisional application No. 61/759,345, filed on Jan. 31, 2013.

(51) Int. Cl.
C02F 1/48    (2006.01)
C02F 1/00    (2006.01)
C02F 101/10    (2006.01)

(52) U.S. Cl.
CPC ............ C02F 1/487 (2013.01); C02F 1/008 (2013.01); C02F 1/484 (2013.01); *C02F 2101/10* (2013.01); *C02F 2201/483* (2013.01)

(58) Field of Classification Search
CPC ...... C02F 1/487; C02F 1/48; C02F 2201/483; C02F 2201/486
See application file for complete search history.

(56) References Cited

U.S. PATENT DOCUMENTS

| | | | |
|---|---|---|---|
| 5,152,341 A | 10/1992 | Kasevich | |
| 5,326,446 A * | 7/1994 | Binger | C02F 1/487 204/663 |
| 5,422,481 A | 6/1995 | Louvet | |
| 5,568,121 A | 10/1996 | Lamensdorf | |
| 5,606,723 A * | 2/1997 | Morse | B01J 19/087 422/186 |

(Continued)

FOREIGN PATENT DOCUMENTS

WO    WO2007133634    11/2007

OTHER PUBLICATIONS http://www.dolphinwatercare.com/how-the-dolphin-system-works, Dolphin Watercare web site, "How it works: The Technology of Sustainable Water Treatment".

(Continued)

*Primary Examiner* — Bryan D. Ripa
(74) *Attorney, Agent, or Firm* — Capitol Patent & Trademark Law Firm, PLLC

(57) ABSTRACT

Dual-field electric and magnetic probes create and apply electromagnetic fields to liquids, such as water, to treat unwanted material in the liquid.

20 Claims, 40 Drawing Sheets

(56) References Cited

U.S. PATENT DOCUMENTS

| | | | |
|---|---|---|---|
| 5,738,766 | A | 4/1998 | Jefferson |
| 6,063,267 | A | 5/2000 | Crewson et al. |
| 6,375,829 | B1 | 4/2002 | Shevchenko et al. |
| 6,641,739 | B2 | 11/2003 | Dresty et al. |
| 7,244,360 | B2 | 7/2007 | Cho |
| 7,419,603 | B2 * | 9/2008 | Cho ............... C02F 1/4602 205/751 |
| 2001/0035342 | A1 | 11/2001 | Morse |
| 2005/0199484 | A1 | 9/2005 | Olstowski |
| 2006/0196817 | A1 | 9/2006 | Crewson et al. |
| 2007/0120563 | A1 | 5/2007 | Kawabata et al. |
| 2009/0206974 | A1 | 8/2009 | Meinke |
| 2010/0102003 | A1 * | 4/2010 | Holland ............ C02F 1/487 210/695 |
| 2011/0284231 | A1 | 11/2011 | Becker |
| 2013/0146464 | A1 * | 6/2013 | Shiga ............... C02F 1/485 204/557 |
| 2013/0277045 | A1 | 10/2013 | Parsche |
| 2014/0216936 | A1 | 8/2014 | Hughes |
| 2014/0374236 | A1 | 12/2014 | Moore et al. |
| 2015/0143918 | A1 | 5/2015 | Schaefer et al. |

OTHER PUBLICATIONS

Cho et al., "Mitigation of Calcium-Carbonate Fouling Using RF Electric Fields", Proc. of Intl. Conf. On Heat Exchange Fouling and Cleaning VIII, pp. 384-391, Jun. 2009, Austria.

* cited by examiner

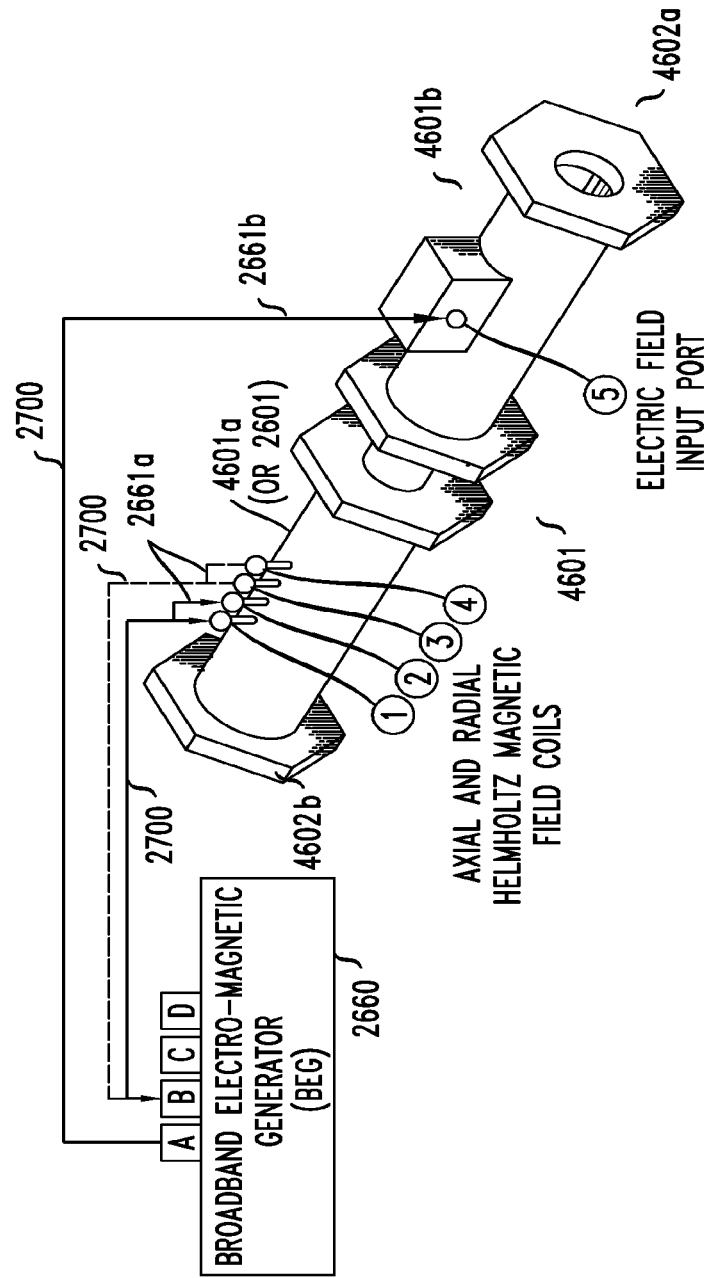

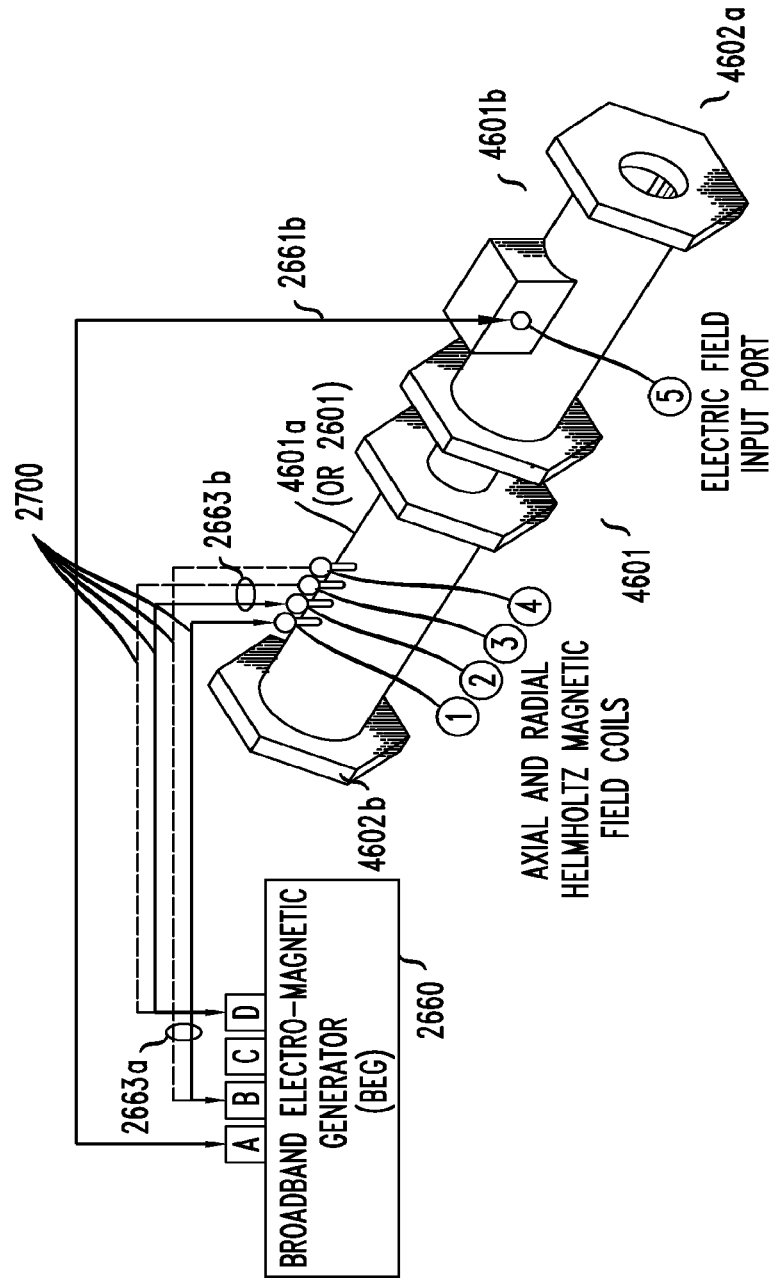

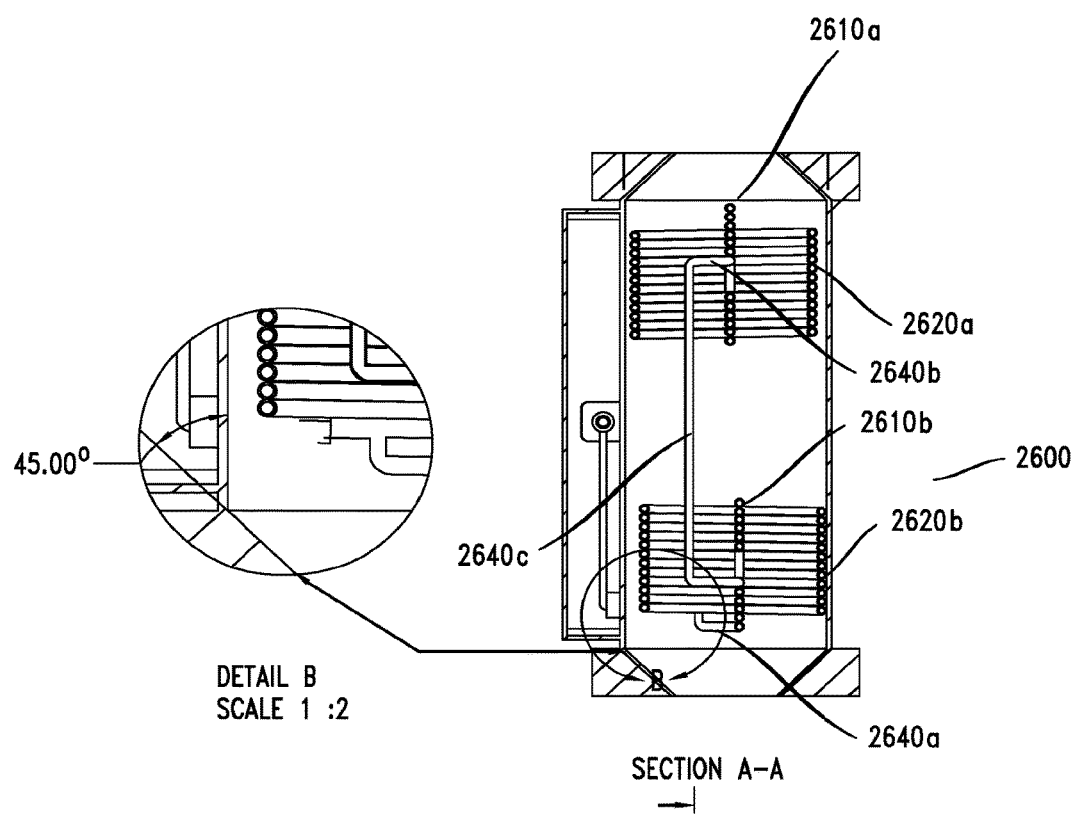

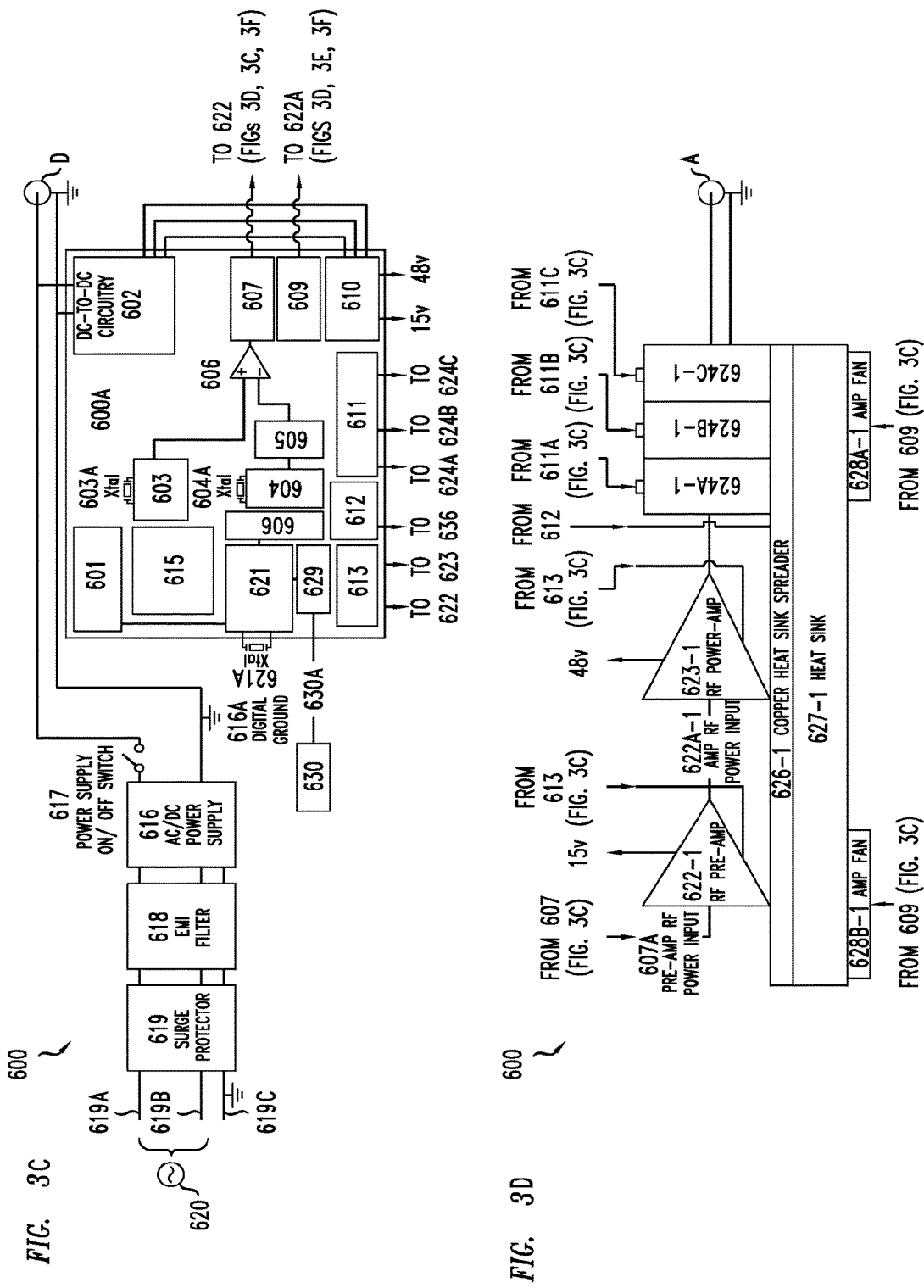

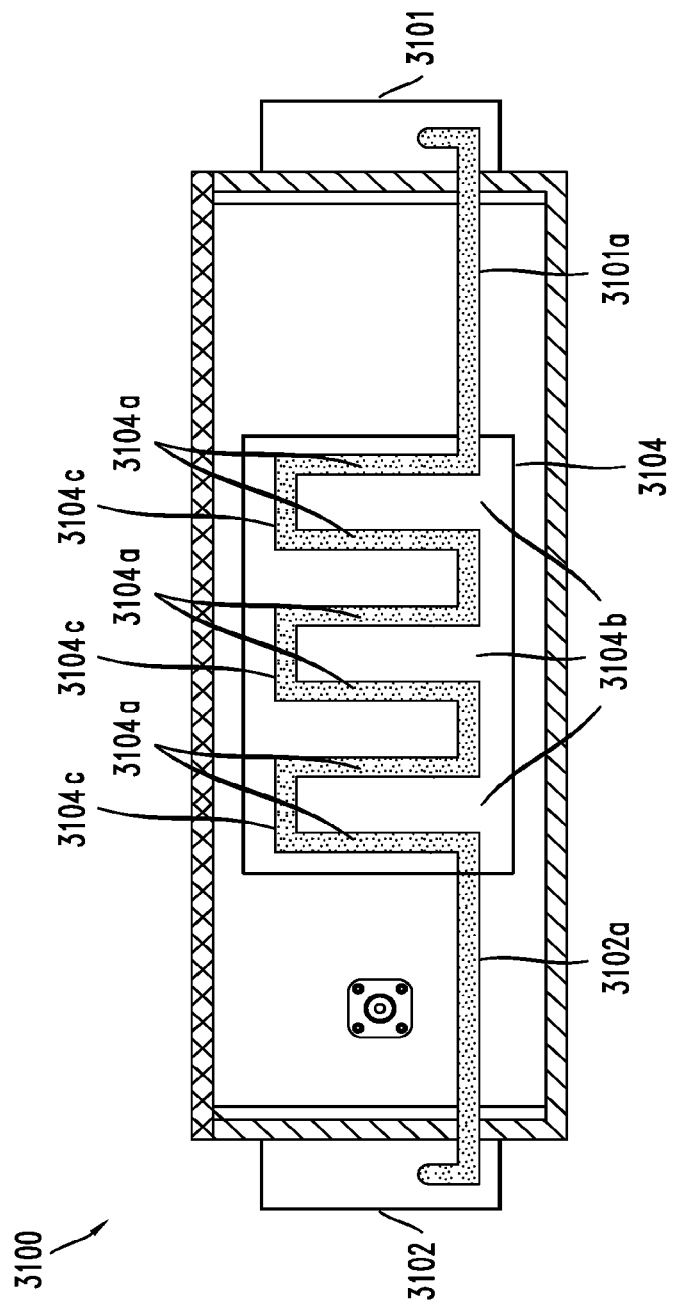

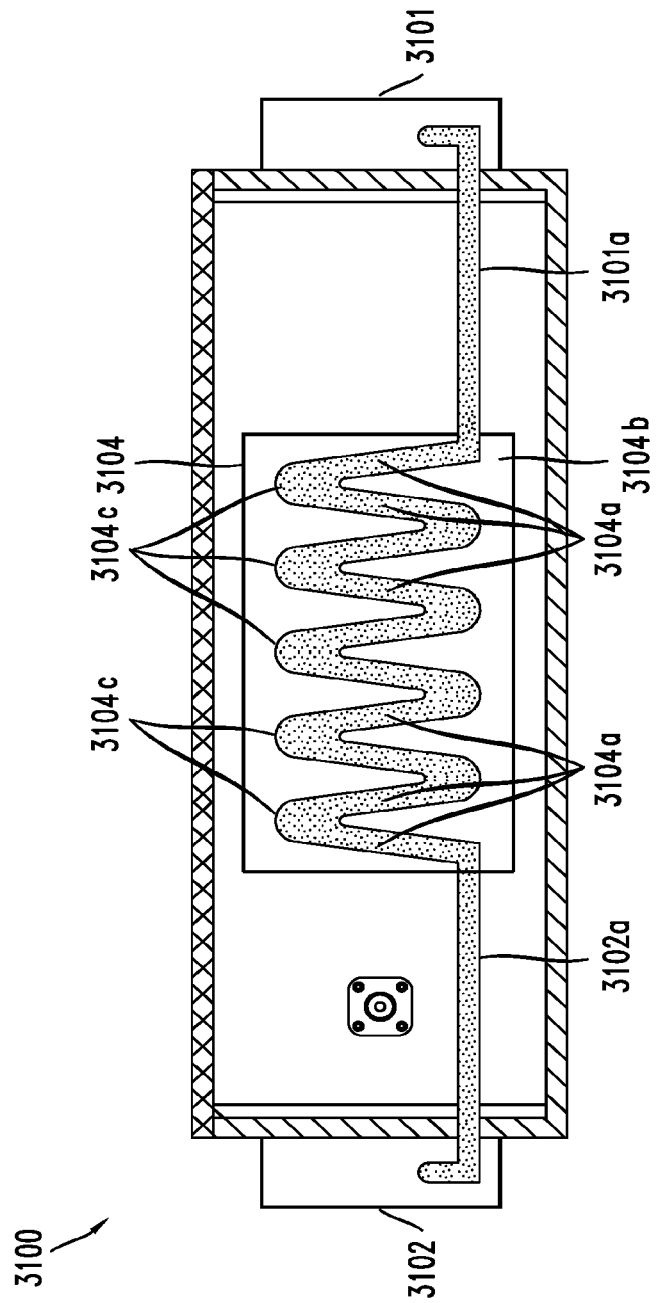

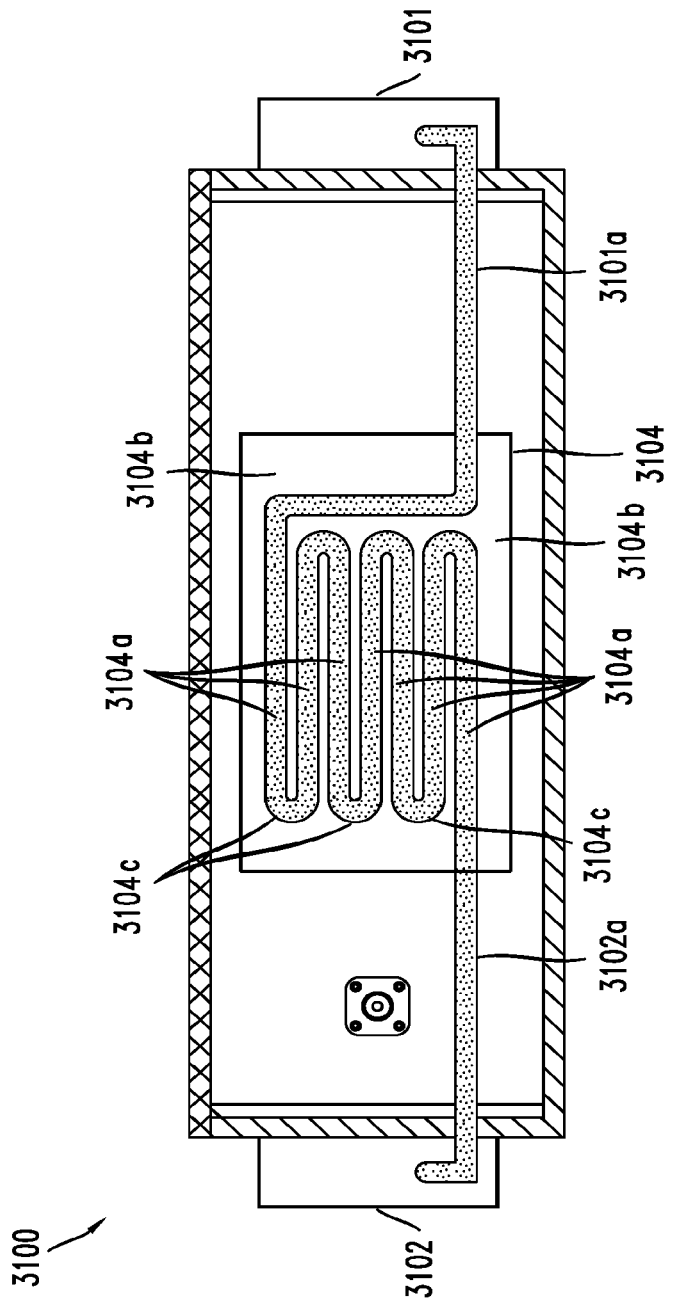

TREATING LIQUIDS WITH ELECTROMAGNETIC FIELDS

RELATED APPLICATIONS

This application is a continuation of, and claims the benefit of priority from, U.S. patent application Ser. No. 14/821,604 filed Aug. 7, 2015 ('604 Application) and, in addition, claims the benefit of priority from: U.S. patent application Ser. No. 14/820,550 filed Aug. 6, 2015 ("'550 Application"), U.S. patent application Ser. No. 14/624,552 filed Feb. 17, 2015 ("'552 Application"), U.S. patent application Ser. No. 14/170,546 filed Jan. 31, 2014 ("'546 Application") and U.S. Provisional Patent Application No. 61/759,345 filed Jan. 31, 2013 ("'345 Application"). The present application incorporates by reference herein the entire disclosures of the '604, '550, '552, '546 and '345 Applications, including their text and drawings, as if set forth in their entirety herein.

INTRODUCTION

Devices and methods that use electromagnetic fields and energy to purify or alter the characteristics of water are known. For example, U.S. Pat. No. 5,326,446, issued to Binger on Jul. 5, 1994, ("Binger") appears to disclose methods and devices for purifying water of mineral impurities and biological contaminants (e.g., bacteria, protozoa, algae and fungi). The devices and methods of Binger appear to employ a steady-state electromagnetic field capable of treating ionic (mineral) impurities, a low frequency electromagnetic field for handling biological contaminants and a radio frequency electromagnetic field for handling biological contaminants and breaking up scale formations.

It is desirable to provide devices, systems and methods for treating liquids that overcome the limitations and disadvantages of conventional devices, systems and methods. More specifically, it is desirable to provide devices, systems and methods for treating liquids that provide greater control over the application of electromagnetic energy to liquids, a greater range and variability of the voltage, current, frequency and waveform shape of electromagnetic energy applied to liquids, and high operational reliability and safety.

SUMMARY

Devices, systems and methods for treating liquids with electromagnetic fields are provided. The devices, systems and methods disclosed herein are particularly applicable to treating liquids, such as water, in a water transport system.

According to one embodiment, exemplary systems for treating a liquid that contains unwanted material may comprise: a dual-field probe comprising, an immersible magnetic field section operable to generate a time-varying magnetic field and an induced electric field, and an immersible electric field section operable to generate a time-varying electric field, and an induced magnetic field. The immersible magnetic field section may be operable to apply the generated magnetic field and induced electric field to unwanted material (e.g., ions of calcium carbonate) in a liquid at substantially the same time the immersible electric field section applies the generated electric field and induced magnetic field to the unwanted material in the liquid. Alternatively, immersible magnetic field section may be operable to apply the generated magnetic field and induced electric field to unwanted material in a liquid after the immersible electric field section applies the generated electric field and induced magnetic field to the unwanted material in the liquid.

In one embodiment, the immersible magnetic field section may comprise at least two immersible, radial coils configured as Helmholtz coils, and the immersible electric field section may comprise at least two immersible elements, wherein one of the elements is a positively charged element and the other element is a negatively charged element. Further, the at least two immersible elements may be cylindrically shaped.

Both the immersible magnetic field section and immersible electric field section may be operable to generate, and apply, time-varying fields at substantially the same time, respectively, where each generated field may be modulated at an ionic cyclotron frequency of an unwanted material in a liquid.

Systems provided by the present invention may also include impedance matching circuitry that is operable to maintain an impedance of a probe, a signal generator and a transmission medium connecting the probe and generator at a matched impedance, and maintain a constant amplitude of an electric field created by the electric field section of the probe and a constant amplitude of a magnetic field created by the magnetic field section of the probe.

Yet another system for treating unwanted material in a liquid may comprise a dual-field probe, the probe comprising (1) an immersible magnetic field section operable to generate a time-varying magnetic field modulated at an ionic cyclotron frequency of unwanted material (e.g., ions of calcium carbonate) in a liquid and an induced electric field, and apply the time varying magnetic field and induced electric field to unwanted material in a liquid, and an immersible electric field section operable to generate a time-varying electric field modulated at the ionic cyclotron frequency, and an induced magnetic field, and apply the time-varying electric field and induced magnetic field to the unwanted material at the same time as the magnetic field section is applying the generated magnetic field and the induced electric field, and (2) a signal generator operable to output a time-varying signal modulated at the ionic cyclotron frequency to the immersible magnetic field section and the immersible electric field section.

The signal generator in such a system may be operable to output an oscillating or uniform time-varying signal modulated at the ionic cyclotron frequency to the immersible magnetic field section, may be an integrated signal generator, and may be further operable to generate or adjust a carrier frequency, percentage of modulation, modulation frequency, modulation waveform, output gain or offset levels of the time-varying signal.

Each of the systems described herein may further comprise a heat sink operable to remove heat from an integrated generator and components associated with the integrated generator. The heat sink may comprise a hollow passageway formed within a body of the heat sink to allow liquid to flow through the heat sink. The passageway may be formed as a plurality of rectangular shaped cavities, a plurality of oval shaped cavities, a plurality of triangular shaped cavities, where, in addition, the cavities may be oriented such that liquid flows through the heat sink in a direction that is substantially perpendicular to openings in a probe or in a direction that is substantially parallel to the openings.

Each of the systems described herein may include a controller that is operable to determine a carrier frequency of the time-varying signal and a modulation signal corresponding to an ionic cyclotron frequency, and control a signal generator to output the time-varying signal at the determined carrier frequency that includes the determined modulation signal. The controller may also be operable to determine a percentage of modulation, a modulation frequency of the modulation signal, modulation waveform of the modulation signal, output gain or offset levels of the time-varying signal, and control a signal generator to output the time-varying signal and the modulation signal using the determined percentage of modulation, modulation frequency, modulation waveform, output gain and offset levels.

In addition to probes, generators, heat sinks and controllers, each of the systems described herein may still further comprise a graphical user interface (GUI) and impedance matching circuitry.

The GUI may be operable to display a combination of the following parameters: fouling resistance, conductivity, power consumption, turbidity, corrosion, pH, and temperatures of the liquid, pump speeds, fan speeds, flow rates, biofouling, saturation index, and hold/cold temperature differentials of components of a system used to treat a liquid. The GUI may be a part of an apparatus that communicates remotely with the signal generator.

The impedance matching circuitry may be operable to maintain an impedance of a probe, generator and a transmission medium connecting the probe and generator at a matched impedance, and maintain a constant amplitude of an applied electric field and a constant amplitude of an applied magnetic field.

Still another system for treating unwanted material (e.g., ions of calcium carbonate) in a liquid may comprise (1) a dual-field probe, the probe comprising an immersible magnetic field section operable to generate a time-varying magnetic field that includes a signal modulated at an ionic cyclotron frequency of an unwanted material in a liquid and an induced electric field, and apply the time varying magnetic field and induced electric field to the unwanted material, and an immersible electric field section operable to generate a time-varying electric field that includes the signal modulated at the ionic cyclotron frequency, and an induced magnetic field, and apply the time-varying electric field and induced magnetic field to the unwanted material before the magnetic field section applies the generated magnetic field and the induced electric field, and (2) a signal generator operable to output a time-varying signal modulated at the ionic cyclotron frequency to the immersible magnetic field section and the immersible electric field section.

The signal generator used in such a system may be operable to output an oscillating or uniform time-varying signal modulated at the ionic cyclotron frequency to the immersible magnetic field section, may comprise an integrated signal generator, and may be further operable to generate or adjust a carrier frequency, percentage of modulation, modulation frequency, modulation waveform, output gain or offset levels of the time-varying signal.

As before, this system may also comprise a controller, GUI and impedance matching circuitry. The controller may be operable to determine a carrier frequency of a time-varying signal and a modulation signal corresponding to an ionic cyclotron frequency, and control a signal generator to output the time-varying signal at the determined carrier frequency and including the determined modulation signal. As in other systems, the controller may be further operable to determine a percentage of modulation, a modulation frequency of the modulation signal, modulation waveform of the modulation signal, output gain or offset levels of the time-varying signal, and control a signal generator to output the time-varying signal and the modulation signal using the determined percentage of modulation, modulation frequency, modulation waveform, output gain and offset levels. The GUI that may be a part of this system may be operable to display a combination of parameters, such as fouling resistance, conductivity, power consumption, turbidity, corrosion, pH, and temperatures of a liquid, pump speeds, fan speeds, flow rates, biofouling, saturation index, and hold/cold temperature differentials of components of a system used to treat a liquid. The GUI may be part of an apparatus that communicates remotely with a signal generator.

The impedance matching circuitry that is part of such a system may be operable to maintain an impedance of a probe, generator and a transmission medium connecting the probe and generator at a matched impedance, and maintain a constant amplitude of the electric field and a constant amplitude of the magnetic field.

In addition to the systems described above and herein, the present invention also provides devices for treating unwanted material in a liquid. One such device may comprise at least two immersible axial coils and at least two immersible radial coils configured in a Helmholtz coil arrangement. The device may be operable to generate and apply a magnetic field that includes a modulation signal corresponding to an ionic cyclotron frequency of unwanted material in a liquid to treat the unwanted material in the liquid.

Additional devices, systems, related methods, features and advantages of the invention will become clear to those skilled in the art from the following detailed description and appended drawings.

BRIEF DESCRIPTION OF THE DRAWINGS

FIGS. 3C through 3F depict an electromagnetic waveform generator according to an embodiment.

FIGS. 3G through 3N depict an integrated device according to embodiments of the invention.

Figure 1:
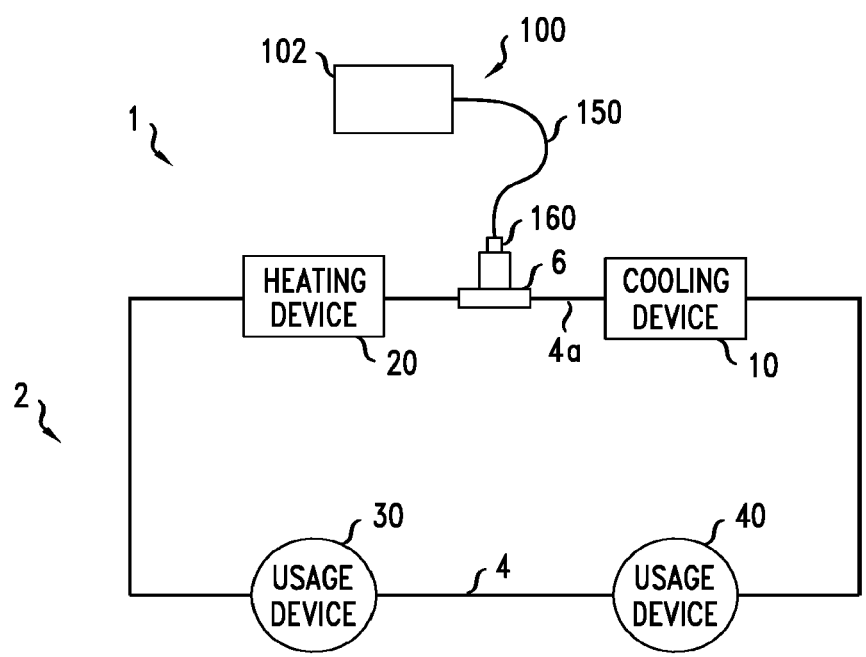
FIG. 1 is a schematic drawing showing an exemplary water transport system according to an embodiment.

To the extent that any of the figures or text included herein depicts or describes dimensional information (e.g., inches) it should be understood that such information is merely exemplary to aid the reader in understanding the embodiments described herein. It should be understood, therefore, that other dimensions may be used to construct the inventive devices, systems and components described herein and their equivalents without departing from the scope of the inventions.

DETAILED DESCRIPTION

Exemplary embodiments of devices, systems and related methods for treating liquids with electromagnetic fields are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" refers to an example of the present invention.

As used herein the phrase "unwanted material" includes all types of material, in dissolved or undissolved form which degrades or otherwise detracts from a desired quality of a liquid, such as water. A non-limiting list of unwanted material includes, but is not limited to: scale, microbes, corrosive minerals, and contaminants of all kinds.

As used herein the phrases "treat", "treating," "treatment" and other tenses of the word treat mean the reduction, removal, minimization, dissolution and elimination of unwanted material and the prevention of such unwanted material. Further the phrases "treating a liquid" and "treating unwanted material" and their other tenses may be used synonymously herein to describe the treatment of a liquid that contains unwanted material.

The phrase "liquid" means any known fluid that may be typically involved in, but not limited to, cooling and heating processes, energy exploration, or the transport of elements, for example. One non-limiting example of a fluid is water, where by "water" is meant, but is not limited to, non-potable water, potable water and water that contains a combination of natural and man-made chemicals and minerals.

As used herein the phrase "probe" means one of the inventive devices described herein that may be used to treat a liquid that contains unwanted material.

It should be understood that when the description herein describes the use of a "microcontroller", "controller", "computing device" or "computer" that such a device includes stored, specialized instructions for completing associated, described features and functions. Such instructions may be stored in onboard memory or in separate memory devices. Such instructions are designed to integrate specialized functions and features into the controllers, microcontrollers, computing devices, or computer that are used to complete inventive functions, methods and processes related to treating a liquid that contains unwanted material by controlling one or more inventive systems or devices/components used in such a treatment.

It should be understood that the phrase "integrated" means one or more components that are constructed substantially as one unitary device where, generally speaking, the components are connected using short conductors or connectors, are placed on one or more adjacent printed circuit boards or the like that are themselves connected or are formed as a one or more miniaturized integrated circuits.

FIG. 1 shows an exemplary water transport system 1, according to an embodiment. The system 1 may include a pipe systems 2,4, a cooling device (e.g., chiller) 10, a heating device (e.g., boiler or water heater) 20 and water usage devices 30, 40. While the system 1 is shown as a single loop, it should be understood that an actual water transport system may include more than one loop, and further, such loops may be a combination of an open loop and closed loop system. Nonetheless, to simplify the following explanation the system 1 shown in FIG. 1 will suffice. The pipe systems 2,4 supply water to, and interconnect, the cooling device 10, the heating device 20 and the usage devices 30, 40. Each of the usage devices 30, 40 can be any type of device or appliance that uses water from the pipe systems 2,4. It should be understood that the system 1 is merely one example of a water transport system. That is to say that although the system 1 is shown as having a single cooling device 10, a single heating device 20 and two usage devices 30, 40, the system 1 may include many different numbers, types and combinations of devices 10, 20, 30 and 40.

Still referencing FIG. 1, the system 1 includes an electromagnetic water treatment system 100 having a main unit or power unit 102 and a probe 160 comprising oppositely charged elements configured with respect to one another to reduce fringing effects (described in more detail below). The probe 160 may be connected to the main unit 102 by an electrically conductive cable 150. The probe 160 can be inserted in-line with a pipe 4a or other component of the pipe systems 2,4 by a fixture 6 so that elements of the probe are immersed in the water passing through the pipe 4a. It should be understood that it is possible to provide additional water treatment systems 100. For example, larger water transport systems, or systems with multiple locations that are likely to promote the growth of unwanted materials, such as scale, may benefit from having multiple water treatment systems 100 (e.g., data centers, industrial and commercial buildings and complexes, large residential buildings and complexes, petrochemical complexes, and hospitals/medical centers).

Generally stated, and as described later in more detail, the water treatment system 100 can apply one or more electromagnetic output fields to the water in the water transport system 1 via the probe 160. With the proper application of electromagnetic field(s), the water treatment system 100 can effectively treat water that includes unwanted materials in the water transport system 1. As will be described later in more detail, the system 100 can generate a wide variety of electromagnetic fields depending upon the particular application and existing water conditions. Adjustments can be made to the system 100 to utilize a steady-state electromagnetic field, a high, low or medium frequency electromagnetic output field, a combination of multiple high frequency, low frequency, and/or medium frequency electromagnetic fields. For example, carrier frequencies in the following frequency bands may be used by any of the inventive systems, devices and methods described herein: 1 to 2 MHz, 5 to 6 MHz, 13 to 14 MHz, 27 to 28 MHz, 40 to 41 MHz, 433 to 435 MHz and 902 to 928 MHz to name just a few exemplary ranges. Further, in one embodiment, 40.68 MHz may be used as a default carrier frequency. Electromagnetic fields that have various wave shapes (e.g., sine, triangular, square, saw tooth or pulse) may also be used by any of the inventive systems, devices and methods described herein. Additionally, the electromagnetic fields generated by the system 100 (and any inventive system, device and method described herein) can be adaptively varied in frequency, voltage, current and/or waveform shape (e.g., amplitude modulation (AM), frequency modulation (FM)) based on conditions of the water in the water transport system 1.

Figure 2A:
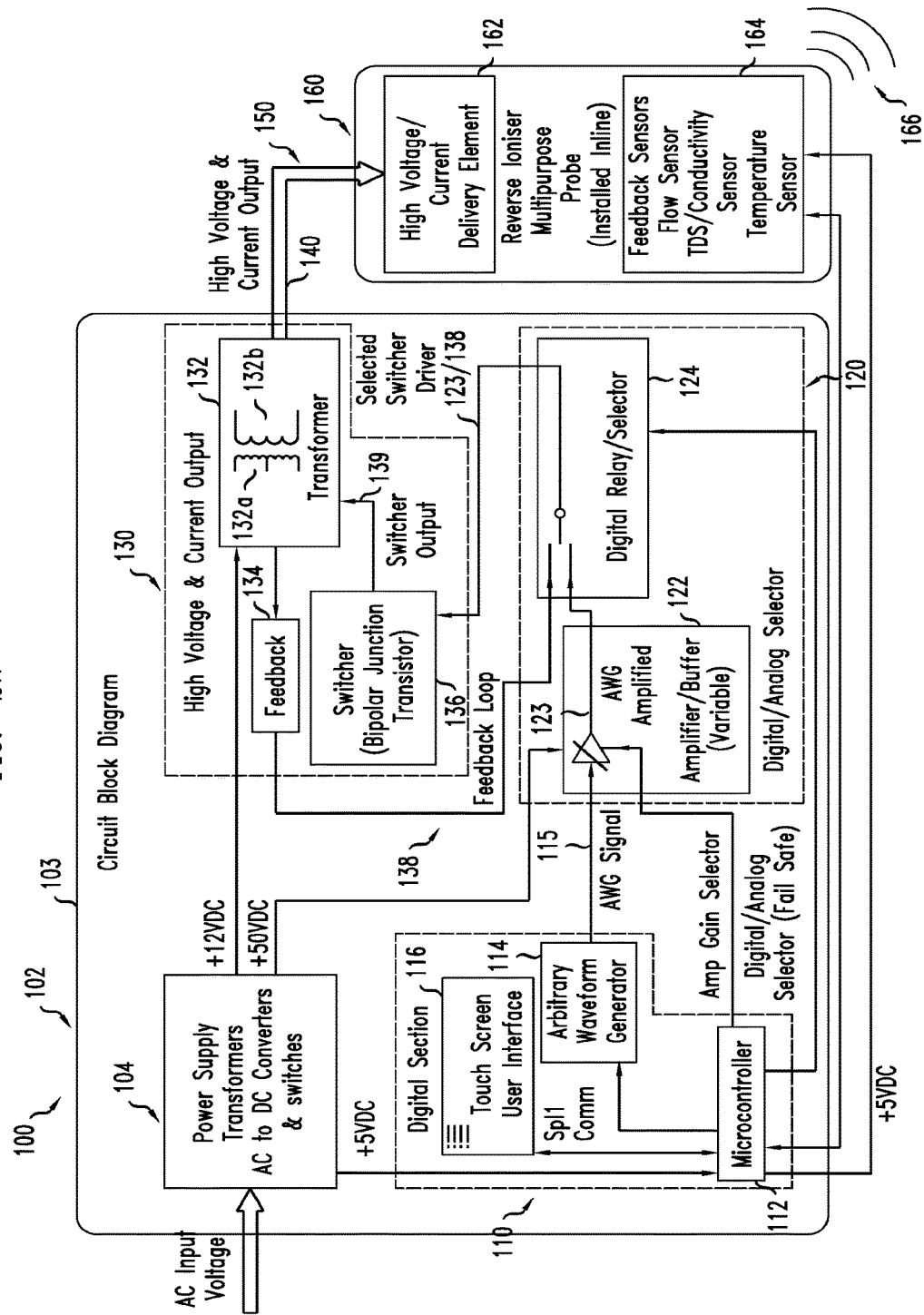
FIG. 2A is a schematic representation of the electrical water transport system device shown in FIG. 1, according to an embodiment.

FIG. 2A shows an exemplary embodiment of a water treatment system 100. As shown in FIG. 2A, the main unit 102 includes power supply 104, a digital control section 110, a digital/analog selector section 120 and an output section 130. The power supply 104 can be connected to an AC input voltage and supplies power to the digital control section 110, the digital/analog selector section 120 and the output section 130. The power supply 104, the digital control section 110, the digital/analog selector section 120 and the output section 130 can be mounted or contained in a housing or casing 103.

Still referencing FIG. 2A, the digital control section 110 may include a control device or microcontroller 112 connected to the power supply 104, an electromagnetic waveform generator 114 ("generator") and a user input device or user interface 116 with an optional touch screen, for example. The generator 114 may be controlled by the microcontroller 112 and can be an integrated circuit configured to generate digital input signals 115 of various waveforms (e.g., sine, triangular, square, saw tooth and pulse waveforms, AM modulation, FM modulation) that may be input to the digital/analog selector section 120. The microcontroller 112 interfaces with the user interface 116, which can accept user inputs indicating desired characteristics of the electromagnetic field(s) 166 output by the system 100. The microcontroller 112 may operate the generator 114 based on information input to the user interface 116. The characteristics (e.g., modulation, voltage, current, frequency and waveform shape) of the digital input signals 115 vary based on the user inputs indicating the desired characteristics of the electromagnetic field 166. Additionally, the user interface 116 can display waveform settings and feedback information from connected sensors 164 and control motors, motor controllers and other devices (not shown in FIG. 2A) used to operate the system 100.

As shown in FIG. 2A, the digital/analog selector section 120 includes an amplifier/buffer 122 and a digital relay/selector 124. The amplifier/buffer 122 may be connected to the microcontroller 112 and the generator 114. The digital relay/selector 124 may be connected to the microcontroller 112 and may be connected at its input side to the output of the amplifier/buffer 122. The amplifier/buffer 122 may be powered by the power supply 104, and may be operable to receive the digital input signals 115 from the generator 114 and amplify the digital input signals 115 to generate digital driver signals 123. The gain of the amplifier/buffer 122, and, therefore, the amplitude of the digital driver signals 123 may be controlled by the microcontroller 112 based on the desired characteristics of the electromagnetic field 166. The amplifier/buffer 122 may be selectively connectable to an input side of the digital relay/selector 124 such that the digital driver signals 123 can be forwarded from the amplifier/buffer 122 to the digital relay/selector 124.

Continuing with reference to FIG. 2A, the output section 130 may include an output amplifier or output transformer 132 powered by the power supply 104, a feedback filter device 134 configured to receive feedback signals 133 from a primary winding 132a of the output transformer 132 and selectively connectable to the input side of the digital relay/selector 124, and a switcher (e.g., bipolar junction transistor) 136 connected to an output side of the digital relay/selector 124 and the input side of the transformer 132.

As indicated above, the microcontroller 112 may be programmed with specialized instructions such that, in a default, digital, operational mode of the system 100, the amplifier/buffer 122 may be connected to the input side of the digital relay/selector 124 and the feedback filter device 134 may be disconnected from the input side of the digital relay/selector 124. Thus, the microcontroller 112 and generator 114 may operate to digitally drive the output transformer 132 with the digital driver signals 123. In comparison to analog driver signals, the digital driver signals 123 typically provide much greater control over the characteristics of the electromagnetic field 166 generated by the system 100. More specifically, driving the output transformer 132 with the digital driver signals 123 typically provides greater options with respect to controlling the modulation, frequency, voltage, current and waveform shape of the electromagnetic field 166.

In the digital operational mode, the digital driver signals 123 may be sent to the switcher 136 through the digital relay/selector 124. The switcher 136 modifies the digital driver signals 123 to generate switcher signals 139 and then supplies the switcher signals 139 to the input side of the output transformer 132. The secondary winding 132b of the output transformer 132 then generates output signals 140 based on the digital driver signals 123 and delivers the output signals 140 to the probe 160 through the cable 150, for example.

Referring still to FIG. 2A, in a backup (analog) or failsafe operational mode, upon receiving signals from the microcontroller 112 the amplifier/buffer 122 may be disconnected from the input side of the digital relay/selector 124 and the feedback filter device 134 may be connected to the input side of the digital relay/selector 124. Using, stored, specialized instructions the backup or failsafe operational mode may be initialized by the microcontroller 112 upon detection of a failure of the digital control section 110 by the microcontroller 112 and other components of the system 100, or the backup or failsafe operational mode can be manually selected by a user through the user interface 116.

In the backup or failsafe mode, the primary winding 132a of the output transformer 132 and the feedback filter device 134 operate to drive the secondary winding 132b of the output transformer 132 with analog driver signals 138. More specifically, the feedback filter device 134 filters/modifies the feedback signals 133 to generate the analog driver signals 138. The analog driver signals 138 may be fed to the switcher 136 via the digital relay/selector 124. The switcher 136 modifies the analog driver signals 138 to generate switcher signals 139. The switcher signals 139 may be supplied to the input side of the output transformer 132. Thus, a feedback loop may be formed by the output transformer 132, the feedback filter device 134, the digital relay/selector 124 and the switcher 136. These components function as a feedback oscillator to operate the system 100 in an analog mode. The secondary winding 132b of the output transformer 132 generates output signals 140 based on the analog driver signals 138 and delivers the output signals 140 to the probe 160 through the cable 150, for example. When the system 100 is operated in this analog mode, the possible ranges and types of modulation, frequency, voltage, current and waveform shapes may be limited in comparison to the digital mode. In the analog mode, the electromagnetic output fields 166 can be controlled by analog controls (not shown) or, alternatively, by signals from the microcontroller 112, where such signals may be based on stored, specialized instructions formulated and integrated into the microcontroller 112 and optionally input into the microcontroller 112 via the user interface 116, for example.

Still referencing FIG. 2A, the elements of the probe 160 that are used to generate electromagnetic fields can be water-immersible members including a high voltage/high current delivery element 162. The delivery element 162 can be constructed of any electrically conductive material, however, it is preferable that the delivery element 162 be constructed of a corrosion-resistant material such as stainless steel, aluminum or graphite, for example. The delivery element 162 may be configured to receive the output signals 140 and generate the electromagnetic fields 166 based on the output signals 140. The electromagnetic fields 166 can be suitable for treating a liquid in the water transport system 1 that contains unwanted material (FIG. 1).

The probe 160 can optionally include one or more feedback sensors 164. The feedback sensors 164 may be connected to the microcontroller 112 and controlled by stored, specialized instructions. For example, the sensors 164 can be controlled such that they can be calibrated by the microcontroller 112, and/or provide the microcontroller 112 with feedback information related to water conditions. By way of example, the feedback sensors 164 may be selected from among one or more of the following types of sensors: a total dissolved solids (TDS)/conductivity sensor, a flow rate sensor, a temperature sensor and a pH sensor, to name just a few types of sensors. These sensors may be configured to provide the microcontroller 112 feedback information (e.g., data in the form of real world signals) regarding a total dissolved solids level/conductivity of the water, a flow rate of the water, a temperature of the water and a pH of the water, respectively, for example. Based on such information from the sensors 164, the microcontroller 112 may control components of system 100 to adjust the characteristics (e.g., modulation, voltage, frequency, current and/or waveform shape) of the output electromagnetic fields 166. The system 100 and fields 166 can be varied adaptively (automatically by the microcontroller 112 based on pre-programmed settings) or manually by a user in order to treat liquids in the water transport system 1 that contain unwanted materials (FIG. 1).

In embodiments in which the probe 160 does not include sensors 164, the sensors can be provided separately and used in a similar manner to set and maintain optimal electromagnetic fields for the system 100.

In the embodiment shown in FIG. 2A, the generator 114 may be a high voltage, current driven generator operable to generate sine, square, or triangular waveforms, for example, in the 1 to 10 KHz range. In the embodiment shown in FIG. 2A, neither the generator 114 nor the probe 160 necessarily has a matching impedance (e.g., 50 ohms), though such generators and probes are within the scope of the present invention and are described elsewhere herein.

Figure 2B:
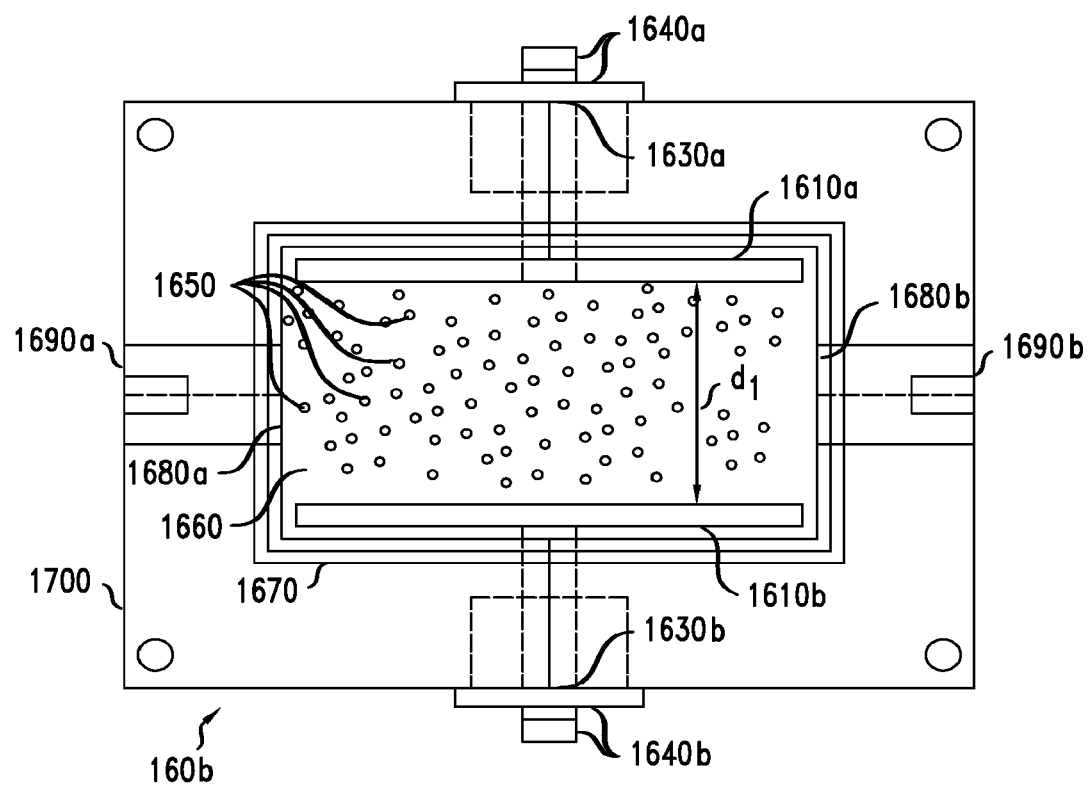
FIG. 2B depicts one view of a device for treating liquids according to one embodiment.
Figure 2C:
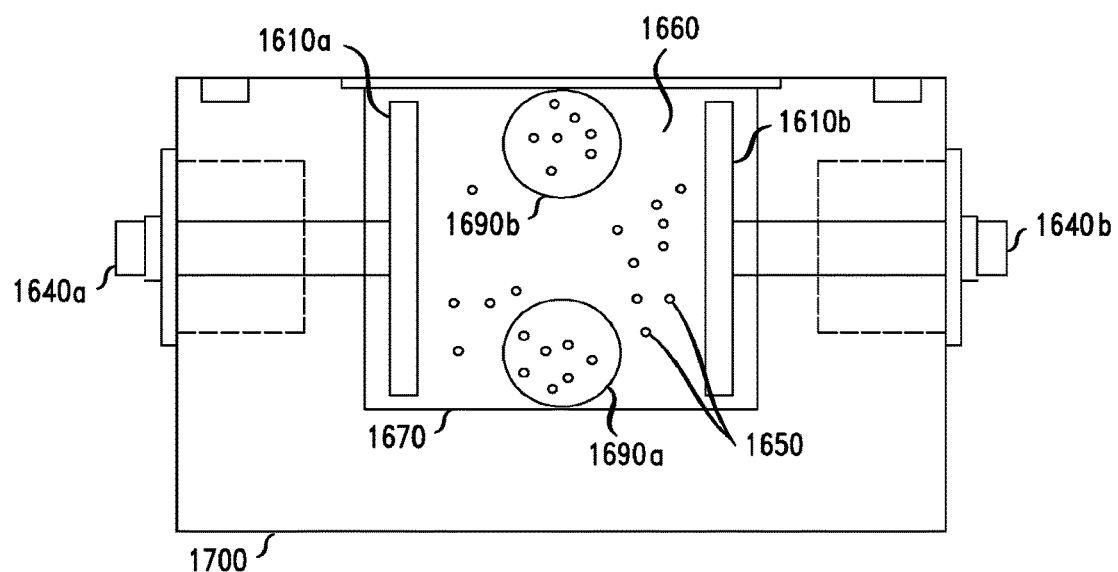
FIG. 2C depicts a second view of the device shown in FIG. 2B.
Figure 2D:
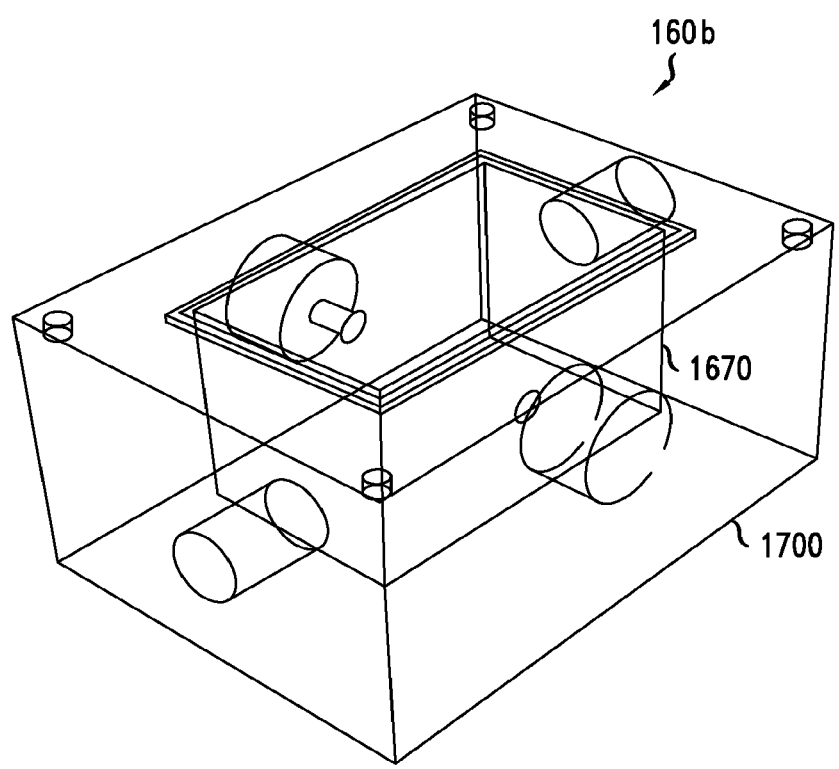
FIG. 2D depicts a third view of the device shown in FIG. 2B.

Referring now to FIGS. 2B through 2D there are depicted views of a device 160b according to embodiments of the invention. As shown, the device 160b may comprise immersible elements 1610a, 1610b that may be configured with respect to one another to reduce fringing effects. In more detail, device 160b may comprise: an immersible, positive conductive element 1610a; an immersible, negative conductive element 1610b separated from the first conductive element 1610a by an adjustable distance, $d_1$; means for supplying and/or applying an electrical signal 1630a, 1630b, such as a power unit and electrical wires, having a first polarity to the positive conductive element 1610a and an electrical signal having a second, opposite polarity to the negative conductive element 1610b to create an electromagnetic field between the first and second elements 1610a, 1610b to treat a liquid within the electromagnetic field that contains unwanted materials. The device may further include means for moving 1640a, 1640b the positive and negative conductive elements 1610a, 1610b to adjust the adjustable distance $d_1$, (such as a control system that includes a servo-motor or another controllable motor along with a motor controller), in order to, for example, change a resonant frequency that optimizes the treatment of a liquid (such as mineralized water) within the electromagnetic field that contains unwanted materials 1650, such as scale. It should be understood that the unwanted material 1650 depicted in the figures is not shown to scale. That is, it has been enlarged for illustrative purposes. In many cases the unwanted material is microscopic and cannot be seen by the naked eye. In the embodiments depicted in FIGS. 2B through 2D the elements 1610a, 1610b may comprise plates that may be configured with respect to one another to reduce fringing effects, and may be enclosed by a treatment chamber 1670. The chamber 1670 may be operable to surround the immersible elements 1610a, 1610b, and comprise first and second openings 1680a, 1680b connected to input and output supply lines 1690a, 1690b (e.g., pipes) that operate to supply a liquid 1660, such as mineralized water, into the chamber 1670 (via line 1690a, for example) and operate to allow such a liquid to exit the chamber 1670 (via line 1690b, for example). In one embodiment the chamber 1670 may be a chamber having the dimensions of 3 inches in length, 3 inches in width and 5 inches in height while the openings 1680a, 1680b and associated lines 1690a, 1690b may have a diameter of ½ inch.

The probe 160b may comprise a support structure 1700 that provides support for, and encloses, immersible components 1610a through 1690b, for example. The support structure 1700 may be made from a Delrin material, for example.

As depicted the first and second immersible elements 1610a, 1610b may comprise respective, substantially parallel plates that may be configured with respect to one another to reduce fringing effects. For example, in an embodiment of the invention, the surface area of the respective plates 1610a, 1610b are not the same in order to reduce the effects of fringing. Fringing refers to the portion of an electromagnetic field that is not located between the two elements but instead extends outside of the area between the elements. For example, that portion which surrounds the perimeter or edge of each element. Because this field is outside of the area between the two elements it is not usually involved in the treatment of unwanted materials (e.g., scale) from liquid that flows between the two elements.

In accordance with one embodiment, to reduce the effects of fringing, or, said another way, to focus more of the electromagnetic field to the area between the two elements 1610a,1610b, the elements 1610a,1610b may be configured as different sized or shaped elements with respect to one another. That is, different sized or shaped elements may be used. The different sized or shaped elements affect the shape of the resulting electromagnetic field such that more of the field is located in the area between the two elements 1610a, 1610b than outside the area.

For example, the ratio of the surface area of the positive element 1610a to the surface area of the negative element 1610b may be in the range 0.75 to 0.90. That is to say the surface area of the positive element 1610a may be only 75% to 90% of the surface area of the negative element 1610b (i.e., the positive element is smaller than the negative element). In an embodiment of the invention, the different surface areas of the elements 1610a, 1610b reduces the effects of fringing. It should be noted that although the elements 1610a,1610b in FIGS. 2B and 2C are depicted as if they are of equal size (e.g., length) and surface area this is not the case. Rather, the sizes and surface areas of the two elements 1610a,1610b differ in order to achieve a reduction in fringing effects described herein.

Continuing, as depicted the elements 1610a,1610b may be perpendicularly attached to the means for moving 1640a, 1640b the first or second conductive elements 1610a,1610b. In one example means 1640a, 1640b may comprise a control system (microcontroller, etc.,) and, in addition, horizontally aligned rods attached to a suitable servo-motor or other motor, and a motor control system (e.g., programmable controller; not shown for clarity). The rods may be made from stainless steel, for example. In one example, the dimensions of each rod may be ½ inch in diameter, and 6 inches in length. In an embodiment, the rods may be compression fitted on each side of the chamber 1670.

Referring more specifically now to FIG. 2C, in one example, mineral water 1660 may traverse a path through the treatment chamber 1670. For example, water 1660 may be input into the chamber 1670 from supply line 1690a located at the bottom of the chamber 1670. Once within chamber 1670, the water 1660 may flow between immersible elements 1610a, 1610b and then be output from supply line 1690b at the top of the chamber 1670. The configurations depicted in FIGS. 2B-D permit a sufficient amount of water to flow through the chamber 1670 in order to treat a sufficient amount of unwanted material (e.g., scale), such as calcium carbonate.

In one exemplary operation for treating unwanted materials (e.g., scale) from the liquid 160 (e.g., water), an electrical current having a first polarity may be applied by means 1630a to the first element 1610a and an electrical current having a second, opposite polarity may be applied by means 1630b to the second element 1610b. Means 1630a, 1630b may, for example, comprise a power unit (e.g., generator), associated electrical wiring and other components well known in the art. Upon application of the electrical currents a resulting electromagnetic field is created within the chamber 1670. In an embodiment of the invention, the field lines of the electromagnetic field traverse the water 1660 within the chamber 1670 between the elements 1610a,1610b. As described herein, the application of the electromagnetic field to the water 1660 reduces the amount of unwanted material (e.g., scale) 1650 in the water 1660. Upon application of the electrical current the elements 1610a,1610b may function as a capacitor whose capacitance is dependent on the distance $d_1$ between the elements and the dielectric constant of the mineralized water or other liquid 1660 within chamber 1670. In more detail, the distance, d1, between the plates determines a certain capacitance that is a function of the sum product of the liquid's permittivity and the plate area divided by d1. As a result, varying the size of d1 will change the resulting capacitance. The inductance of the plates and the resultant capacitance from varying the size of d1 (i.e., tuning) creates a series resonant circuit, in which the resonant frequency is proportional to the reciprocal of the sum of 2 times π times the sum of the square root of the resultant capacitance and the inductance of elements 1610a, 1610b.

In sum, changing the effective distance d1 between elements 1610a,1610b changes the resonance frequency of the parallel plate capacitor formed by the elements 1610a,1610b while the electrical currents are applied, as well as changing the flow rate of a liquid passing between the elements 1610a,1610b and resulting impedance.

It should be understood that the distance d1 may be selected based on a number of factors. For example, given the fact the distance d1 between elements 1610a, 1610b traverses a volume of liquid flowing in the chamber 1670, d1 should be selected such that an intended or flow rate of a water transport system is met. That is to say, a given water transport system typically requires water (or another liquid) to flow at a particular rate. In accordance with an embodiment of the invention, when an inventive probe, such as probe 160b, is connected to such a water transport system the particular flow rate should be maintained.

In an alternative embodiment of the invention, using the ionic cyclotron frequency (e.g., including fundamental frequencies and their harmonics) of a given mineral or element present in a liquid, such as water, may also aid in the treatment of a liquid that contains unwanted material. For example, a frequency set to the ionic cyclotron frequency of a mineral such as (e.g., calcium) may cause the mineral to remain in a dissolved form, and thus prevent the mineral (e.g., calcium) from forming scale in the form of a solid or particulate (e.g., calcium carbonate) in a liquid. Accordingly, in embodiments of the invention the modulation frequency applied to the carrier frequency output by a generator described herein may be varied to match a particular mineral's ionic cyclotron frequency. The resulting variably modulated signal from the generator may be applied to the probe 160b as well as other probes described herein via means 1630a,b, for example, to produce an electromagnetic field that is similarly modulated to target a particular mineral by applying a field component (i.e., modulated frequency) that corresponds to the particular mineral's ionic cyclotron frequency.

In the embodiments shown in FIGS. 2B through 2D, the impedance of probe 160*b* is not necessarily fixed (e.g., to 50 Ohms) but may vary based on the chemistry of the liquid it is immersed in, or in contact with. Further, the impedance of the probe 160*b* is not necessarily matched to a generator (e.g., 50 Ohms). That said, a probe with a substantially fixed impedance (e.g., 50 Ohms that is matched to a generator is within the scope of the present invention. For example, such a probe is described with respect to FIGS. 2E through 4, for example.

Figure 2E:
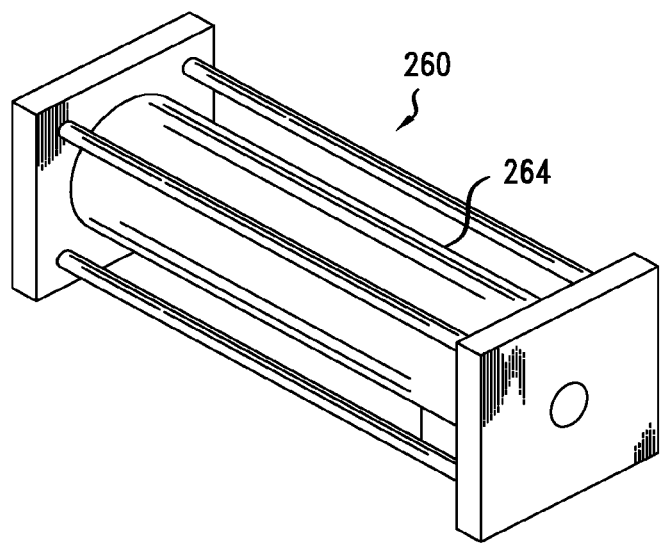
FIG. 2E depicts one view of an alternative device for treating liquids according to another embodiment.
Figure 2F:
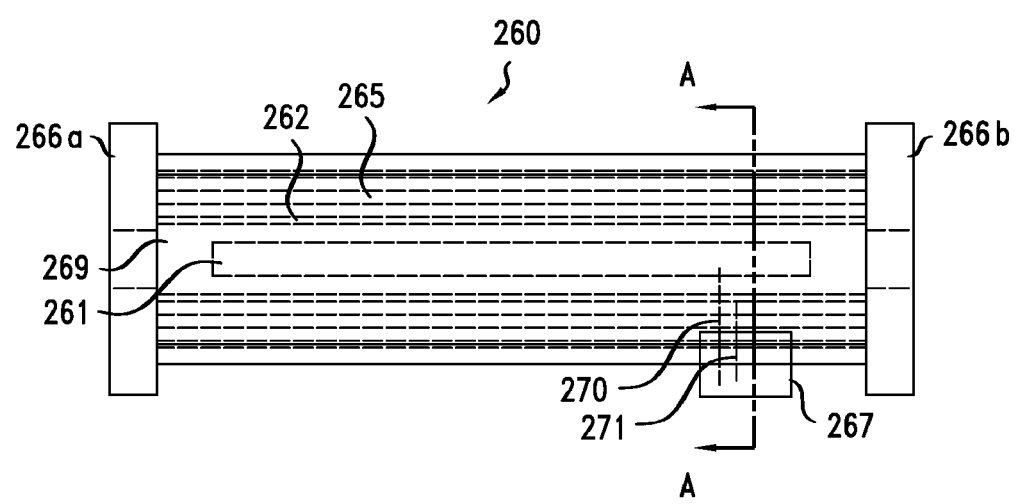
FIG. 2F depicts a second view of the device shown in FIG. 2E.
Figure 2G:
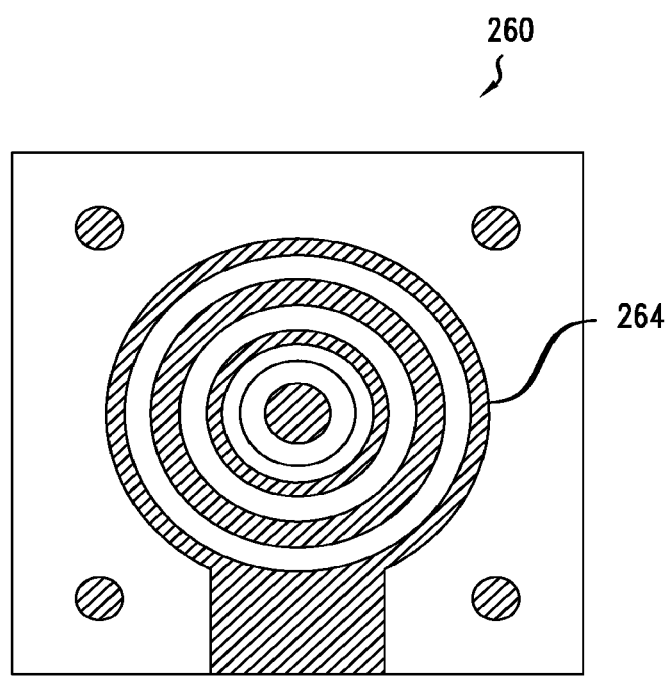
FIG. 2G depicts a third view of the device shown in FIG. 2E.

FIGS. 2E through 2G depict views of an alternative device 260 that utilizes immersible and coaxially aligned, cylindrical structures as elements instead of plates according to an embodiment of the invention.

Referring to FIGS. 2E through 2G, device 260 may comprise a probe, where the probe comprises a cylindrical housing 264 made of 303-stainless steel material, for example. Shown inside the housing 264 is: a horizontally aligned non-conducting cylindrical tube 265 made of Delrin material, for example; an immersible, horizontally aligned stainless steel cylindrical tube 262 made of 303-stainless steel material, for example, hereafter referred to as the positive element; an immersible, horizontally aligned stainless steel cylindrical rod 261 made of 303-stainless steel material, for example, referred to hereafter as the negative element; and two threaded end-caps 266*a,b* made of 303-stainless steel material, for example, for connecting the housing 264 to two pipes made of 0.750 inch stainless steel (not shown) for inputting and outputting a liquid, such as mineralized water into, and out of, the housing 264. As shown immersible elements 261, 262 are coaxially aligned with one another. Elements 261, 262 may be configured with respect to one another to reduce fringing effects.

In exemplary embodiments, some typical dimensions of the components described above are:

housing 264: 3.25 inches in diameter, 12 inches in length, having a wall or thickness of 0.125 inches;

cylindrical tube 265: 2.0 inches in diameter, 0.25 inch wall thickness and 12 inches in length;

cylindrical tube 262: 1.5 inches in diameter, 0.125 inch wall thickness, and 10 inches in length;

cylindrical rod 261: 0.5 inch in diameter, and 8 inches in length; and threaded end-caps 266: each 5.0 inches by 5.0 inches by 0.750 inches with threads for 0.750-inch-thick stainless steel pipes.

Two compression fittings 270, 271 may be electrically connected to the positive and negative elements 261,262. The other ends of the compression fittings 270, 271 function as electrical terminals for connecting the probe 260 to a terminal block 267. The annulus spacing between the elements 261,262 forms a treatment chamber 269.

In an embodiment, the elements 261,262 may form a cylindrically shaped, coaxial capacitor whose capacitance depends on the annulus spacing between the elements 261, 262 and the dielectric constant of the liquid (e.g., mineralized water) flowing in the probe 260. Changing the effective annulus spacing of the elements changes the resonance frequency of the probe when electrically stimulated. In an exemplary embodiment, this annulus spacing may be 2 inches, for example.

As described before, tuning the probe 260 to a resonant frequency or applying a modulation frequency to the probe 260 that corresponds to an ionic cyclotron frequency of a given mineral or element present in a liquid, such as water, may also aid in the treatment of a liquid that contains unwanted material.

In accordance with one embodiment, to reduce the effects of fringing the elements 261,262 may be configured with respect to one another to reduce such effects. Said another way, two different sized elements 261, 262 are used. The different sized elements affect the shape of the resulting electromagnetic field such that more of the field is located in the area between the two elements 261, 262 than outside the area.

For example, the ratio of the length of the positive element 261 to the length of the negative element 262 may be in the range 0.75 to 0.90, for example. That is to say the length of the positive element 261 may be only 75% to 90% of the length of the negative element 262 (i.e., the positive element is shorter than the negative element). In an embodiment of the invention, the different lengths of the elements 261,262 reduces the effects of fringing.

In an embodiment of the invention, probe 260 may have an impedance of 50 Ohms that is impedance matched to a generator, such as generator 600 depicted in FIGS. 3C through 3F or other generators described herein. Impedance matching may be completed through the use of an impedance matching control system, such as the smart probe control system 400 depicted in FIG. 4A.

Referring back to FIG. 2A, to use the system 100, the system 100 may be connected to an AC power source and a probe (e.g., 160, 160*b*, 260 or another probe described herein) can be inserted in-line with a pipe (e.g., pipe 4*a* in FIG. 1) or other component of a water transport system using a fixture (e.g., fixture 6 in FIG. 1 or the structures described in FIGS. 2B through 2G) such that the elements of the probe that are used to generate electromagnetic fields are immersed in, or directly contact, liquid (e.g., water) from the pipe. It may be preferable to insert the probe at or near a location that is susceptible to the formation or accumulation of unwanted material (e.g., scale, microbes, etc.,). Once the probe is installed in the water transport system, desired characteristics of the electromagnetic field(s) 166 can be input via the user interface 116, for example. The main unit 102 and a probe can be operated to generate the electromagnetic field(s) 166 and apply the field(s) to the water such that existing unwanted material in the water transport system are treated.

When either probe 160 or 260 is connected to the unit 102, the probe 160 or 260 may be configured to receive output signals from unit 102 (e.g., from generator 114) and then generate the electromagnetic fields that are applied to treat a liquid that contains unwanted material. In these embodiments, the electromagnetic field generated by the probe 160, 260 will comprise a dominant electric field. In additional embodiments described herein, the present inventors provide probes that generate an electromagnetic field comprising a dominant magnetic field, and probes that combine both dominant electric and magnetic fields.

Regardless of the type of probe, in embodiments of the invention, the signal provided by the unit 102 and supplied to the probe 160 or 260 (or other probes described herein) may include a variable modulation frequency that corresponds to the ionic cyclotron frequency of a mineral, such as calcium. Thereafter, the electric field created by a probe, such as 160 or 260, and applied to the liquid passing through probe 160 or 260 may be similarly modulated.

The system 100 can be operated substantially continuously or intermittently as required to achieve desired water treatment goals. As indicated above, based on feedback information from sensors 164 or similar sensors within the water transport system, the characteristics of the output electromagnetic fields 166 can be adaptively varied automatically by the microcontroller 112 based on pre-programmed, stored specialized instructions and settings, or manually by a user in order to optimize the treatment of a liquid that contains unwanted material.

In general, it is believed that electromagnetic fields will prevent the buildup of unwanted material, such as scale deposits directly on inventive probes described herein. It is also believed that electromagnetic fields break up unwanted materials (e.g., scale) that have accumulated within a conduit or container, and such fields will eventually remove such unwanted materials so that the unwanted material may be silted out or otherwise removed in the form of a fine powder.

It is further believed that electromagnetic fields also contribute to sterilizing and decontaminating liquids (e.g., water) containing microbial contaminants (e.g., bacteria, amoeba, protozoa, algae, fungus, etc.). It is believed that a fast rising spike (i.e., quickly rising high amplitude waves) in the electromagnetic signal (as opposed to merely the implementation of low amplitude radio frequency waves) may be critical to biological contaminant purification. This spike appears to act as a shock to the bacteria, amoeba, protozoa, etc., within the water and breaks down their protective mechanisms.

It is believed that, when the system 100 is used primarily as a steady-state high voltage generator, as in descaling applications, the preferred voltage output may be generally between 2,000 and 5,000 volts. It is believed, however, that the system 100 can function with a steady-state field as low as 1,000 volts and as high 10,000 volts.

When the power unit 102 is used as a combination steady-state high voltage generator and a high negative ion generator, it is believed that the preferred output voltage may be generally between 3,500 and 5,000 volts steady-state field. When the power unit 102 is used strictly as a negative ion generator, it is believed that the preferred output voltage may be 1,500 to 3,000 volts steady-state field with a resultant negative ion output of approximately 100 to 2,000 volts.

When the system 100 is used to control bacteria, ameba, protozoa, algae, fungus, etc., pulse rate frequencies of the electromagnetic field(s) 166 can be set to coincide with generally accepted frequencies that control particular types of organisms. For example, the control frequency for E. Coli bacteria is generally known to be 802 Hz. The voltage output on such frequencies can preferably be between 2,000 and 5,000 volts.

Figure 2H:
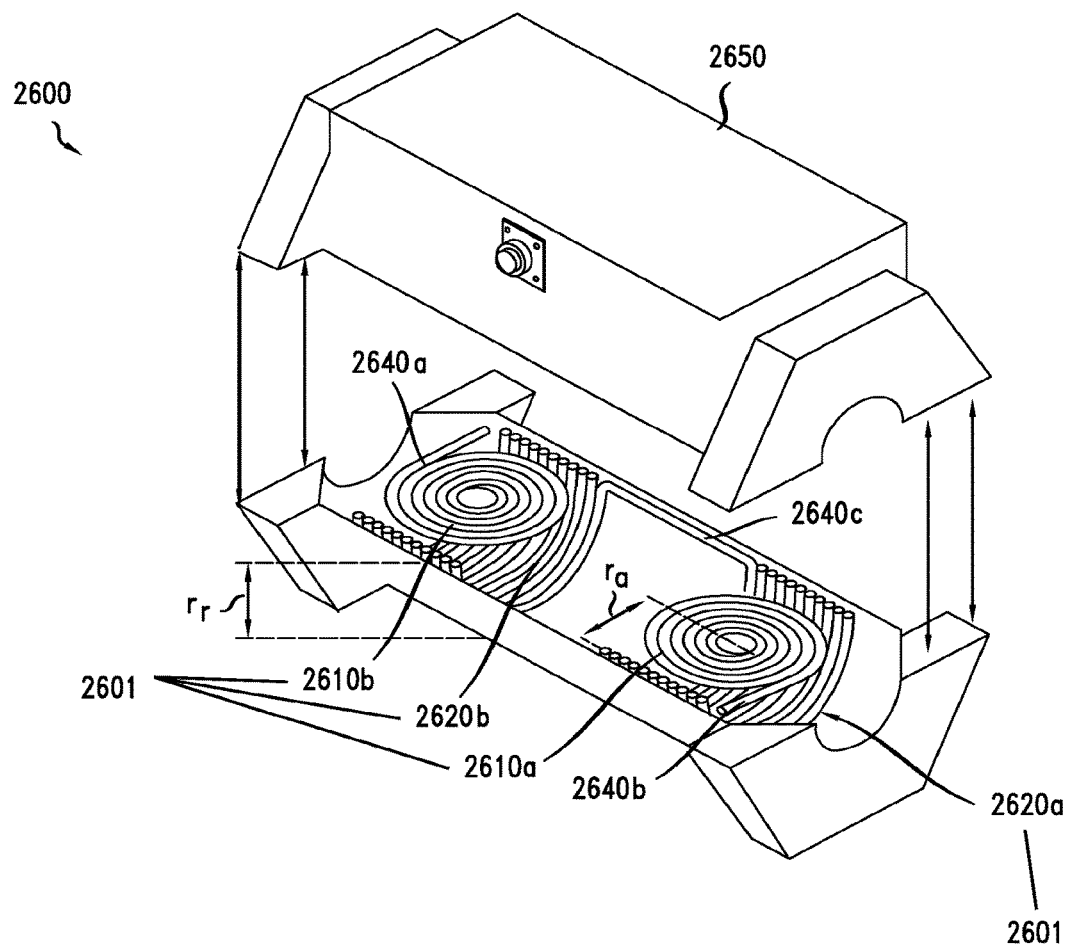
FIG. 2H depicts yet another device for treating liquids according to an additional embodiment.
Figure 21:
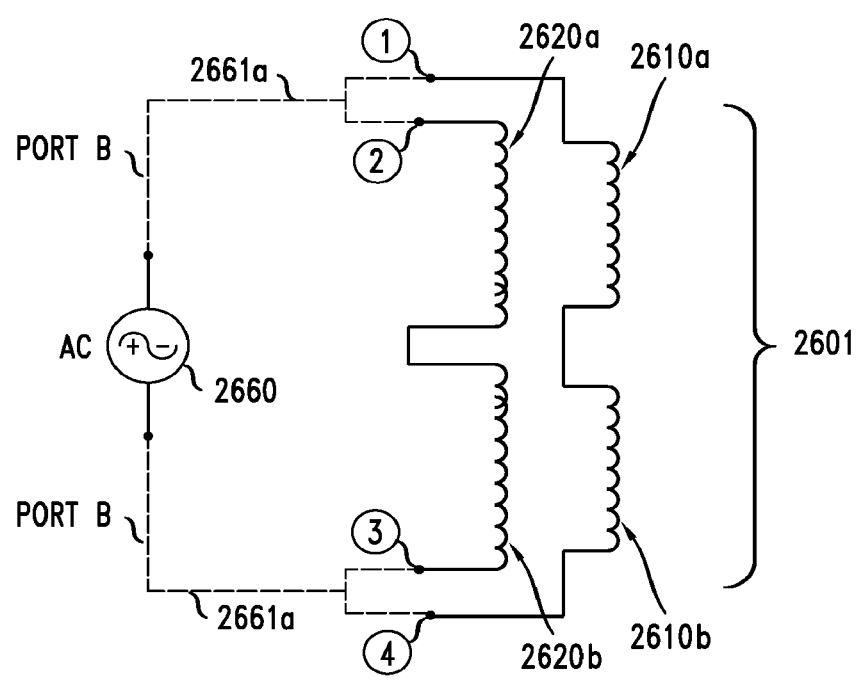

Referring now to FIG. 2H there is depicted yet another embodiment of a device 2600 for treating unwanted material in a liquid using electromagnetic fields. In particular, the device depicted in FIG. 2H may include water-immersible members, and an integrated broadband electromagnetic generator and smart probe system 2650. The device 2600 may include a magnetic field probe comprising one or more immersible elements, such as axial coils 2610a, 2610b and one or more radial coils 2620a, 2620b that are operable to create an electromagnetic field having a dominant magnetic field component to treat the liquid (e.g., water) that passes through the device 2600 when the device 2600 is installed in a water transport system, for example. Together the immersible coils 2610a, 2610b and 2620a, 2620b form a probe 2601. In an embodiment each one of the radial coils 2620a, 2620b is paired with a different one of the axial coils 2610a, 2610b to form a pair of electrodes. As depicted in FIG. 2H the electrodes may be connected using compression fitting electrode connectors 2640a, 2640b and 2640c.

In an embodiment the probe 2601 may comprise an inner hollow structure (e.g., copper pipe with inner wall 2602) that forms a pathway and an outer stainless steel covering (e.g., shell) that surrounds the hollow structure in order to shield the inner pathway from corrosive materials in the liquid, for example.

As indicated, the device 2600 is shown including an integrated generator and smart probe section 2650 (e.g., impedance matching circuitry) that is described elsewhere herein, it being understood that the device 2600 may also be used with a separate generator and smart probe system.

Probe 2601 is depicted as a so-called Helmholtz "coil" or coil configuration. That is, in accordance with embodiments of the invention the axial coils 2610a,b and radial coils 2620a,b may be configured in a Helmholtz coil configuration. As may be known to those skilled in the art, the total magnetic field from the radial coils 2620a,b is the sum of the magnetic fields from both radial coils 2620a,b. Correspondingly, the total magnetic field from the axial coils 2610a,b is the sum of the magnetic fields from both axial coils 2610a,b.

In embodiments of the invention, the probe's 2601 total magnetic field, $B_{Tot}$, is the sum of the magnetic field of the radial and axial coils, namely, $B_{Tot}=B_{Radial}+B_{Axial}$ at a point (x), where (x) is measured from the midpoint of the separation distance between the probe's 2601 radial coils 2620a,b and axial coils 2610a,b coils. More particularly, the total magnetic field $B_{Tot}$ may be derived from the following relationships:

$$B_{Tot} = B_{Radial} + B_{Axial} =$$
$$(\mu_o N I r^2)/([d/2-x]^2+r^2)^{3/2} + (\mu_o N I r^2)/([d/2+x]^2+r^2)^{3/2}$$

In embodiments of the invention, probe 2601 magnetic field (B) is uniform where (x)=0. If the electrical current is (I), the number of coil turns is (N) and ($\mu_o$) is the permeability of the stainless steel coils, then the magnetic field of the probe 2601 (and any dominant magnetic field section of a probe, discussed further below) can be determined from the relationship:

$$B=(8\mu_o NI)/\sqrt{125}r$$

With continued reference to FIG. 2H, in embodiments of the invention the radius, $r_a$, of each of the axial coils 2610a,b are equal, and the distance between each axial coil is equal to the radius, $r_a$, of an axial coil. In addition, the radius, $r_r$, of each of the radial coils 2620a,b are equal, and the distance between each radial coil is equal to the radius of a radial coil.

In embodiments of the invention, the radial and axial coils may be spaced away from an inner wall 2602 of the device 2600 to minimize attenuation of the magnetic field created by the coils.

FIG. 2I depicts an exemplary, simplified electrical diagram of device 2600. In the embodiment depicted in FIG. 2I, the immersible coils 2610a,b and 2620a,b are connected to a broadband electromagnetic generator 2660. The generator 2660 may be operable to generate signals at frequencies between 10 kHz and 100 MHz, for example.

In more detail, the coils may be connected to a particular port of the generator 2660 which we will refer to as "port B", it being understood that this designation is arbitrary and the inventors could use any number of different designations. As connected in FIG. 2I the generator 2660 may be operable to output and supply a uniform, time-varying signal 2661a to the axial and radial coils 2610a,b and 2620a,b, respectively, to enable the coils 2610a,b and 2620a,b making up probe 2601 to produce a uniform, time-varying-magnetic field that, when applied to a liquid by the coils 2610a,b and 2620a,b treats unwanted material in the liquid (e.g., prevents and or mitigates scale (CaCO$_3$)). As indicated elsewhere herein, and reiterated here, the signal 2661*a* output by the generator 2660 and supplied to the coils 2610*a,b* and 2620*a,b* via electrical conductors, for example, may include a variable modulation frequency that corresponds to the ionic cyclotron frequency of calcium, for example. Thereafter, the magnetic field created by coils 2610*a,b* and applied to the liquid passing through probe 2601 may be similarly modulated.

FIG. 2J depicts a simplified, exemplary diagram depicting the connection of another exemplary probe 4601 to the signal generator 2660 in accordance with the electrical circuit diagram of FIG. 2I. Though the probe 4601 depicted in FIG. 2J is a dual-field probe (discussed further below) that comprises both a magnetic field dominant probe section 4601*a* and an electric field dominant probe section 4601*b*, the magnetic field section 4601*a* includes immersible elements similar to probe 2601. Accordingly, we shall refer to FIG. 2J to illustrate how the probe 2601 (or any magnetic field probe or probe section described herein) may be connected to, and operate in conjunction with, the signal generator 2660.

Continuing, the generator 2660 may be connected to the magnetic field dominant probe section 4601*a* or probe 2601 (as described with reference to FIG. 2I) via electrical conductors 2700, for example.

As connected, the generator 2660 is operable to provide a uniform time-varying signal 2661*a* to section 4601*a* or probe 2601 and its immersible elements (e.g., Helmholtz coils). When so connected and provided, the section 4601*a* or probe 2601 may be operable to produce a uniform, time-varying-magnetic field that, when applied to a liquid, such as water, passing through the probe 4601 or 2601 treats unwanted material in the water. As indicated elsewhere herein, and reiterated here, the signal 2661*a* provided by the generator 2660 may include a variable modulation frequency that corresponds to the ionic cyclotron frequency of calcium, for example. Accordingly, the magnetic field created by section 4601*a* or probe 2601 and applied to the liquid passing through probe 4601 or 2601 may be similarly modulated.

FIG. 2J also includes a depiction of the connection of the generator 2660 to the electric field dominant probe section 4601*b* via electrical conductors 2700, for example, in order to provide signal 2661*b* to section 4601*b* and its associated immersible elements. Section 4601*b* may be similar in structure and operation to probe 260 or another electric field probe described elsewhere herein in that it is operable to create and apply a dominant electric field to a liquid passing through probe 4601.

Figure 2K:
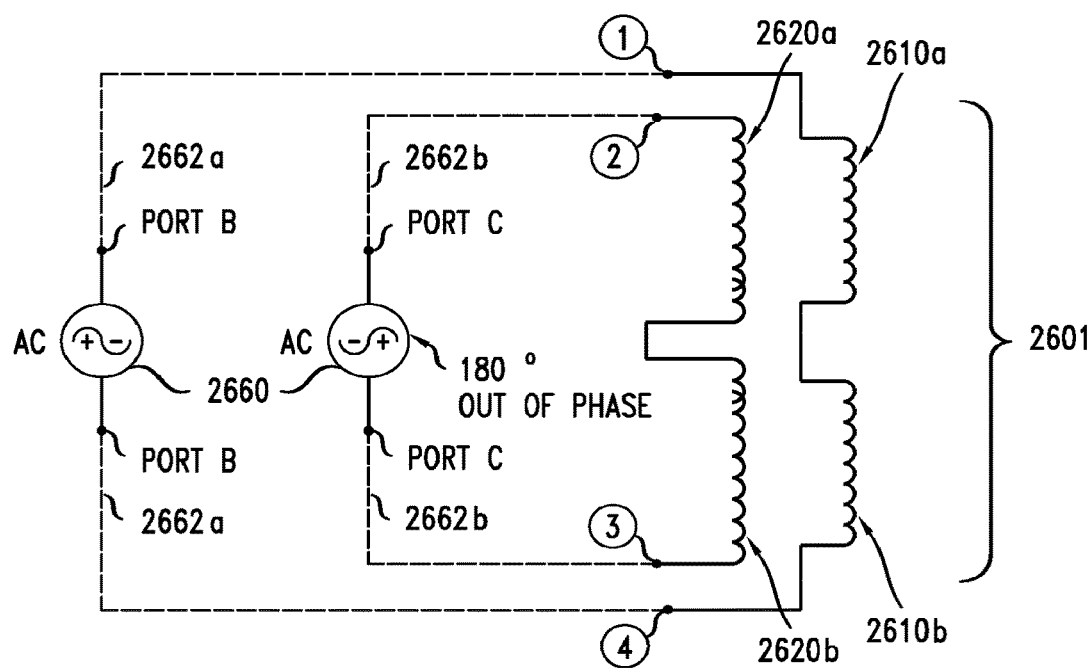
FIGS. 2I trough 2N depict simplified electrical circuit diagrams and associated, simplified electromagnetic generator connection diagrams that may utilize the device shown in FIG. 2H.
FIGS. 2O and 2P depict additional views of the device shown in FIG. 2H.
FIG. 2Q depicts still another device for treating liquids according to an additional embodiment.
FIGS. 2R and 2S depict simplified electrical circuit diagrams for the device shown in FIG. 2Q.
FIG. 2T depicts a representation of how forces created by the application of electromagnetic fields may be computed.
FIGS. 2U and 2V depict views of the internal structure of a magnetic field probe or probe section according to embodiments of the invention.

Referring now to FIG. 2K there is depicted another exemplary, simplified electrical diagram of device 2600 (or a magnetic field dominant probe section). In accordance with embodiments of the invention the immersible axial coils 2610*a,b* and radial coils 2620*a,b* may again be configured in a Helmholtz coil configuration, and connected to the broadband electromagnetic generator 2660. However, the coils 2610*a,b* and 2620*a,b* in FIG. 2K are connected to the generator 2660 differently than the coils in FIG. 2I.

In more detail, the axial coils 2610*a,b* may be connected to port B of the generator 2660 while coils 2620*a,b* may be connected to a different port, designated as port C, of the generator 2660. As connected in FIG. 2K the generator 2660 may be operable to output time-varying signals 2662*a,b* that are out of phase with one another, where signal 2662*a* is output via port B and signal 2662*b* is output via port C. In one embodiment, signals 2662*a* and 2662*b* may be 180 degrees out of phase with one another. Such out-of-phase signals, when applied to the coils 2610*a,b* and 2620*a,b* of probe 2601 (or a magnetic field dominant probe section) may enable the coils 2610*a,b* and 2620*a,b* making up probe 2601 to produce an oscillating, time-varying-magnetic field that, when applied to a liquid such as water, treats unwanted material in the water. The signals 2662*a,b* provided by the generator 2660 and supplied to the coils 2610*a,b* and 2620*a,b* may include a variable modulation frequency that corresponds to the ionic cyclotron frequency of calcium, for example. Accordingly, the magnetic field created by coils 2610*a,b* and 2620*a,b* and applied to the liquid passing through probe 2601 may be similarly modulated.

Figure 2L:
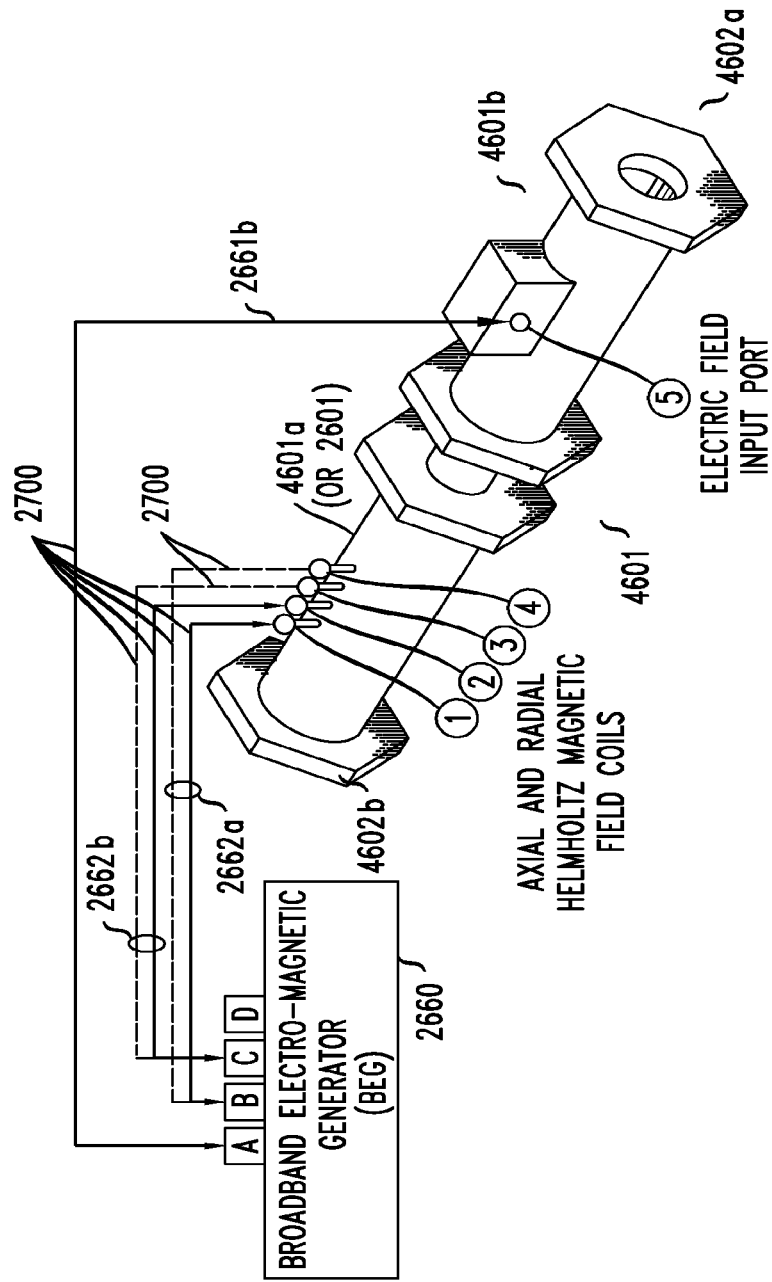

FIG. 2L depicts a simplified, exemplary diagram depicting the connection of an exemplary dual-field probe 4601 to the signal generator 2660. Again, though the probe 4601 depicted in FIG. 2L is a dual-field probe (discussed further below) that comprises both a magnetic field dominant probe section 4601*a* and an electric field dominant probe section 4601*b*, the magnetic field section 4601*a* includes immersible elements similar to probe 2601. Accordingly, we shall refer to FIG. 2L to illustrate how the probe 2601 (or any magnetic field probe or probe section) may be alternatively connected to the signal generator 2660.

Continuing, the generator 2660 may be connected to the magnetic field dominant probe section 4601*a* or probe 2601 in accordance with the electrical circuit diagram of FIG. 2K via electrical conductors 2700, for example. As shown, the generator 2660 may be connected to the magnetic field dominant probe section 4601*a* or probe 2601 in order to supply oscillating, time-varying signals 2662*a,b* to section 4601*a* or probe 2601 and their associated, respective, immersible coils. When so connected and provided, the section 4601*a* or probe 2601 may be operable to produce an oscillating, time-varying-magnetic field that, when applied to a liquid such as water, treats unwanted material in the water. As indicated elsewhere herein, and reiterated here, the signals 2662*a,b* provided by the generator 2660 may include a variable modulation frequency that corresponds to the ionic cyclotron frequency of calcium, for example. Accordingly, the magnetic field created by the probe 4601 or 2601 (i.e., by their immersible coils) and applied to the liquid passing through probe 4601 or 2601 may be similarly modulated.

Figure 2M:
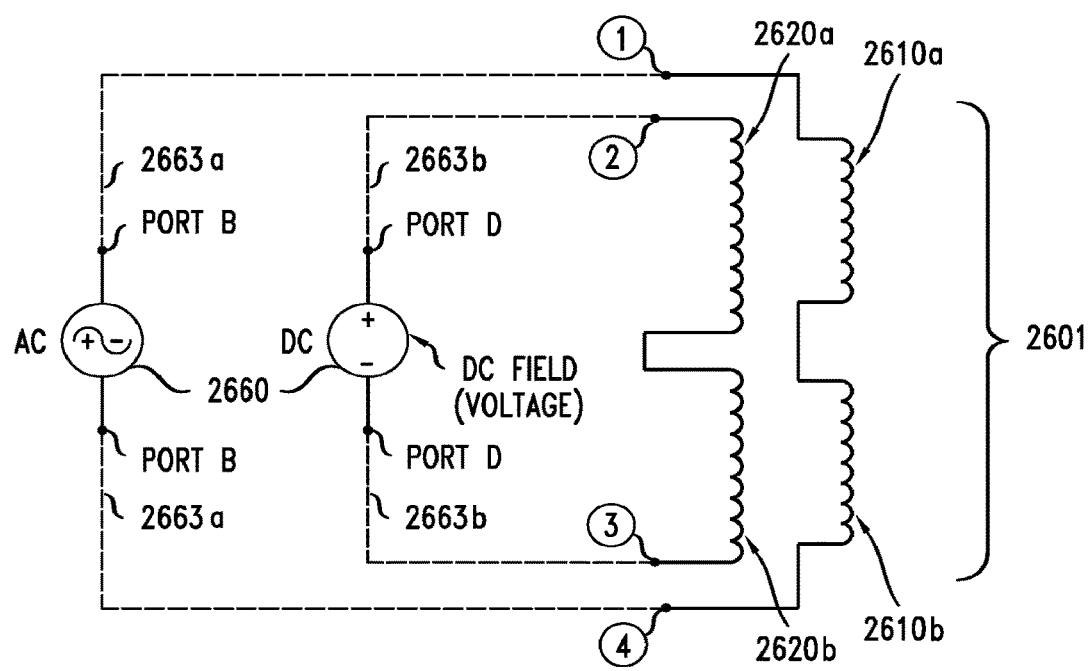
Figure 20:
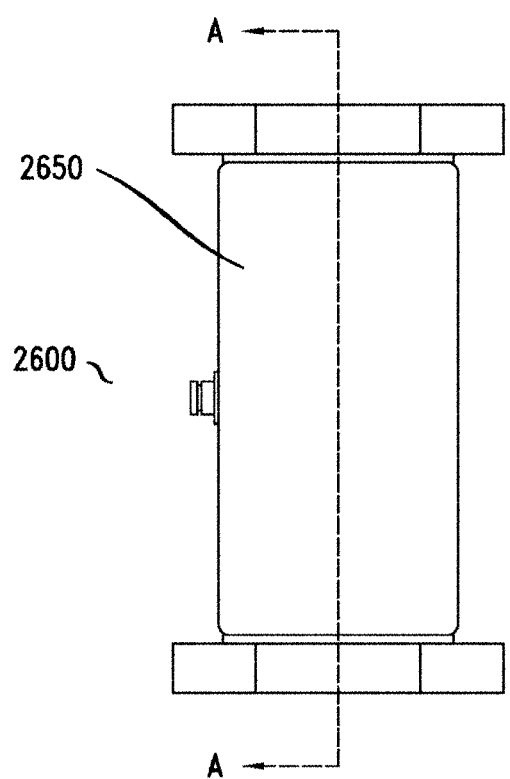

Referring now to FIG. 2M there is depicted yet another exemplary, simplified electrical diagram of device 2600 (or a magnetic field dominant probe section 4601*a*). In accordance with embodiments of the invention the immersible axial coils 2610*a,b* and radial coils 2620*a,b* may again be configured in a Helmholtz coil configuration, and connected to the broadband electromagnetic generator 2660. However, the coils 2610*a,b* and 2620*a,b* in FIG. 2M are connected to the generator 2660 differently than the coils in FIGS. 2I and 2K.

In more detail, the axial coils 2610*a,b* may be connected to port B of the generator (or port C) while coils 2620*a,b* may be connected to a different port, designated as port D, of the generator 2660. As connected in FIG. 2M the generator 2660 may be operable to output signal 2663*a* via port B and signal 2663*b* via port D, for example. In one embodiment, signal 2663*a* is a time-varying signal while signal 2663*b* may be a steady-state signal (non-time varying, e.g., direct current), for example.

Such signals, when supplied to the immersible coils 2610*a,b* and 2620*a,b* of probe 2601 (or a magnetic field dominant probe section 4601*a*) may enable the coils 2610*a,b* and 2620*a,b* making up probe 2601 to produce both a time-varying-magnetic field and steady-state magnetic field that, when applied to a liquid such as water, treats unwanted material in the water. The signal 2663*a* provided by the generator 2660 and supplied to the coils may include a variable modulation frequency that corresponds to the ionic cyclotron frequency of calcium, for example. Accordingly, a magnetic field created by coils and applied to the liquid passing through probe 2601 may be similarly modulated.

FIG. 2N depicts a simplified, exemplary diagram depicting the connection of an exemplary dual-field probe 4601 to the signal generator 2660. Once again, though the probe 4601 depicted in FIG. 2N is a dual-field probe that comprises both a magnetic field dominant probe section 4601*a* and electric field dominant probe section 4601*b*, the magnetic field section 4601*a* includes immersible elements similar to probe 2601. Accordingly, we shall refer to FIG. 2N to illustrate how the probe 2601 (or any magnetic field probe or probe section) may be alternatively connected to the signal generator 2660.

As shown, the generator 2660 may be connected to the magnetic field dominant probe section 4601*a* or probe 2601 in accordance with the electrical circuit diagram of FIG. 2M via electrical conductors 2700, for example, in order to supply both time-varying and steady-state signals 2663*a,b* to section 4601*a* or probe 2601 and their associated, respective immersible coils. When so connected and provided, the section 4601*a* or probe 2601 may be operable to produce both time-varying and steady-state magnetic fields that, when applied to a liquid such as water, treats unwanted material in the water. As indicated elsewhere herein, and reiterated again here, the signals 2663*a,b* provided by the generator 2660 may include a variable modulation frequency that corresponds to the ionic cyclotron frequency of calcium, for example. Thereafter, the magnetic field created by coils of the magnetic field section 4601*a* or probe 2601 and applied to the liquid passing through probe 4601 or 2601 may be similarly modulated.

FIGS. 2O and 2P depict additional views of the device 2600. In particular, FIG. 2P depicts a view taken along axis A-A of FIG. 2O. In FIG. 2P connectors 2640*a*, 2640*b* and 2640*c* can be seen connecting coils 2620*a*, 2620*b* and 2610*a*, 2610*b*, respectively.

It should be understood that probes 2601 and 4601 may be substituted for devices 160, 160*b*, 260 in FIGS. 2A through 2G. Accordingly, for the sake of brevity the inventors will not repeat the description of FIGS. 2A through 2G, it being understood that such a description applies to probes 2601 and 4601.

It should be understood that the probes and their associated immersible elements or coils described herein, including but not limited to probes 2601 and 4601, may be tuned to operate at a resonant frequency, and be operable to receive modulated signals in order to generate electromagnetic fields that are similarly modulated using modulation frequencies that correspond to an ionic cyclotron frequency (e.g., fundamental frequencies and their harmonics) of a given mineral or element (e.g., calcium carbonate) present in a liquid, such as water.

Figure 2Q:
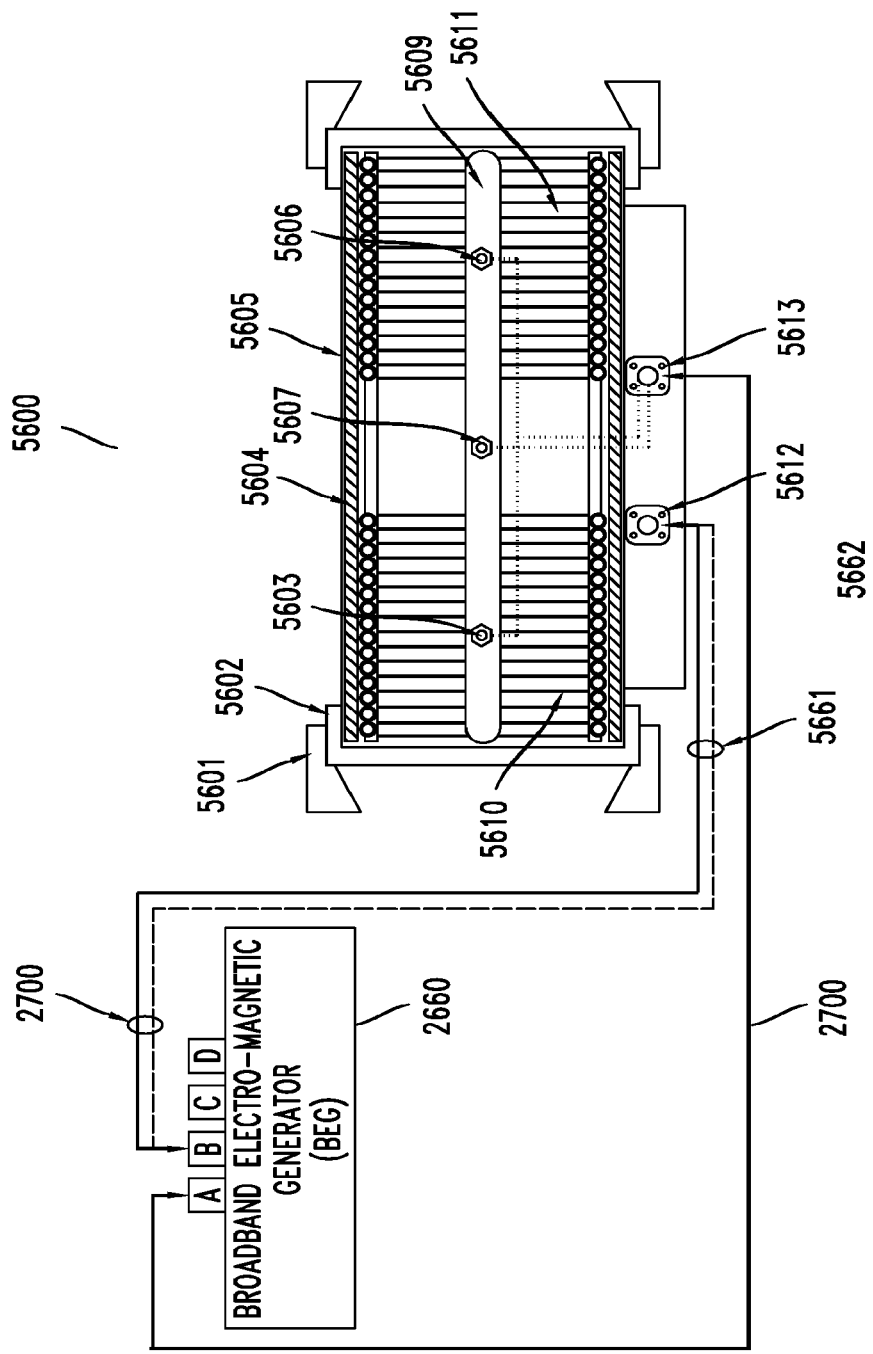
Figure 2R:
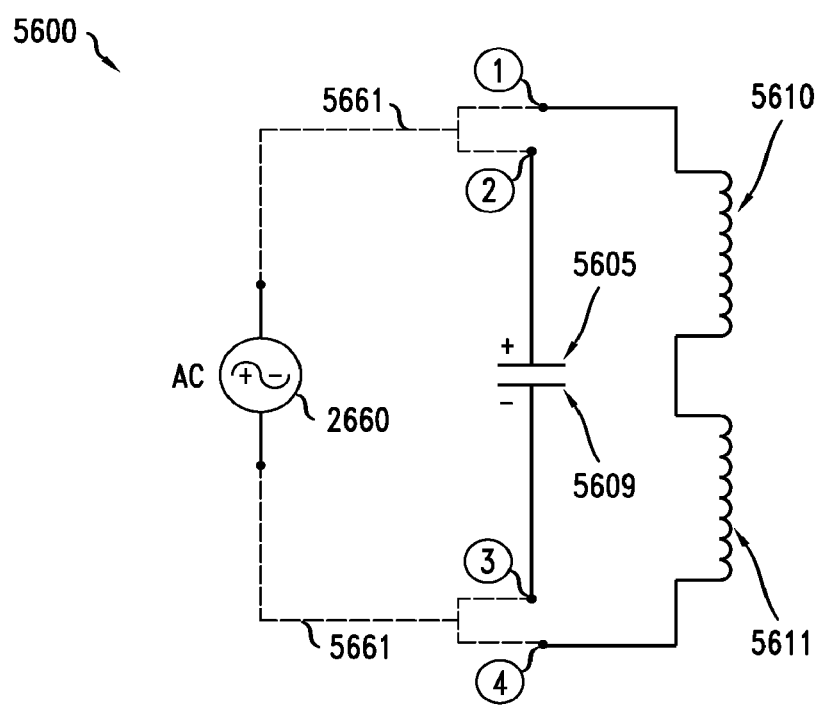
Figure 2S:
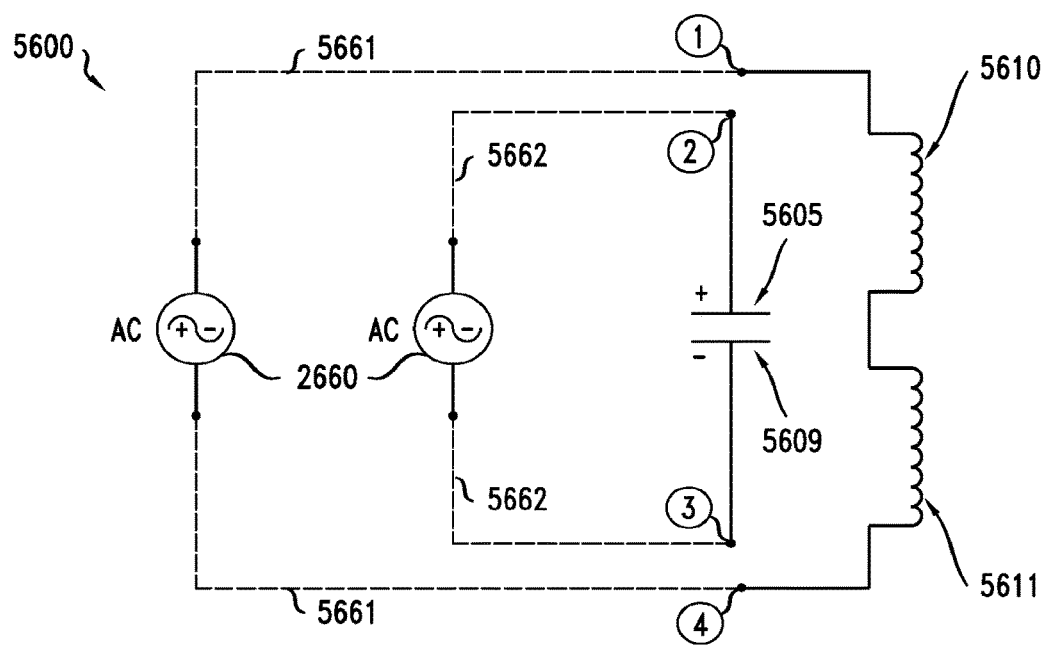
Figure 2T:
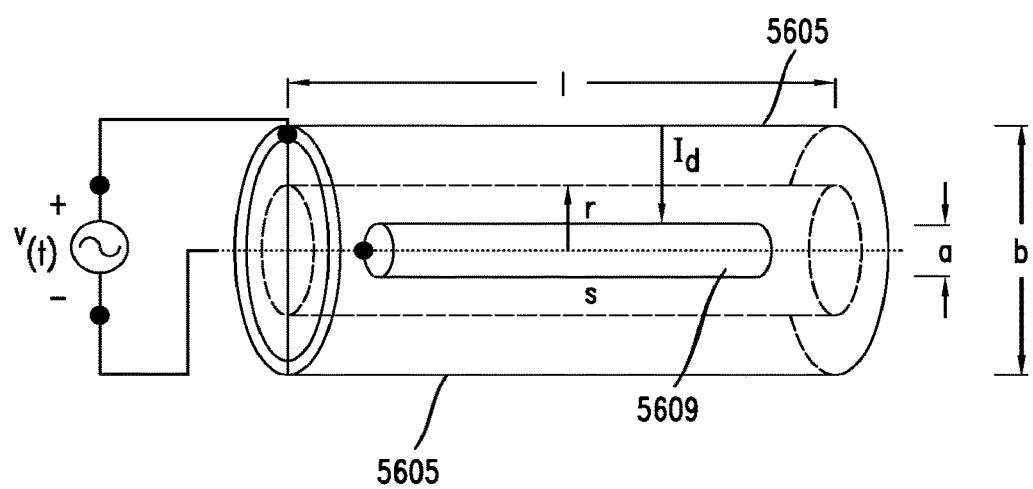
Figure 2U:
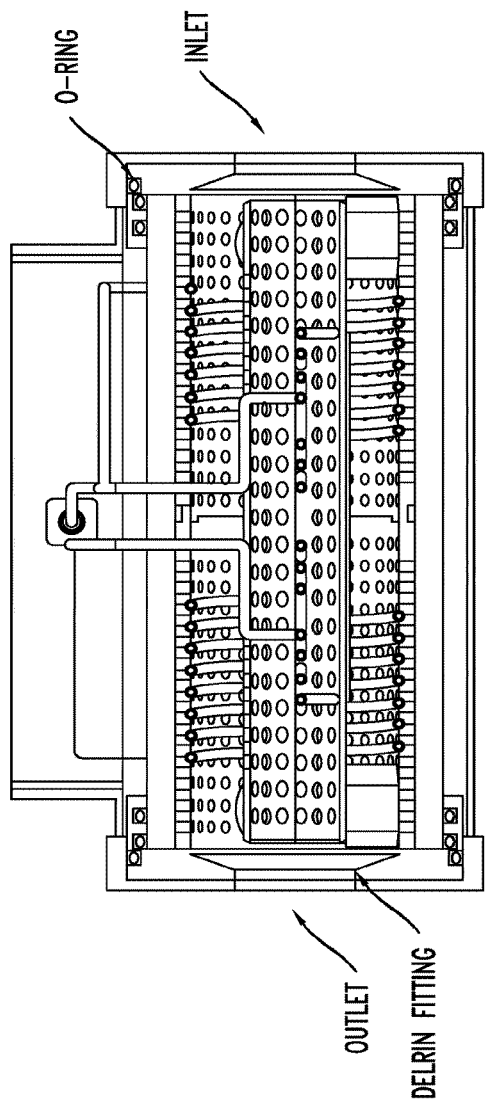
Figure 2V:
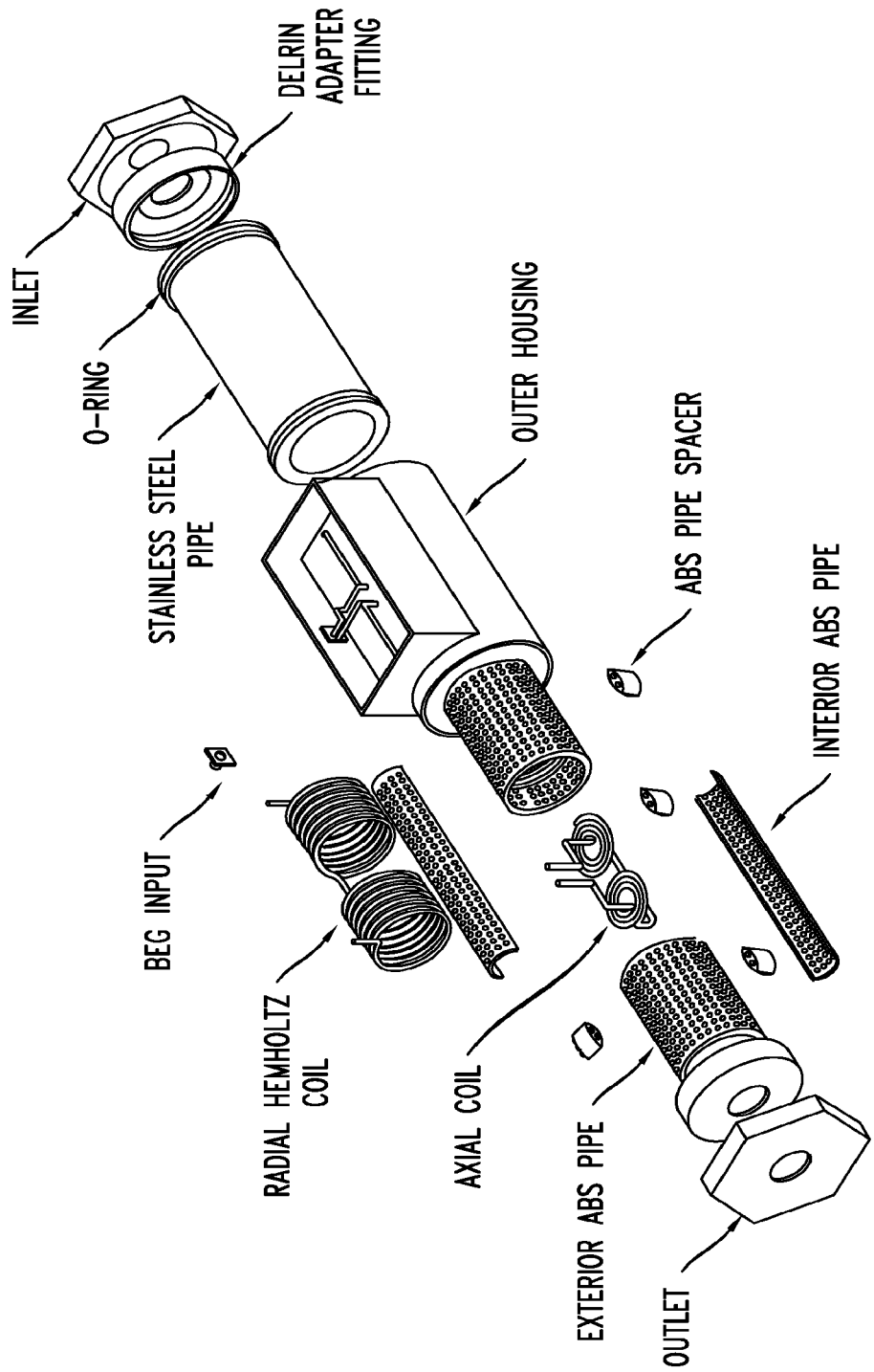

FIGS. 2U and 2V depict an exemplary internal structure of a magnetic field probe or probe section according to embodiments of the invention. As depicted in FIG. 2U, radial and axial coils may be secured to a housing by three components: exterior ABS pipes (two pieces, left and right), interior ABS pipes (two pieces, top and bottom), and a plurality of ABS pipe spacers (e.g., six).

In accordance with one embodiment an exterior ABS pipe may be threaded on the inside, where the radial coil sits in the probe housing. It acts as a fitting that restricts movement as well as electrically isolating the coil from a stainless steel pipe. The exterior ABS pipe may be perforated to limit the effect on the flow rate of a liquid. Two Delrin fittings, secured around the stainless steel pipe with two O-rings each on the inlet and the outlet, keep the exterior ABS pipe from moving inside the stainless steel pipe.

The interior ABS pipe holds the axial coils in the center of the pipe as well as isolating the axial coils from the radial coils. The interior ABS pipe may be formed as a clamshell that fits around the axial coil(s). Six ABS pipe spacers, three near the inlet, and three near the outlet may be operable to keep the axial coils, and interior ABS pipe hoisted in the center of the pipe. Three pegs lock into the exterior ABS pipe and two pegs lock into the interior ABS pipe, allowing the spacers to restrict horizontal movement of the interior pipe as a result of flowing liquid. The interior ABS pipe may also be perforated to limit the effect on the flow rate of the liquid (e.g., makeup water) through the probe.

FIG. 2V depicts an exploded view of the internal structure of the magnetic probe or probe section in FIG. 2U.

Figure 3A:
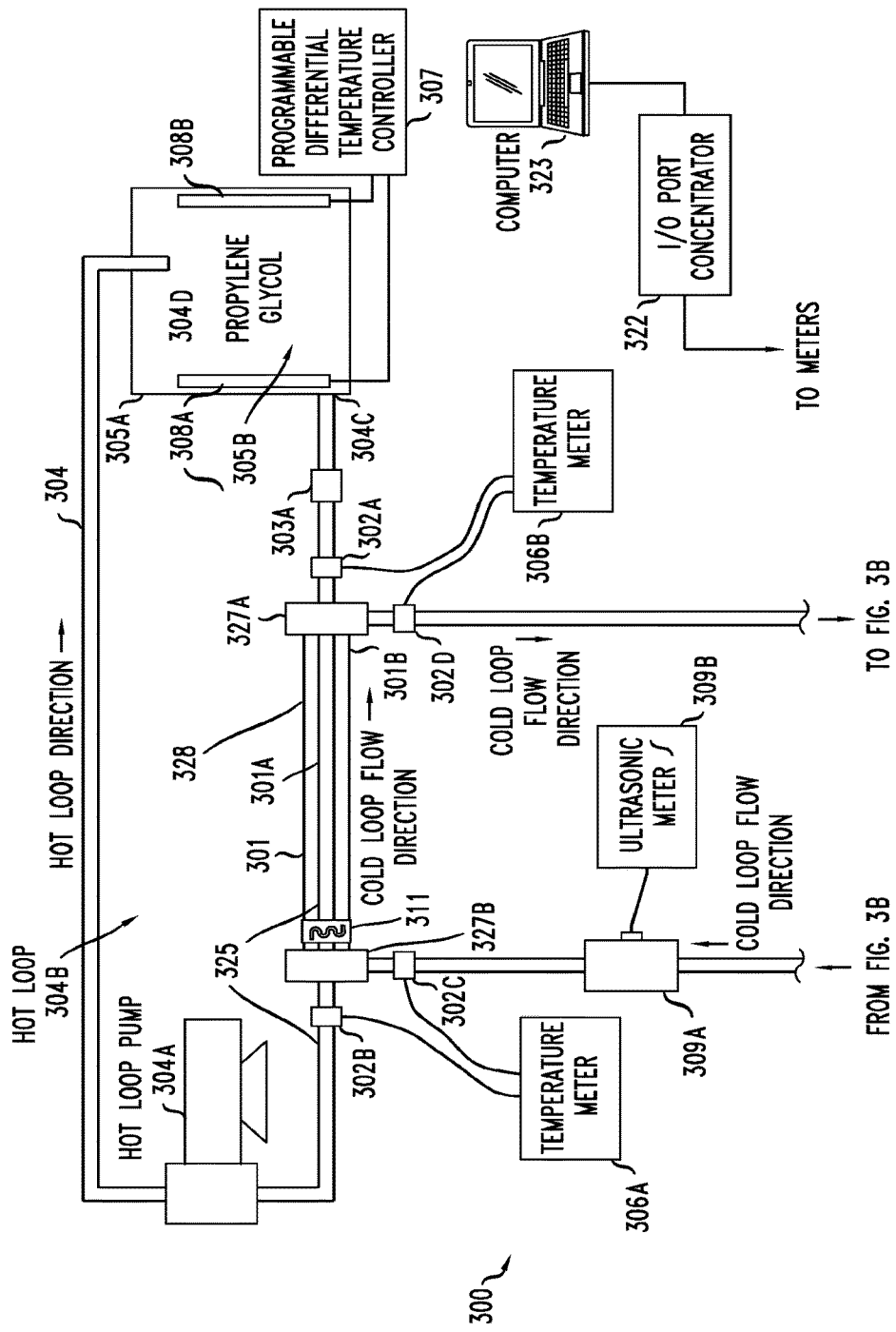
FIGS. 3A and 3B depict an exemplary, experimental water transport system according to embodiments of the invention.
Figure 3B:
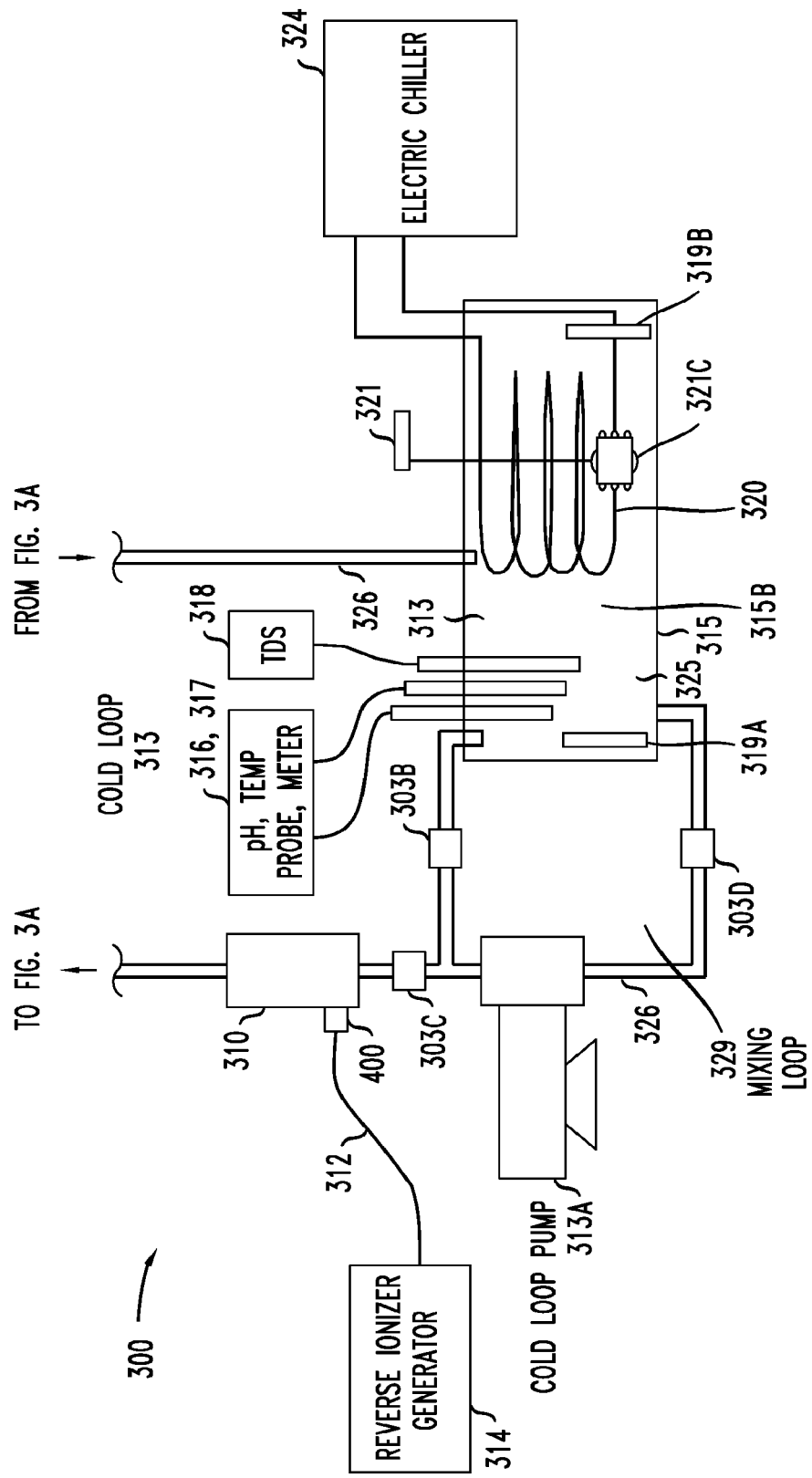
Figure 3E:
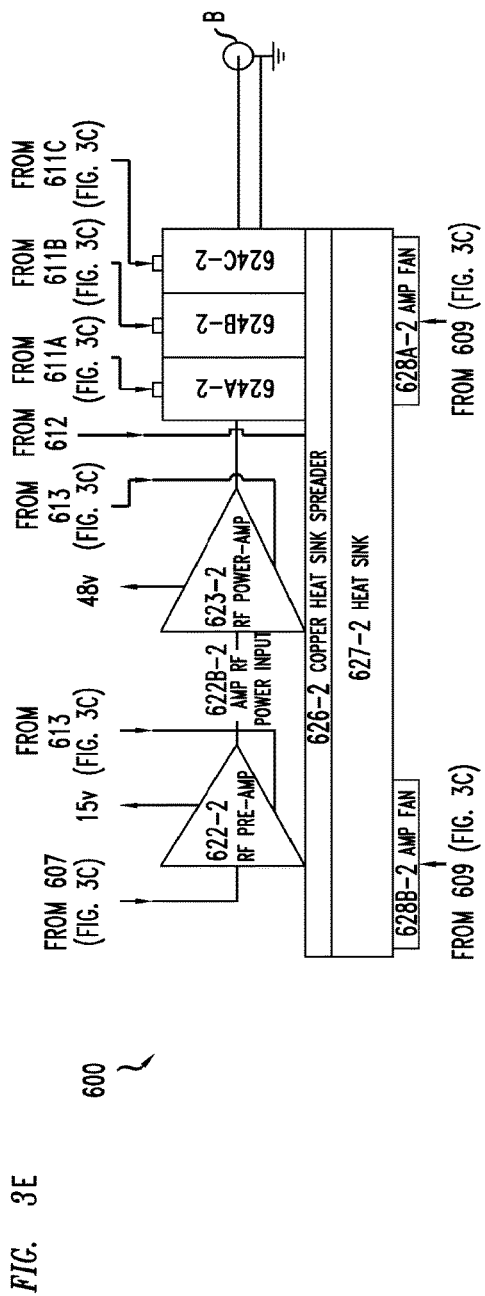
Figure 3F:
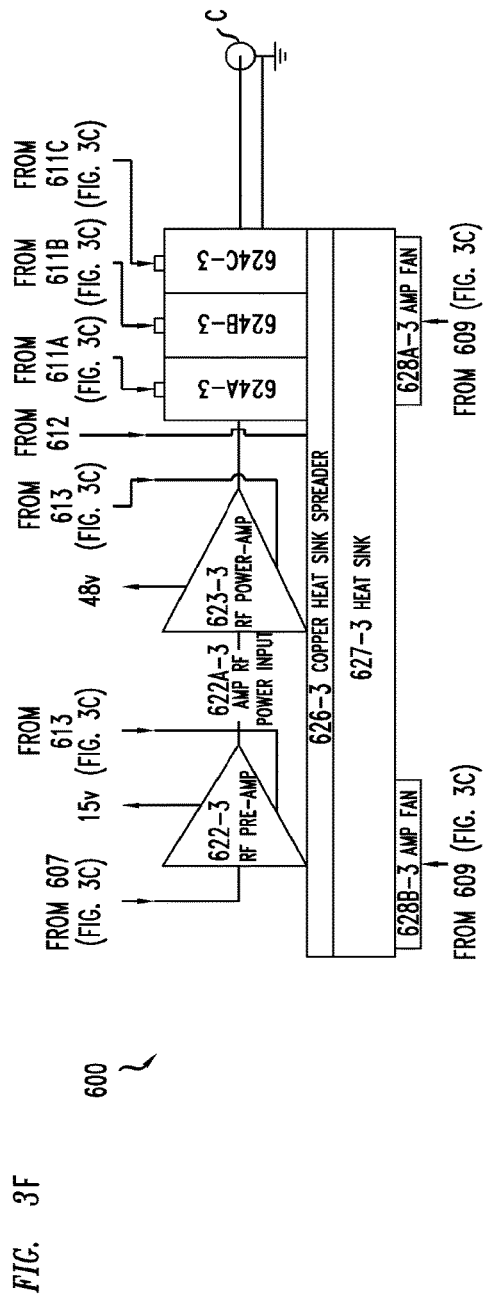

Experimental Setup—FIGS. 3A & 3B

The inventors understand that every liquid supply system is potentially different and may, therefore, require variations in system settings and treatment methods to optimize the treatment of a liquid that contains different types of unwanted material. In particular, the present inventors understand that the physical and chemical properties of a liquid, such as water, will likely vary from one supply system to the next, and such properties can impact the effectiveness of various types of electromagnetic fields in treating the liquid. For example, the mineral content, flow rate, temperature and pH of a liquid (e.g., water) in a system may affect the types and amount of scale and microbes that are likely to form in the liquid. Accordingly, the mineral content, flow rate, temperature and pH of water may at least partially dictate the characteristics of electromagnetic fields that will be effective in treating the water. Furthermore, as the mineral content of water varies, the conductivity and capacitance of the water may vary. Yet further, the conductivity and probe size (i.e., larger probe diameter or smaller probe diameter) affects the impedance of the overall system.

Yet further, the conductivity of the mineral content of the water in conjunction with the dimension of the probe's cavity (i.e., volume of water that flows between elements, coils and dimensions of the probe, feeding pipe system) causes the impedance to change, and, in turn cause changes to the modulation frequency required to effectively treat the water as described in more detail herein.

In order to develop an understanding of the optimum electromagnetic fields that may be useful in a variety of different applications, the inventors have developed experimental liquid (e.g., water) transport systems, such as system 300 shown in FIGS. 3A and 3B. The experimental system 300 simulates a typical real world, water transport system that may be used to grow or foster the formation of unwanted material, such as scale and accumulated microbial agents. It is believed that by measuring the characteristics (e.g., mineral content, flow rate, temperature and pH) of water in the system 300 over time, testing various types of electromagnetic fields applied to the water and testing various methods of supplying and applying electromagnetic output fields to the water, optimum electromagnetic fields for a given water transport system may be identified. Water treatment data, among other data, obtained through testing of the experimental system 300 can be used to prescribe user input settings for a liquid transport system under a variety of conditions, as well as develop adaptive (automatic) and specialized treatment protocols and related instructions that may be integrated into (e.g., programmed into) microcontrollers described herein, such as microcontroller 112 (FIG. 2A), microcontroller 621 (FIG. 3C), microcontroller 422 (FIG. 4A), and controllers used as a part of apparatus 4000 (FIG. 4A), for example.

As shown in FIG. 3A, the exemplary, experimental liquid (water) supply system 300 includes two loops, namely a hot loop 304B and a cold loop 313. A hot liquid tank 305A contains a volume of propylene glycol (anti-freeze) 305B that is circulated throughout the hot loop 304B. The hot loop 304B includes a copper pipe 304 beginning at an inlet end 304C in contact with the propylene glycol 305B in the hot liquid tank 305A, and terminating at outlet end 304D in contact with the propylene glycol 305B in the hot liquid tank 305A. The propylene glycol 305B is circulated through the copper piping 325 by a pump 304A such that the propylene glycol 305B flows through the removable copper pipe 301A of heat exchanger 301, exits the hot liquid tank 305A into the inlet end 304C and returns to the hot liquid tank 305A from the outlet end 304D. Hot liquid tank 305A contains two heating elements 308A and 308B controlled by a programmable, differential temperature controller 307 to raise and control the temperature of propylene glycol between 70 degrees centigrade and 120 degrees centigrade. The hot loop piping 304B contains one thermocouple 302A installed before ABS plastic end-cap 327A, and a second thermocouple 302B installed after ABS end-cap 327B. The thermocouples 302A, 302B may be used to measure the temperature of the propylene glycol 305B entering and exiting the heat exchanger 301. Additionally, an electronic shut-on/off valve 303A may be installed after the inlet 304C of hot liquid tank 305A to turn on or off the propylene glycol.

The heat exchanger 301 comprising a quartz tube 328, removable copper pipe 301A, and ABS plastic end-caps 327A and 327B may be configured such that an annulus spacing 301B exists between the removable copper pipe 301A and the quartz tube 328. The ABS end-caps 327A and 327B may be designed to maintain the annulus spacing 301B and to form a path for make-up water 315B to flow through the heat exchanger 301 while propylene glycol 305B flows through the removable copper pipe 301A that is an integral part of the hot loop 304B. The heat exchanger 301 contains a flow correction baffle 311, whose purpose is to reduce turbulence in the annulus spacing 301B as make-up water 315B transverses the annulus spacing 301B of the heat exchanger 301.

An independent cold loop 313 may comprise PVC piping, a cold loop pump 313A to circulate the make-up water through the cold loop piping, an ultrasonic sensor 309A to monitor the make-up water flow-rate, and a cooling tower probe 310, where the make-up water can be treated to reduce unwanted material, such as calcium carbonate deposits, on the removable copper pipe. The probe 310 may be a probe described herein that includes immersible elements or coils, such as probes 160, 160b, 260, 2601, 4601 for example and may be part of a "smart" probe control system or part of an integrated device described elsewhere herein. The cold loop piping carries make-up water from the outlet of the make-up water tank 315 through the annulus spacing of the heat exchanger 301 such that the make-up water flow direction is counter to the flow direction of the propylene glycol flowing in the removable copper pipe 301A within the heat exchanger 301. The cold loop piping also contains two thermocouples 302C and 302D installed immediately before the cold piping connects to the heat exchanger 301 and immediately after the heat exchanger 301 to measure make-up water temperature entering and exiting the annulus spacing of the heat exchanger 301, respectively.

A small secondary mixing loop 329 exists within the cold loop piping with electronic shut-on/off valves to facilitate mixing of the make-up water prior to the start of testing. At the start of any test, the electronic shut-on/off valve 303C is closed and electronic shut-on/off valve 303B is opened to facilitate the mixing of calcium chloride and sodium bicarbonate, necessary to produce calcium carbonate (scale) which precipitates out of mineralized water in cooling tower systems.

The make-up water tank 315 may be located between pump 313A, mixing loop 329 and the electric chiller 324. All three sub-systems, namely the make-up water tank 315, mixing loop 329, and pump 313A may be connected via PVC piping 326 to the heat exchanger 301. An electric chiller coil 320 connected to the electric chiller 324 may be provided within the make-up water tank 315 to maintain and control temperatures between 15 degrees centigrade and 35 degrees centigrade.

Figure 4A:
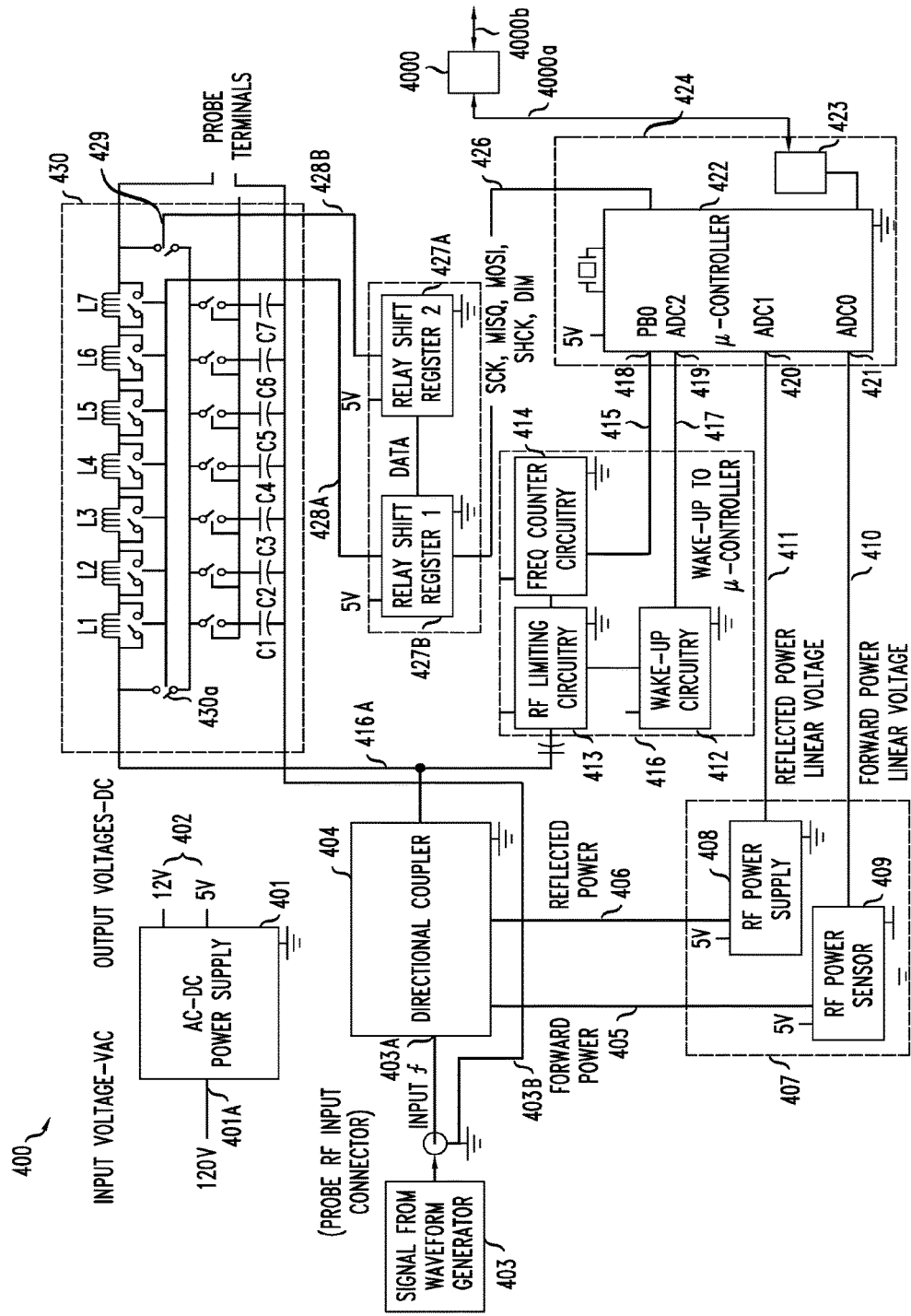
FIG. 4A depicts a block diagram of a smart probe control system according to one embodiment.

A liquid treatment system comprising, for example, an inventive waveform generator 314 and an inventive probe 310 (i.e., one of the generators and probes described elsewhere herein) connected by a 50 Ohm coaxial transmission cable 312 and impedance matched by an impedance matching control system, such as system 400 in FIG. 4A, may be used to treat liquid in the system 300 that contains unwanted material, such as calcium carbonate (scale).

A computer or other computing device 323 may be connected through a universal serial bus port, for example, to a port concentrator 322 to collect data related to pH, conductivity, hot temperature in, hot temperature out, cold temperature in, cold temperature out, and flow-rate, for example. This data may be used to compute a fouling resistance (delta-T measurement) of calcium carbonate, for example, that precipitates out of the make-up water 315B and adheres to the removable copper pipe 301A within the heat exchanger 30 (see FIGS. 4B and 4C, and related discussion).

A flow meter 309B and its ultrasonic sensor 309A may be located between the probe 310 and thermocouple 302C. A TDS/conductivity meter 318 may be positioned in make-up water tank 315 to measure the TDS levels/conductivity of the make-up water 315B. A temperature-compensated pH sensor or meter 316 may be positioned in the make-up water tank 315 to measure the pH levels of the make-up water 315B.

An electric mixer 321 may be used to mix make-up water 315B prior to the start of testing in order to stabilize the pH and conductivity of the make-up water. The electric mixer 321 may be switched off after stabilization of pH and conductivity has been achieved.

Two heating elements 319A, 319B within the make-up water tank 315 may be used to raise the temperature of the make-up water during the mixing phase of calcium chloride and sodium bicarbonate to aid in achieving faster pH stability necessary to start a test.

It should be noted that the design of the heat exchanger, type of heat exchanger material, the amount of fouling resistance (e.g., scale) on the removable copper pipe of the heat exchanger, and the characteristics of the make-up water (conductivity, pH, temperature, etc.) may determine the total overall heat exchanger coefficient. The fouling resistance may be determined by measuring and calculating the heat transfer coefficient between the hot propylene glycol solution and the removable copper pipe 301A (heat surface) of the heat exchanger 301, measuring and calculating the heat transfer coefficient between the heat exchanger 301 and the make-up water 315B, the thickness of the removable copper pipe 301A, and the thermal conductivity of the removable copper pipe 301A.

In order to test the operation of devices 314 and 310 to treat liquids in system 300 that contain unwanted materials, it is first necessary to establish conditions that create such unwanted materials in the liquids, and then apply the inventive devices (e.g., devices 310 and 314), systems and methods described herein to such liquids. For example, as a starting test parameter, it is desirable to include or otherwise form about 2000 parts per million (ppm) of calcium carbonate precipitate in the make-up water 315B. Such an amount of calcium carbonate is typically found in cooling tower make-up water and is thought to be conducive to the growth of scale over time.

Once the amount of calcium carbonate (and associated, desired pH level) is obtained, it is believed that the make-up water 315B can be circulated through the system 300 for about 7 to 14 days with inventive devices (probe and generator), such as devices 310 and 314, turned off in order to grow scale (calcium deposits). As the make-up water 315B is circulated through the system 300 over the 7 to 14-day period, the pH level, flow rate and TDS level/conductivity of the make-up water can be monitored. If unwanted material (e.g., scale) is growing in the system 300, it is expected that the measured TDS levels and flow rates should decline over time. To determine whether scale, for example, is accumulating on the removable pipe 301A, the removable copper pipe 301A can be visually inspected through the quartz tube 328, or it can also be removed and visually inspected.

Further, once the growth of unwanted material, such as scale, has been confirmed the probe 310 may be operated to produce and apply various types of electromagnetic fields described elsewhere herein in conjunction with generator 314 (and control system 400 in FIG. 4A) to determine the optimum electromagnetic fields and application methods for removing unwanted materials in the system 300. For example, similar to the initial conditions described above, if the probe 310 is removing scale, the measured TDS levels and water flow rates should rise over time. As before, the removable copper pipe 301A can also be removed and/or visually inspected through the quartz tubing 328 to confirm that any existing scale build-up is being reduced.

Once test conditions for growing unwanted materials (e.g., scale) have been established, the system 300 can be initialized under similar conditions with the probe 310 and generator 314 activated and no unwanted material present. The system 300 may be run for 7 to 14 days, for example. If the system 300 is successfully treating unwanted material (e.g., preventing the growth of unwanted material, such as scale) then the water TDS levels and flow rates measured over the 7 to 14-day period should remain essentially constant, or should decline at a slower rate than they did in the initial 7 to 14-day period described above.

The experiments described above and herein may be repeated at various water pH levels, temperature, conductivity, flow rates and/or mineral content in combination with various types of electromagnetic fields and electromagnetic field application methods in order to determine the optimum protocols to treat a liquid that contains unwanted materials, in particular scale, under various water conditions. In addition, various probe designs, materials and placements (i.e., the position in a water system where a probe is connected) can be tested to determine optimum probe designs, materials and placements for the treatment of a liquid that contains unwanted materials, in particular, scale. By way of further example, the inventive systems described herein (including the exemplary experimental set-up) may be used to test the viability of treating a liquid that contains unwanted material under various conditions using various combinations and types of electromagnetic fields, electromagnetic field application methods, probe designs, materials and/or probe positions.

Referring now to FIGS. 3C through 3F, there is depicted an electromagnetic waveform generator 600 ("generator" for short) according to an embodiment of the invention. By way of example, and comparison with generator 114 in FIG. 2A, the generator 600 may have three RF outputs ports 625-1, 625-2, 625-3 (A, B, and C), each having a power rating of 500-1000 watts, and a DC output port 625-4 (port D). Output ports A, B and C may output signals having a frequency that falls within a frequency band of 1.8 MHz to 54 MHz (including a preferred frequency of 40.68 MHz), include multiple types of modulated waveforms of 1 Hz to 1000 Hz, and may be configured as a fixed output impedance (e.g., 50-ohm). The generator 600 may be impedance matched to an inventive probe 310 described herein utilizing a control system, such as system 400 in FIG. 4A. Because the generator 600 may be impedance matched (i.e., its ports may be so matched) with an inventive probe it may provide optimum results as well as operate in a more energy (power) efficient manner than an unmatched generator and probe due to a reduction in so-called "reflected energy" (power) described in more detail below with respect to FIG. 4A. The generator 600, as well as the other components depicted in FIGS. 3A through 3F may be separated from other inventive probes, or, alternatively, may be combined with several probes to form an integrated device such as those devices depicted in FIGS. 2H and 3G through 3L.

In one embodiment, to treat a liquid that contains unwanted material the generator 600 may output a 48 volt, direct current (DC) output level from Port D (625-4) to generate a steady state electric field or magnetic field, an AM or FM modulated carrier frequency of 40.68 MHz on output ports 625-1, 625-2, 625-3 (ports A, B and C, in which Port A and B may output signals that are in phase, and Port C may output a signal that is 180 degrees out of phase when compared to Port B) for example, to an inventive probe 310 and associated immersible elements or coils described herein (e.g., probes 160, 160b, 260, 2601, 4601, and 5600) via a 50-ohm coaxial transmission cable. The generator 600 may include an AC to DC power supply module 616, three RF power and preamplifier modules 622-1, 622-2, 622-3, and 623-1, 623-2, 623-3, respectively, three detector directional couplers 624A-1, 624A-2, and 624A-1, three low pass filters 624B-1, 624B-2, and 624B-3, an RF current sampler module, a microcontroller 621 and a signal or waveform generating module (the words "module", "circuitry", "circuit" and "components" may be used interchangeably herein).

In an embodiment, the generator 600 may further comprise voltage/current generation circuitry, thermal management circuitry, RF protection circuitry, a microcontroller, signal or waveform generation circuitry, and thermal protective components to name just a few of the major components.

The generator 600 may include additional circuitry or components but the additional circuitry and components are known to those skilled in the art.

The AC to DC power supply module 616 may be operable to accept AC power at an input 620. A metal oxide varistor (MOV) 619 may be connected in parallel between the phase and the neutral conductors to protect the generator 600 from electrical surges, voltage dips, variations, and brownout conditions. To reduce conducted emissions produced by the generator 600 from AC power sources, electromagnetic interference (EMI) filter 618 may be operable to attenuate the conducted emissions to comply with the Federal Communications Commission commercial regulated Class A limits. The phase and neutral conductors from the EMI filter 618 may be connected to the AC power supply 616. The AC power supply 616 may be configured to accept 120-240 Volts ("V") AC power and convert it to 48V/45 Amps ("A") DC power. The power supply 616 may be connected to an On/Off switch in order to interrupt the supply of 48V DC power to the DC-to-DC circuitry 602 as needed.

The DC-to-DC circuitry 602 may be operable to generate 15V/1.5 A, 12V/5 A, 5V/1.5 A, −5V/1.5 A, 3.3V/0.5 A and 1.8V/0.5 A and supply such voltages and currents to power subsystem circuitry. The DC-to-DC circuitry 602 may include a limiter operable to limit an "in rush" current from the power supply 616 at start-up to 6.7 A, and limit an operating current to 45 A during normal operating conditions. Under and over-voltage circuitry may be operable to protect sensitive subsystem components such as the RF pre-amplifiers 623-1, 623-2,623-3 and RF amplifiers 622-1, 622-2. 622-3 modules. The 48V and 15V power source may supply power to the RF power amplifiers 622-1, 622-2, and 622-3 and RF pre-amplifiers 623-1, 623-2, 623-3 modules, respectively. The modules 622-1, 622-2, 622-3, 623-1, 623-2, and 623-3 may be switched on and off with an optoisolated switch 610 controlled by the DC-to-DC circuitry 602.

The DC-to-DC circuitry 602 may also be connected to fan circuitry 628A-1, 628A-2, 628A-3, 628B-1, 628B-2, 628B-3 where each circuitry includes an amplifier and fan. The amplifiers receive signals from circuitry 609, for example, to control corresponding fans. The amplifiers making up the fan circuitry 628A-1, 628A-2, 628A-3, 628B-1, 628B-2, 628B-3 may be mounted, for example, on a heat sinks 627-1, 627-2, 627-3, respectively. The fans making up the fan circuitry may be operable to exhaust or otherwise remove heat emanating from the heat sinks 627-1, 627-2 and 627-3 and provide a high-temperature lockout condition signal to the microcontroller 621. The microcontroller 621 may be operable to control the removal of, or disconnection of, electrical power to the generator 600 in order to protect the generator 600 from overheating (thermal damage) upon receiving a high-temperature lockout condition signal. Thermal sensing may be provided by a 5 kΩ negative coefficient thermistor (temperature sensor) that may be mounted on the heat sinks 627-1, 627-2, and 627-3. Comparators (not shown in the figures) may be used as a part of monitoring circuitry to monitor the temperature sensors 612-1, 612-2, and 612-3. The first comparator may be operable to turn the fans a part of fan circuitry 628A-1, 628A-2, and 628A-3, 628B-1, 628B-2, and 628B-3 "ON" whenever, for example, the temperature of a sensor rises to approximately 110° F., and turn the fans a part of fan circuitry 628A-1, 628A-2, 628-3, 628B-1, 628B-2, and 628B-3 "OFF" when the temperature of a sensor drops by approximately 5 degrees. A resistor may be used to introduce a small difference in temperature in order to allow enough heat to be drawn away from the heat sinks 627-1, 627-2, and 627-3 so that the fans a part of fan circuitry 628A-1,628A-2, 628a-3, 628B-1, 628B-2, and 628B-3 will not stutter "ON" and "OFF" as heat stored in the core of the heat sinks 627-1, 627-2, and 627-3 travels to the sensor mounted on the surface of the heat sinks 627-1, 627-2, and 627-3. The microcontroller 621 may be operable to store, or control the storage of, such temperatures.

The generator 600 may comprise three detector directional couplers 624A-1, 624A-2, and 624A-1, low pass filters 624B-1, 624B-2, and 624B-3, and RF current sampler modules 624C-1, 624C-2, and 624C-3 where one of each is installed on a respective heat sink 627-1, 627-2, and 627-3. Three outputs, namely forward power, reflected power and RF current may be conditioned or filtered by low pass filter circuitry 611 and digitized upon input into an analog to digital converter input of the microcontroller 621. As explained in more detail elsewhere herein, the microcontroller 621 may be operable to compute a voltage standing wave ratio (VSWR) and provide a VSWR lockout signal to (i) enable the amplifiers 623-1, 623-2, and 623-3 during startup, (ii) disable the amplifiers 623-1, 623-2, and 623-3 based on detection of a high VSWR, or (iii) disable the amplifiers 623-1, 623-2, and 623-3 during shut-down. The microcontroller 621 may be operable to provide a VSWR lockout signal upon detection of a 3 to 1 VSWR condition. The lockout signal may be used to prevent damage to the amplifiers 623-1, 623-2, and 623-3 due to the buildup of excessive heat caused by higher VSWR values. Higher VSWR values equate to higher reflected power values, which will ultimately damage the amplifiers 623-1, 623-2, and 623-3. Conversely, lower VSWR values will not damage the amplifiers 623-1, 623-2, and 623-3, and will lead to better energy efficiencies because substantially all or most of the energy (power) will be transferred to the liquid and will improve the treatment.

The microcontroller 621 may be an Atmel microprocessor, for example, that includes digital input and output ports, analog to digital converter input ports, onboard memory 601, a serial peripheral interface (SPI) bus 629 and a universal serial bus (USB) port 630.

The generator 600 may further include a high frequency (HF) synthesizer 604 operable to generate sinusoidal carrier signal(s) from 10 Hz to 50 MHz, for example. Each signal may be input into a frequency multiplier 605 to produce a 20 Hz to 100 MHz carrier signal (i.e., an increase in frequency). A programmable signal generator 603 may be operable to generate pulse, sinusoidal, square and triangular waveforms, for example, in order to modulate the carrier from 1 Hz to 1000 Hz. The multiplied output of the high-frequency synthesizer and the output of the programmable signal generator 603 may be combined by the operational amplifier 606 functioning as a modulator. The operational amplifier's modulated output may be fed into variable gain amplifier 607. The amplifier 607 may be operable to generate and output a 50-ohm, modulated frequency carrier signal with a 0 dBm power level, and a −0.25/+0.25 Vpp adjustable offset level with a modulation adjustment depth up to 100%. The output of the variable gain amplifier 607 may be connected to an input port of the pre-amplifiers 622-1, 622-2, and 622-3.

The microcontroller 621 may be further operable to control the operation of the signal generator 603 and synthesizer 604 in order to set and adjust the carrier frequency, the percentage of modulation, modulation frequency, modulation waveform, output gain and offset levels, for example.

Each of the pre-amplifiers 622-1, 622-2, and 622-3 may comprise a low noise amplifier with a 50-ohm input impedance port and 50-ohm output impedance port operating at 15V/1 A. Each of the pre-amplifiers 622-1, 622-2, 622-3 may be operable to receive a maximum RF input power level of 0 dBm and output a maximum output power of 5 watts.

An output port of a pre-amplifier 622-1, 622-2, and 622-3 may be connected directly to an input port of an amplifier 623-1, 623-2, and 623-3, respectively, enabling an amplifier 623-1, 623-2, and 623-3 to produce 1000 watts of RF power. Each of the amplifiers 623-1, 623-2, and 623-3 may be a 500-1000 watts broadband pallet amplifier operating at 48V/45 A, with a 50-ohm input impedance port and a 50-ohm output impedance port. In one embodiment, each of the amplifiers 623-1, 623-2, and 623-3 may comprise a RF power MOSFET transistor providing high gain RF output power in a small footprint. Each of the amplifiers 623-1, 623-2, and 623-3 may include advanced thermal tracking bias circuitry allowing an amplifier 623-1, 623-2, and 623-3 to operate with a stable gain over wide temperatures for sustained periods of time. The output of each of the amplifiers 623-1, 623-2, and 623-3 may be connected to the input port of a respective detector directional coupler 624A-1, 624A-2, 624A-3.

In one embodiment each of the detector directional couplers 624A-1, 624A-2, 624A-3 may comprise a combination of RF detectors and a directional coupler. Each of the directional couplers 624A-1, 624A-2, 624A-3 may be a four-port, quarter-wavelength, coaxial coupler. The four ports may comprise input, output, forward power and reflected power ports. The forward and reflected power output ports of each of the directional couplers 624A-1, 624A-2, 624A-3 may be connected to two, true power RMS RF power detector sensors. The RF power detector sensors may be operable to provide both forward and reverse power linear voltages to the conditioning circuitry 611, and then to analog-to-digital converter inputs of the microcontroller 621, where such inputs may be used to compute a VSWR (and, if necessary a VSWR signal).

Each of the low pass filters 624B-1, 624B-2, 624B-3 may comprise a 5 pole Chebyshev filter, for example. Each of the low pass filters 624B-1, 624B-2, 624B-3 may be operable to attenuate substantially all harmonics of a carrier frequency above 41 MHz in order to comply with the Class A radiated limits of the Federal Communications Commission's rules and regulations.

Each of the RF current sampler circuits 624C-1, 624C-2, and 624C-3 may be operable to sample the RF current on a transmission line and transform the sampled current to a desired current. Each of the RF transmission lines 622A-1, 622A-2, and 622A-3 from a respective amplifier 622-1, 622-2, 622-3 is the primary side fed through a wire wound ferrite toroidal coil, while the wound coil is the secondary side of the current transformer. An output signal from a wound toroidal coil may be conditioned by circuitry 611 and then sent to the analog-to-digital converter input port of the microcontroller 621, where the analog signal is digitized, and its value stored. The microcontroller 621 may be operable to monitor RF current values to protect against electrolysis of the cooling tower piping. For example, a current of more than 2A may cause pinholes (leaks) on cooling tower piping. Accordingly, if the microcontroller 621 makes a determination that an RF current is greater than 2A, the microcontroller 621 may be operable to reduce an amplifier's 622-1, 622-2, 622-3 RF power (reduce the current) in an effort to protect against electrolysis.

As indicated above, thermal protective components, comprising heat sinks 627-1, 627-2, 627-3, copper heat sink spreader 628, and fans 628A and 628B-1, 628B-2, and 628B-3 may be used to remove heat generated by the pre-amplifier and amplifiers 622-1, 622-2, 622-3,623-1, 623-2, and 623-3, respectively.

While generator 600 and one or more of the other components in FIGS. 3A through 3F (as well as FIG. 4A discussed below) may be implemented as separate devices that may be connected to an inventive probe described herein via a length of cable or conductor. Such a generator, smart probe control system and components may also be combined with an inventive probe to form an integrated device. Referring now to FIGS. 3G to 3L there are depicted integrated devices according to embodiments of the invention.

Figure 3G:
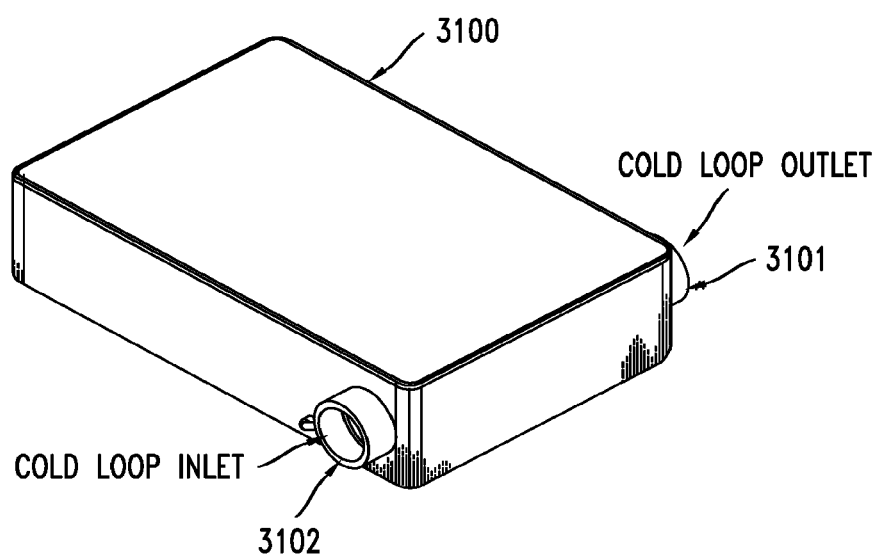

In FIG. 3G an integrated device 3100 comprising a combination of a probe, generator and smart probe system (the later described in more detail below with respect to FIG. 4A) is shown. The integrated device 3100 may be operable to receive a fluid, such as water, via an inlet or opening 3101 and discharge or otherwise output the same fluid via outlet or opening 3102. It should be understood that the depicted location of the openings 3101, 3102 is merely exemplary and that other locations may be selected. Further, the function of each opening 3101,3102 (i.e., inlet versus outlet) may be reversed. Yet further, though only a single inlet and outlet are show, it should be understood that more than one inlet and/or outlet may be used. In one embodiment, the fluid entering the device 3100 may be used to control the temperature of the components that are a part of the device 3100 (e.g., cool the components), such as low pass filters and amplifiers.

Figure 3H:
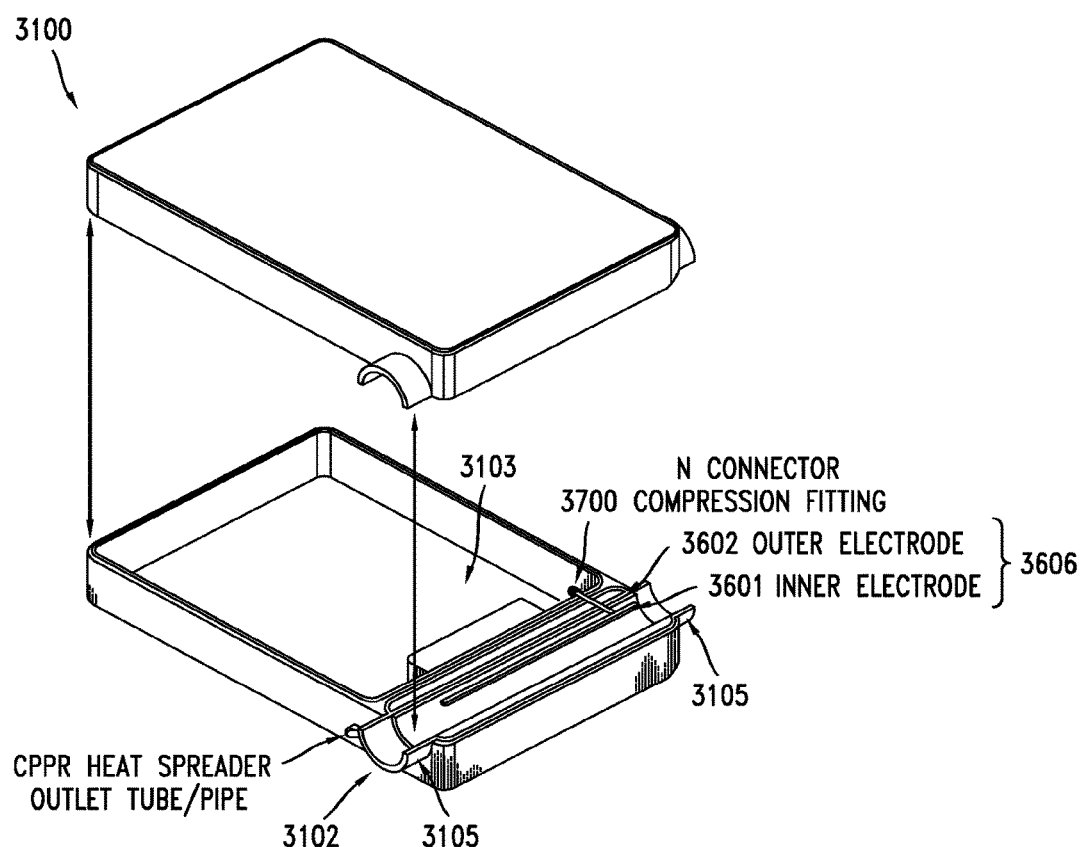
Figure 3J:
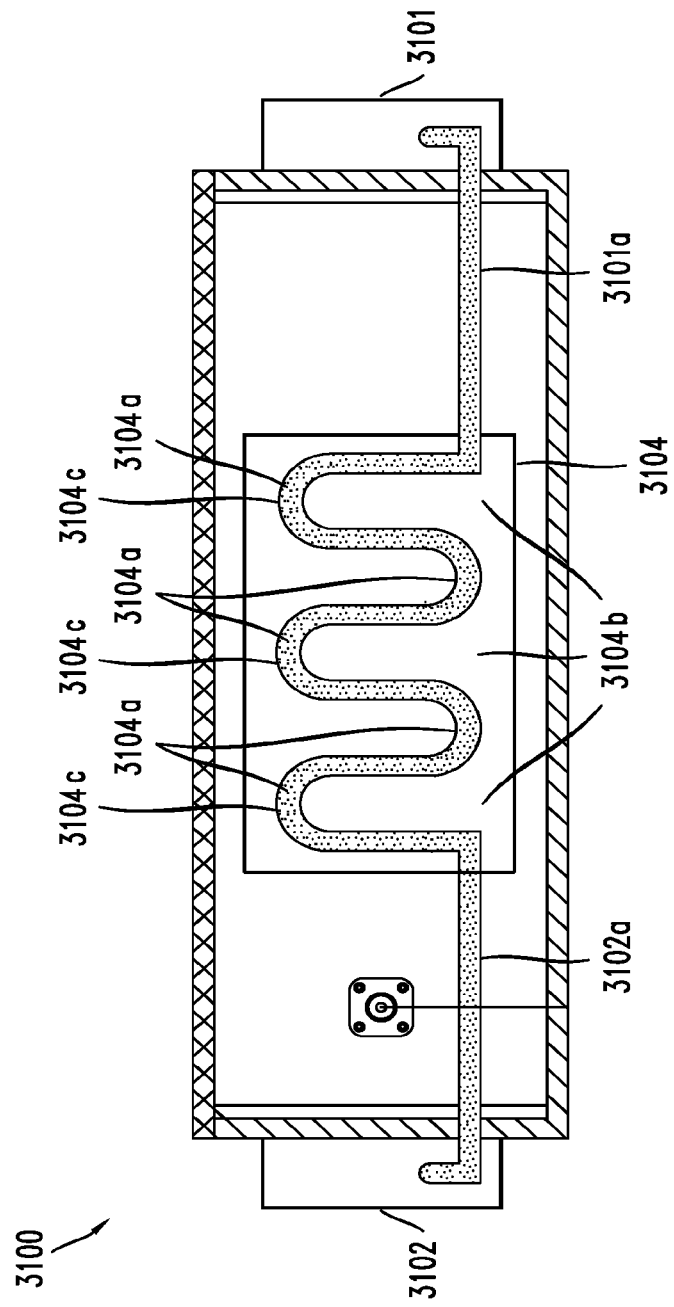

Referring now to FIG. 3H there is depicted another view of the device 3100 shown in FIG. 3G. As shown the device 3100 includes a section 3103 for positioning a (i) generator, such as generator 600 and (ii) other components described in FIGS. 3A through 3F, such as a power supply, couplers, low pass filters, amplifiers and fans and (iii) a smart probe control system described in FIG. 4A, for example, to name just a few of the components that may be positioned within section 3103. For the ease of understanding, the generator, additional components and smart probe control system are not shown in FIG. 3H though it should be understood that they all may be positioned within section 3103.

In the embodiment depicted in FIG. 3H the integrated device 3100 may comprise a probe 3600 such as probe 260 shown in FIGS. 2E through 2G though it should be understood that alternative probe designs may also be used.

Similar to device 260 shown in FIGS. 2E through 2G, probe 3600 may comprise immersible coaxially aligned, cylindrical structures 3601, 3602 enclosed within a housing 3105. The housing 3105 may comprise a 303-stainless steel material, for example. As depicted the probe 3600 comprises an inner cylindrical structure 3601 and an outer cylindrical structure 3602.

In more detail, the outer structure 3602 may comprise an immersible, horizontally aligned stainless steel cylindrical tube made of 303-stainless steel material, for example, hereafter referred to as the positive element while the inner structure 3601 may comprise an immersible, horizontally aligned stainless steel cylindrical rod made of 303-stainless steel material, for example, referred to hereafter as the negative element. As shown structures 3601, 3602 may be coaxially aligned with one another.

A combination connector/compression fitting 3700 is shown connecting the inner structure 3601 to the outer structure 3602 and secured to the housing 3105. To insure that no liquid leaks into the section 3103 the fitting may be a compression type fitting. In one embodiment the fitting 3700 may comprise a 50 Ohm, N-type connector and compression fitting, for example.

The probe 3600 may operate similar to the operation of probe 260 described elsewhere herein to treat unwanted materials in a liquid, such as water.

In the embodiment depicted in FIG. 3H the device 3100 may further comprise a heat sink 3104. As described in more detail below, the heat sink 3104 may be operable to remove heat from an integrated generator, components associated with the generator and a smart probe control system positioned within section 3103. For example, when one surface of the heat sink 3104 is adjacent to an RF amplifier positioned within section 3013 (e.g. amplifier 623 described earlier; not shown in FIG. 3H), the heat sink 3104 may be operable to conductively remove heat from the RF amplifier.

FIGS. 3I through 3L depict additional views of the device 3100 along with the heat sink 3104. In FIG. 3I the heat sink 3104 is shown as comprising a hollow passageway 3104a formed within a body 3014b of the heat sink 3104. The passageway 3104a is connected to inlet 3101 via inlet piping 3101a on one end and outlet 3102 via outlet piping 3102a on the other end to allow a liquid, such as water, to flow into and through the heat sink 3104 via the passageway 3104a. In accordance with embodiments of the invention, heat from components positioned within section 3103 (again, not shown in FIG. 3I) may be conducted away from such components to one surface of the heat sink 3104. The heat flows conductively through the heat sink body 3104b until it reaches a second, inner surface of the body 3104b that forms the surface of hollow passageway 3104a. The liquid flowing through the passageway 3104a comes in contact with the heated surface and functions to remove the heat away from the surface as it flows through the passageway 3104a.

In the embodiment shown in FIG. 3I the passageway 3104a may be formed as a plurality of rectangular shaped cavities 3104c though this is merely exemplary. Other shapes, such as oval cavities (see FIG. 3J), and triangular cavities (see FIG. 3K) may be used to name just a few of the many additional types of cavities provided by the present invention. In addition, the cavities may be oriented such that liquid flows through the heat sink 3104 in a direction that is substantially perpendicular to openings 3101,3102 (FIGS. 3I through 3K) or in a direction that is substantially parallel to the openings 3101, 3102 (see FIG. 3L). It should be understood that the passageway 3104 may comprise one or more connected passageways, and that the overall shape and orientation of the passageway 3104a may vary and may take many different forms in accordance with desired heat transfer parameters of a particular device. The heat sink 3104 may be formed from many different materials. For example, in one embodiment the heat sink 3104 may be formed from copper or a copper alloy.

As indicated above, the heat sink 3104 acts to remove heat from components within section 3103 thereby extending the life of such components that may be damaged if the temperature exceeds certain thresholds. Further, the heat sink 3104 extends the life of other components within section 3103 that may not necessarily be damaged by such temperatures, but may be unnecessarily overworked in the absence of heat sink 3104. For example, in embodiments of the invention fans (e.g. fans that are a part of circuitry 628A-1, 628A-2, and 628A-3, 628B-1, 628B-2 and 628B-3 described earlier) may be included with section 3103 to direct air over and around components within section 3103 to aid in controlling the temperature of such components. In embodiments of the invention, such fans may be operable to force air over and around such components upon receiving appropriate signals from a controller (not shown in FIG. 3I) and/or from thermocouples attached to the heat sink 3104 (also not shown in FIG. 3I).

In more detail, one or more thermocouples attached to heat sink 3104 may be operable to detect a change in the surface temperature of the heat sink 3104 due to a change in temperature of components positioned within section 3103. Upon detecting a certain threshold temperature or range of temperatures the thermocouple(s) may be operable to output a signal to the fans or to a controller that controls the fans. Upon receiving the signal the fans may be operable to turn ON or OFF as the case may be depending on the signal received. In one embodiment, upon detecting a first, high temperature threshold of the heat sink 3104 the thermocouple(s) and/or controller may be operable to output one signal instructing the fans to turn ON. Alternatively, or in addition to such operation, in yet another embodiment, upon detecting a second, low temperature threshold of the heat sink 3104 the thermocouple and/or controller may be operable to output one signal instructing the fans to turn OFF (e.g., when the components within section 3103 cool down). In this manner the fans will only operate in an ON mode upon detection, and maintenance, of a certain, unacceptable temperature by the combination of thermocouples, heat sink and/or controller. Otherwise the fans will remain in an OFF mode and/or be placed into such a mode when a detected temperature drops below a threshold. In this manner, the fans need not operate all the time during periods when they are not needed, thus extending the operational lifetime of the fans.

Due to the ability to remove heat from components inside the device 3100 it can be said that the device 3100 comprises a temperature controlled, integrated probe and generator.

Figure 3M:
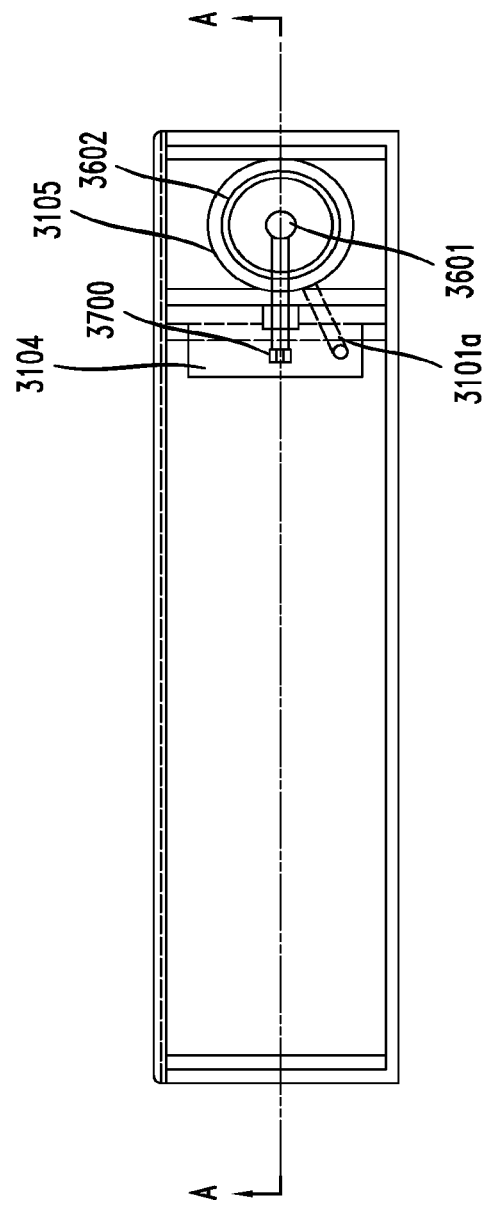
Figure 3N:
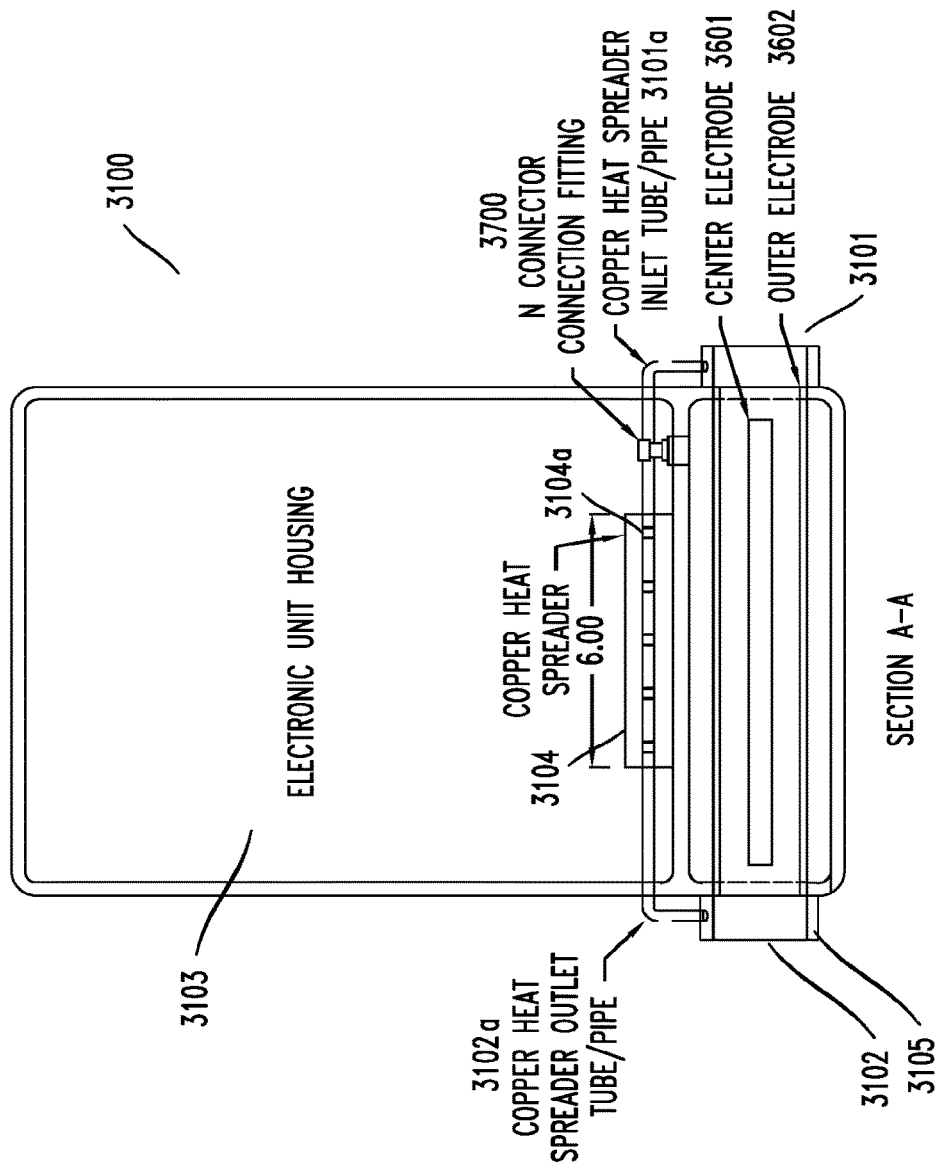

Turning now to FIGS. 3M and N there is depicted additional views of the device 3100. FIG. 3M depicts a side view of the inner and outer electrodes 3601, 3602, fitting 3700, heat sink 3104 and associated piping 3101a to name just a few of the components shown in FIG. 3M. FIG. 3N depicts a view A-A taken from FIG. 3M.

The discussion above has focused on describing probes where either the electric field is dominant or the magnetic field is dominant. However, as mentioned briefly before in describing probe 4601, the present inventors also provide probes using both dominant electric and magnetic fields. We now turn to a more detailed description of such "multi-field" probes.

Referring back to FIGS. 2J, 2L and 2N, there is depicted a dual-field probe 4601 according to an embodiment of the invention. As depicted the probe 4601 comprises a be section 4601a that is operable to generate a dominant magnetic field (sometimes referred to as a "magnetic field dominant probe section") and a section 4601b that is operable to generate a dominant electric field (sometimes referred to as an "electric field dominant probe section"). As explained in more detail herein, the combination of an applied electric field generated and applied by section 4601b and a magnetic field generated and applied by section 4601a is believed to create Lorentz type forces. It should be understood that Lorentz type forces are believed by the inventors to be created and applied by all of the probes described herein, whether electric field probes, magnetic field probes or dual-field probes. However, the inventors believe that dual-field probes create and apply the most effective Lorentz type forces that can be used to treat unwanted material in a liquid. When such forces are applied to ions, such as $CaCO_3$, within a liquid (water) passing through probe 4601 such forces are believed responsible for keeping the ions soluble in the liquid.

In one embodiment, the magnetic field dominant probe section 4601*a* may be similar in structure and operation to probe 2601 while the electrical field dominant probe section 4601*b* may be similar in structure and operation to probe 260, for example.

Probe section 4601*a* may be configured to receive output signals 2661*a*, 2662*a*,*b* and 2663*a*,*b* (See FIGS. 2J, 2L and 2N) from generator 2660 while probe section 4601*b* (and its associated, immersible coils) may be configured to receive signals 2661*b* from generator 2660. Upon receiving such signals the magnetic field dominant probe section 4601*a* (and its associated, immersible coils) may be operable to generate an electromagnetic field having a dominant magnetic field and apply such a field to a liquid passing through the associated, immersible coils of probe 4601 to treat unwanted material in the liquid while, in addition, the electric field dominant probe section 4601*b* (and its associated, immersible, cylindrical elements, for example) may be operable to generate an electromagnetic field having a dominant electric field and apply such a field to a liquid passing through the associated, immersible elements of probe 4601 to further treat the unwanted material.

Regardless of the type of probe section in embodiments of the invention, each of the signals 2661*a*, 2661*b*, 2662*a*,*b* and 2663*a*,*b* supplied by the generator 2660 (or another type of generator described herein) to the probe sections 4601*a*,*b* and their associated, immersible elements or coils may include a variable modulation frequency that corresponds to the ionic cyclotron frequency of a mineral, such as calcium. Accordingly, the electric or magnetic fields created and applied by sections 4601*a*,*b* to the liquid passing through probe 4601 may be similarly modulated.

The generator 2660 may provide the magnetic field dominant section 4601*a* with a uniform or steady-state signal depending on how the generator 2660 is connected to the section 4601*a*. In particular, which ports 1, 2, 3 or 4 of section 4601*a* are connected to which port B, C or D of the generator 2660 and what type of signal is provided by a port B, C or D to each so-connected port 1, 2, 3 or 4 of section 4601*a*.

In one embodiment, the signals output by the generator 2660 via ports B and C are in-phase. Accordingly, in one embodiment the generator 2660 may be operable to output or otherwise provide a uniform time-varying signal via ports B and C having an output power up to 500 watts.

As depicted the generator 2660 may also be connected to the dominant electric field section 4601*b* via port A. In an embodiment, the generator 2660 may output or provide a time-varying signal via port A to section 4601*b*, where the signal has a power of up to 500 watts.

Yet further, the generator 2660 may output or otherwise provide a steady-state signal (e.g., a DC signal) via port D. When the generator 2660 is connected to dominant electric field section 4601*b* via port A (and port 5 on section 4601*b*) a steady state electric field is produced by the elements of section 4601*b*. When the generator 2660 is connected to dominant magnetic field section 4601*a* via port D (and ports 2,3 on section 4601*a*) a steady state magnetic field is produced by the coils of section 4601*a*.

In embodiments of the invention, ports A through D of the generator 2660 may be connected to ports 1 through 5 of probe 4601 using 50-ohm impedance, coaxial transmission line cables 2700, for example.

In embodiments of the invention, ions of an unwanted material, such as $CaCO_3$, in a liquid (e.g., water) pass through the probe 4601 (or another probe described herein). When the liquid and its ions first enter the probe 4601 at opening 4602*a* the ions are subjected to the applied electric field created by the dominant electric field section 4601*b*. In embodiments of the invention that utilize a dominant electric field, such as section 4601*b*, the so applied electric field is believed to cause the ions to accelerate (i.e., speed up). Further, in those embodiments where a time-varying electric field is applied the ions are accelerated towards one of the immersible elements or coils (the exact path taken by a given type of ion is dependent upon the charge on the ion and the charge on a given element or coil, i.e., the ion is repulsed by a similar charge but attracted by an opposite charge). In embodiments of the invention, the charge applied to the immersible elements or coils may be alternated between positive and negative at a rate that is substantially equal to the frequency of the time-varying signal (e.g., 40.68 MHz or 40.68 million times per second). Accordingly, this rapidly changing charge on the elements or coils is believed to cause the ions in the liquid to be alternatively repulsed by, or attracted to, the elements or coils. Because the frequency applied to the elements or coils may be very high (again, 40.68 million times per second), the ions are caused to repeatedly and rapidly change direction (i.e., 40.68 million times per second). The net effect is believed to "confuse" the ions; that is, an ion is only able to move towards, or away from, a given element or coil for a very short period of time before its direction is changed when the charge (i.e., polarity) on an element or coil is changed. Because the ion is so confused it cannot move towards an element or coil it cannot adhere to the inner surface of the element or coil or to the inner surface of a pipe, conduit or other passageway that is connected to the probe 4601 as the ion accelerates out of the probe 4601.

In an embodiment of the invention, as an ion that is accelerated by the dominant electric field section 4601*b* traverses the probe 4601 it may pass through to the magnetic field dominant section 4601*a*. Accordingly, the ion begins to feel the effect of the applied magnetic field from section 4601*a*. In accordance with embodiments of the invention the applied magnetic field from section 4601*a* (and other magnetic field dominant probes described herein) is believed to cause the ion to vibrate or otherwise move in a spiral, helical or cycloid motion.

The resulting forces applied by the electric field and magnetic field in series as an ion passes through probe 4601 is believed to act on the ion so that it remains soluble in a liquid. Such soluble ions, such as $CaCO_3$ ions (scale), are less likely to attach to the surface of pipes or heat exchangers in a water system.

Referring now to FIG. 2Q, there is depicted another dual-field probe 5600 according to an embodiment of the invention. As depicted the probe 5600 comprises a magnetic field section and an electrical field section. In contrast to the dual-field probe 4601 in FIGS. 2J through 2N, probe 5600 applies an electric field and a magnetic field in parallel (i.e., at the same time), while probe 4601 applies an electric field and magnetic field in "series" (one after the other). Accordingly, probe 5600 will be referred to as a parallel, dual-field probe while probe 4601 may be referred as a series, dual-field probe.

The combination of electric and magnetic fields is believed to create Lorentz type forces by coils 5605,5609 and elements 5610,5611. When such forces are applied to ions, such as $CaCO_3$, by coils 5605,5609 and elements 5610,5611 within a liquid (water) passing through probe 5600 such forces are believed responsible for keeping the ions soluble in the liquid.

In one embodiment, the magnetic field section may be somewhat similar in structure and operation to probe 2601. However, unlike probe 2601, probe 5600 comprises just immersible, radial coils 5610 and 5611, not axial coils. The electrical field section may be similar in structure and operation to probe 260, for example, in that the immersible elements 5605 and 5609 are cylindrically shaped.

The immersible, radial coils 5610 and 5611 may be configured as Helmholtz coils as described previously herein with respect to probe 2601 in FIG. 2H. The coils 5610,5611 may be connected to generator 2660 via 50 Ohm impedance, electrical conductors 2700, for example. The generator may output or otherwise provide signals 5661 via port B (for example) to the coils 5610,5611. Upon receiving such signals the coils 5610,5611 may be operable to generate an electromagnetic field having a dominant magnetic field and apply such a field to a liquid passing through the probe 5600 to treat unwanted material in the liquid.

The electric field section may comprise: a non-conducting cylindrical tube 5602 made of Delrin material, for example; an immersible, stainless steel cylindrical tube 5605 (e.g., a pipe) made of stainless steel material (e.g., 303-stainless steel), for example, hereafter referred to as the negative element; an immersible, cylindrical rod 5609 made of stainless steel material (e.g., 303-stainless steel), for example, referred to hereafter as the positive element. As shown immersible elements 5605, 5609 are coaxially aligned with one another. Elements 5605, 5609 may also be configured with respect to one another to reduce fringing effects.

The elements 5605, 5609 may be connected to generator 2660 via 50 Ohm impedance, electrical conductors 2700, for example. The generator 2660 may output or otherwise provide signals 5662 via port A (for example) to the elements 5605,5609. Upon receiving such signals the elements 5605,5609 may be operable to generate an electromagnetic field having a dominant electric field and apply such a field to a liquid passing through the probe 5600 at substantially the same time that the coils 5610,5611 are applying a dominant magnetic field in order to treat unwanted material in the liquid with both electric and magnetic fields. The resultant forces applied to material (e.g., mineral ions) in the liquid are Lorentz type forces described in more detail elsewhere herein.

The probe 5600 may further include a PVC spacer 5604 (e.g., 1 inch spacer) that is operable to insulate the magnetic field generated by coils 5610, 5611 from the negative electrode (e.g., metal pipe) 5605 used to generate the electric field. The spacer 5604 is further operable to minimize the coupling of the electric field generated using the electrode 5605 to the coils 5610,5611 to reduce attenuation of the magnetic field.

As depicted, the positive electrode 5609 may be configured to be positioned in the middle or center of the probe 5600 as well as traversing the length of the negative electrode 5605. Two 50 ohm input ports 5612,5613 are included in the probe 5600. Ports 5612,5613 may be connected to the ports A and B of the generator 2660. In embodiments of the invention the generator may be operable to output signals having a power of up to 500 watts, for example, via ports A and B, for example, that are input into ports 5612,5613 of the probe 5600.

In embodiments, the generator 2660 may output via ports A and B, and the probe may receive and input via ports 5612,5613 time-varying signals in order to create time-varying electric and magnetic fields that are applied to the liquid passing through probe 5600. Yet further, as described in more detail below, the time-varying signals applied to the liquid create induced signals as well. For example, the time-varying magnetic field created by coils 5610,5611 creates an induced electric field, and, conversely, the applied electric field created by elements 5605,5609 creates an induced magnetic field.

The signals 5661,5662 provided by the generator 2660 may further include a variable modulation frequency that corresponds to the ionic cyclotron frequency of calcium, for example. Thereafter, the time-varying electric or magnetic fields created by coils 5610,5611 or elements 5605,5609 and applied to the liquid passing through probe 5600 may be similarly modulated.

Also shown in FIG. 2Q are structural compression fittings 5603, 5606, O-rings 5601, and compression fitting 5607 for element 5609.

FIGS. 2R and 2S depict simplified electrical circuit diagrams for the probe 5600 shown in FIG. 2Q.

In FIG. 2R, an exemplary, simplified electrical diagram of device 5600 is depicted. In accordance with embodiments of the invention the radial coils 5610,5611 may be configured in a Helmholtz coil configuration. In the embodiment depicted in FIG. 2R, the immersible coils 5610,5611 and elements 5605,5609 may be connected to the broadband electromagnetic generator 2660. In more detail, the coils 5610,5611 and elements 5605,5609 may be connected to a particular port of the generator 2660 which we will refer to as "port B", it being understood that this designation is arbitrary and the inventors could use any number of different designations. As connected in FIG. 2R the generator 2660 may be operable to output a uniform, time-varying signal 5661 to the coils 5610,5611 and elements 5605,5609 respectively, to enable the coils 5610,5611 and elements 5605,5609 making up probe 5600 to produce a uniform, time-varying-magnetic field and a uniform time-varying electric field, respectively, at substantially the same time.

The so-generated and applied fields when applied to a liquid such as water, treats unwanted material in the water (e.g., prevents and or mitigates scale ($CaCO_3$)). The signal 5661 provided by the generator 2660 and applied to the coils 5610,5611 and elements 5605,5609 may include a variable modulation frequency that corresponds to the ionic cyclotron frequency of calcium. Thereafter, the magnetic field created by coils 5610,5611 and the electric field created by elements 5605,5609 that are applied to the liquid passing through probe 5600 may be similarly modulated.

Referring now to FIG. 2S there is depicted another exemplary, simplified electrical diagram of device 5600. In accordance with embodiments of the invention the immersible radial coils 5610,5611 may again be configured in a Helmholtz coil configuration. In the embodiment depicted in FIG. 2S, the coils 5610,5611 and elements 5605,5609 are again connected to the broadband electromagnetic generator 2660. However, the coils 5610,5611 and elements 5605, 5609 in FIG. 2S are connected to the generator 2660 differently than the coils and elements in FIG. 2R.

In more detail, the immersible radial coils 5610,5611 may be connected to port B of the generator while elements 5605,5609 may be connected to a different port, designated as port A, of the generator 2660. As connected in FIG. 2S the generator 2660 may be operable to output time-varying signals 5661,5662 that are in phase with one another Such in-phase signals, when applied to the coils 5610,5611 and elements 5605,5609 of probe 5600 may enable the coils 5610,5611 and elements 5605,5609 making up probe 5600 to produce time-varying fields that, when applied to a liquid such as water, treats unwanted material in the water. The signals 5661,5662 provided by the generator 2660 and applied to the coils 5610,5611 and elements 5605,5609 may include a variable modulation frequency that corresponds to the ionic cyclotron frequency of calcium, for example. Accordingly, the magnetic field created by coils 5610,5611 and electric field created by elements 5605,5609 and applied to the liquid passing through probe 5600 may be similarly modulated.

It should be noted that any given port of the generator 2660 may be in-phase, or out-of-phase with another port of the generator, though for dual-field probes the signals output by the generator 2660 will be in-phase, for example.

In embodiments of the invention, ions of an unwanted material, such as $CaCO_3$, in a liquid (e.g., water) pass through the probe 5600. When the liquid and its ions enter the probe 5600 the ions are subjected to both the electric field created by the elements 5605,5609 and magnetic field created by coils 5610,5611. In embodiments of the invention, the substantially, simultaneously applied electric and magnetic fields are believed to cause the ions to simultaneously accelerate (i.e., speed up) and vibrate or otherwise move in a spiral, helical or cycloid motion. The net result is that the ions remain soluble in the liquid.

A time-varying, constant electric field (e.g., constant amplitude) applied to the ions is believed to accelerate the ions towards one of the immersible elements or coils (the exact path taken by a given type of ion is dependent upon the charge on the ion and the charge on a given element or coil, i.e., the ion is repulsed by a similar charge but attracted by an opposite charge). In embodiments of the invention, the charge applied to the immersible elements or coils may be alternated between positive and negative at a rate that is substantially equal to the frequency of the time-varying signal (e.g., 40.68 MHz or 40.68 million times per second). Accordingly, this rapidly changing charge on the elements or coils in conjunction with its spiral-like movement is believed to cause the ions in the liquid to be alternatively repulsed from, or attracted to, the elements or coils. Because the frequency applied to the elements or coils may be very high (again, 40.68 million times per second), the ions are caused to repeatedly and rapidly change direction (i.e., 40.68 million times per second) as well as spiral haphazardly. The net effect is believed to "confuse" the ions; that is, an ion is only able to move towards, or away from, a given element or coil for a very short period of time before its direction is changed when the charge (i.e., polarity) on an element or coil is changed, and is caused to spiral. Because the ion cannot move towards an element or coil and is spiraling haphazardly, it cannot adhere to the inner surface of the element or coil or to the inner surface of a pipe, conduit or other passageway that is connected to the probe 5600 as the ion accelerates out of the probe.

In embodiments of the invention, the combined forces resulting from the electric and magnetic field applied to an ion by coils 5610,5611 and elements 5605,5609 are believed to create Lorentz type forces (F) given by the following relationship:

$F=q[E+(v \times B)]$, where (q), is the charge of a particular ion travelling with velocity (v), in the presence of an electric field (E) and a magnetic field (B).

The spiral or helical (cycloid) motion of ions (e.g., $CaCO_3$) is believed to be the result of an applied magnetic field that is modulating the ions at their ionic cyclotron frequency ($f_{ICF}$), which may be computed using the following relationship:

$$f_{ICF} = (z \cdot e \cdot B)/(2 \cdot \pi \cdot m)$$

where (z) is the number of positive or negative charges of the ions, (e) is the elementary charge, and (m) is the mass of the ions.

As seen from the above relationship, the ionic cyclotron frequency, $f_{ICF}$, is proportional to the magnitude of the generated magnetic field (B). As a result, the ionic cyclotron frequency $f_{ICR}$ will change if the magnetic field (i.e., amplitude) created and applied by coils 5605,5609 (or any set of coils described herein) is not held constant. Further, it is believed that in order to accelerate and helically spin ions, such as $CaCO_3$, at a desired frequency, the generated electric field (E) and magnetic field (B) must remain constant at all times. Yet further, because each of the electric field and magnetic field sections of a dual-field probe may be connected to their own impedance matching circuitry, the electric and magnetic fields are held constant despite the fact that the conductivity of a liquid, such as water, changes.

The resulting Lorentz type force, when applied to an ion passing through probe 5600, is believed to prevent the ion from becoming attracted to a surface of a pipe or heat transfer surface as well as prevent the ion from being attracted to another ion and, therefore, prevents ions from forming an aggregated mass of ions. Said another way, the ions remain dissolved or soluble in a liquid. If the ions are $CaCO_3$ ions (scale), such dissolved ions are less likely to form an aggregated mass and less likely to attach to the surface of pipes or heat exchangers in a water system.

In the discussion above it was indicated that the probe 5600 creates induced electrical and magnetic fields. In more detail, the total magnetic field, $B_{Tot}$, from Helmholtz coils 5610,5611 having a radius (r) produces an induced electric field ($E_{Induce}$) given by the following relationship:

$$E_{induce} = \tfrac{1}{2} \cdot B_{Tot} \cdot r$$

Conversely, the electric field produced by the elements 5605 5609 creates an induced magnetic field. The induced magnetic field, $B_{induce}$, is governed by Ampere-Maxwell's Law and is derived from the relationship:

$$B_{Induce} = \mu_o I_d / 2\pi r$$

where ($I_d$) is the so-called displacement current which flows through an imaginary cylindrical surface (S), with length (l) and radius (r), as shown in FIG. 2T. In an embodiment, the displacement current flowing from element 5605 to element 5609 in probe 5600 crosses surface (S), where $S = 2 \cdot \pi \cdot l \cdot r$.

Gauss's Law is responsible for the Electric flux density $(D) = \epsilon_o \cdot \epsilon_r \cdot E$, hence, the displacement current $I_d$ may be derived by the following relationship:

$$I_d = \frac{\partial D}{\partial t} \cdot S = \frac{\partial}{\partial t} \cdot (D) \cdot (2\pi \cdot r \cdot l)$$

Once the displacement current $I_d$ is known, in embodiments of the invention, the induced magnetic field (B) created by elements 5610,5611 can be calculated from the displacement current $I_d$.

Both the applied and induced electric and magnetic fields contribute to the Lorentz forces applied to unwanted material in a liquid passing through a dual-field probe provided by the present invention.

As mentioned previously herein, maintaining a constant, magnetic field (e.g. amplitude) and a constant electric field (i.e., amplitude) is believed to be important in the effective treatment of unwanted material in a liquid. As discussed in more detail below, the inventors have discovered that by controlling the effective impedance of the combination of a generator and a connected probe so that the impedance is constant, it is possible to maintain the amplitude of both the electric and magnetic fields at a constant value.

In more detail, referring now to FIG. 4A, there is depicted a smart probe control system 400 according to one embodiment of the invention. The system 400 may be operable to maintain the overall impedance of an electrical circuit that contains a generator, such as generator 600 or 2600, a probe (e.g., probes 160, 160b, 260, 310, 2601, 4601, and 5600) described herein and a signal transmission medium (e.g., cable). as well as minimize impedance mismatches that may damage the generator. The smart probe control system 400 may be separated from an inventive probe, or, alternatively, may be combined with a probe to form an integrated device such as those devices depicted in FIGS. 2H and 3G through 3N.

As a result of changes in conductivity and temperature, the dielectric permittivity and impedance of probes provided by the present invention may be constantly changing. Realizing this, and realizing such changes would adversely affect the ability to maintain a constant electric field amplitude and a constant magnetic field amplitude, the present inventors provide for an impedance matching circuit.

Generally, a probe provided by the present invention may form a capacitor that can be considered an equivalent electrical circuit comprised of a capacitance (C), in parallel with a resistance (R). The capacitance, resistance and dielectric permittivity (∈) of the liquid, for example water, flowing through such a probe forms a complex impedance represented by the following relationship:

$$Z^* = R + j\omega 1/c.$$

In the case where the inventive probe utilizes cylindrical elements, such as probe 260, or a part of dual-field probe 4601 or 5600 the impedance (Z) of such a probe may be calculated using the relationship set forth below, where the impedance (Z) is proportional to the product of the inverse square root of dielectric permittivity of the water flowing through the probe, and the logarithmic ratio of the outer concentric and inner concentric electrodes (D) and (d) (e.g., positive and negative conductive elements) respectively:

$$Z = 138/(\sqrt{\in}) \times \mathrm{Log}(D/d)$$

The dielectric permittivity may be expressed as a complex number:

$$\in = \in' - j\in''$$

Where ∈' is the dielectric constant and ∈" is the dielectric loss factor. The dielectric loss factor is a function of conductivity and frequency, where $\in'' = \sigma/2\pi f$, and $\omega = 2\pi f$.

The dielectric permittivity may be further expressed as a function of the dielectric constant and the conductivity σ as follows:

$$\in = \in' - j\sigma/\omega$$

When the impedance of an inventive probe is different from that of a connected electromagnetic waveform generator and transmission medium (e.g., conductive cable) a "mismatch" is said to exist. When this occurs, some of the RF energy sent from the generator to the probe may be reflected by the probe, back down the transmission line, and into the generator. If the so reflected energy is strong enough, it can prevent the generator from operating correctly, and possibly ruin the generator. Further, mismatched impedances adversely affect the ability of the inventive probes to effectively treat unwanted material in a liquid because such mismatched impedances are believed to cause the amplitude of the electric field applied to the liquid to vary as well as cause the magnetic field applied to the liquid to vary. Such variations in the amplitude of the electric and magnetic fields result in a decrease in the forces that are applied to unwanted material, as explained further herein.

In contrast, when an electromagnetic generator, transmission medium and probe are connected and each has the same impedance, the three components are said to be impedance "matched". When so matched, the amount of reflected RF energy may be minimized thus allowing a maximum amount of RF energy to be transferred from the generator to the probe. Yet further, matched components insure a constant amplitude of the electric and magnetic fields that result in optimum forces being applied to unwanted material, as explained further herein.

To eliminate the issue of mismatched impedances (i.e., to match impedances), the present inventors provide a smart probe control system, such as exemplary system 400 depicted in FIG. 4A that insures elements are impedance matched (e.g., generator, connecting cables, and probe, etc.,). System 400 or one or more of the elements of system 400 may be referred to as impedance matching circuitry. Regarding FIG. 4A and the description that follows, it should be understood that each probe or probe section may be controlled by a separate smart probe control section that includes impedance matching circuitry, as explained in more detail below. For the sake of efficiency the description that follows will be directed at a control section and impedance matching circuitry that can be applied to each type of probe or probe section.

Generally speaking, impedance matching circuitry according to embodiments of the invention may be operable to maintain an impedance of a probe, signal generator and a transmission medium connecting the probe and generator at a matched impedance, and maintain a constant amplitude of an electric field created by an electric filed dominant probe (or electric field section) and a constant amplitude of a magnetic field created by a magnetic field dominant probe (or probe section).

In more detail, the ratio of forward RF energy (power) to reflected RF energy (power) is known as VSWR. VSWR is an important parameter used to calculate the amount of RF energy that may be transferred to a probe and the amount of reflected energy that the probe does not receive. VSWR is typically the most important parameter for matching the impedance of a generator, transmission medium and probe. For example, a VSWR of 1.0:1 indicates a perfect match. As more energy is reflected, the VSWR may (undesirably) increase to 2.0:1, 3.0:1, or higher.

In one embodiment, a VSWR of 1.5:1 or less is most effective in the treatment of liquids that contain scale. Furthermore, a VSWR of 1.5:1 or less may prolong a generator's mean time between failures (MTBF) and make it more energy efficient.

The smart probe control system 400 may include a control device 422 (e.g., microcontroller, microprocessor, or controller collectively "microcontroller" for short). The microcontroller 422 may be connected to the positive and negative conductive elements of a probe, such as probes 160, 160b, 260, 310, 2601 or dual-field probes 4601 and 5600 that may have a fixed impedance of 50 Ohms, for example (not shown in FIG. 4A). To achieve and maintain a VSWR of 1.5:1 or less, the microcontroller 422 may be operable to automatically measure both the forward RF energy/power (F) and reflected RF energy/power (R) of the positive and negative conductive elements, respectively. From such measurements the microcontroller 422 may be operable to compute a VSWR based on the following relationship:

$$VSWR=(1+\sqrt{(R/F)})/(1-\sqrt{(R/F)})$$

The microcontroller 422 may be operable to store the computed VSWR values as so-called "look up tables" in onboard memory or in associated memory (not shown in FIG. 4A). Upon computing a VSWR value, the microcontroller 422 may be further operable to account for the effects of a given probe's reactance by controlling an impedance tuning section 425 to 430a to select (e.g., adding, subtracting) an appropriate capacitance to cancel out an inductive reactance, and/or select an appropriate inductance to cancel out capacitive reactance.

System 400 may also include a directional coupling section 404 that is operable to receive an RF signal from an electromagnetic waveform generator 403 and provide forward and reflected power to two RF power sensors 408, 409. RF power sensors 408, 409 may be operable to provide both forward and reverse power linear voltages to the microcontroller 422 via analog-to-digital converter inputs of the microcontroller 422 in order to allow the microcontroller 422 to compute a VSWR based on the forward and reflected voltages.

System 400 may further comprise an impedance tuning section 425 to 430a that includes banks of fixed capacitors $C_1$ to $C_n$ and inductors $L_1$ to $L_n$ (where "n" denotes the last capacitor or inductor in a bank), MOSFET shift registers 427A, 428A and relays 429, 430a. The microcontroller 422 may be operable to configure the tuning section 425 to 430a by, for example, selecting a combination of capacitors and inductors and selecting either the low impedance or the high impedance relay 429, 430a, respectively, to achieve an appropriate VSWR (e.g., low or lowest VSWR).

A signal output from the directional coupling section 404 may be sent to a power limiting section 416 that is operable to reduce the power of the signal, convert the signal to a square wave and feed the so converted signal to a divide by 256-frequency counter 414. The signal output from counter 414 may be sent to a digital input port 418 of the microcontroller 422.

As mentioned before the impedance matching circuitry may be designed to cancel the inductive and/or capacitive reactance components of a probe 160, 160b, 260, 310, 2601, 4601 and 5600 so that the only remaining portion of the probe's impedance, (Z), is the 50-ohm resistive component. For example, upon determination of the VSWR values, the microcontroller 422 may be operable to instruct the tuning section 425 to 430a to select a combination of capacitors and inductors to achieve an appropriate VSWR (e.g., low or lowest VSWR) to cancel the appropriate inductive and/or capacitive reactance of the probe 160, 160b, 260, 310, 2601, 4601 and 5600 so that only a 50-ohm resistive load is applied to the generator 403.

A "wake-up" signal generating section 412 may also be included. Section 412 may be operable to place the microcontroller 422 in a "sleep" mode when the microcontroller 422 is not required to compute a VSWR (e.g., when a previously computed VSWR stored in a look-up table is used), and to "awaken" the microcontroller 422 from a sleep mode in order to prompt the microcontroller 422 to compute a VSWR, for example.

In one embodiment of the invention, the microcontroller 422 may be operable to store specialized instructions (e.g., firmware) in a memory, where the specialized instructions may be used to configure the tuning section 425 to 430a. One such configuration may be used to, for example, minimize the number of tuning adjustments. For example, in one embodiment, the microcontroller 422 may access stored, specialized instructions to complete coarse tuning. In such a case the microcontroller 422 may be operable to send a signal to deactivate the high impedance relay 429 if necessary, and then control the operation of MOSFET shift registers 427A, 428A to select an individual inductor $L_1$ to $L_n$ to determine a matching impedance. Upon selection of a set of inductors $L_1$ to $L_n$, the microcontroller 422 may then be operable to select capacitors $C_1$ to $C_n$ that are associated with a matching impedance, and compute VSWRs. If, upon making such computations, an appropriate VSWR is not computed, the microcontroller 422 may be operable to activate the low impedance relay 430a, and then repeat the selection of inductors $L_1$ to $L_n$, capacitors $C_1$ to $C_n$ and computations.

In one embodiment, upon completion of coarse tuning, the microcontroller 422 may be further operable to complete "fine" tuning of the previously selected inductor and capacitor combinations by further selecting (or de-selecting) such inductors/capacitors, and computing VSWRs to determine whether a desired VSWR or a VSWR of 1.5:1 or lower can be obtained.

In a further embodiment of the invention, system 400 (e.g., microcontroller 422) may be operable to continuously compute VSWR values and compare such computed values to a stored reference VSWR (e.g., 1.5:1). When a comparison indicates a computed VSWR is greater than the stored reference, the microcontroller 422 may initiate or repeat further coarse and fine tuning sequences. Otherwise, the microcontroller 422 may not initiate or repeat such tuning.

In this manner the overall impedance of an electrical circuit comprising a generator, transmission medium (e.g., cable) and probe can be matched. Further, the amplitude of the electric and magnetic fields can be maintained at a substantially constant level. Because the amplitudes of the electric and magnetic fields are held constant, the applied electric and magnetic fields will be able to apply optimum Lorentz type forces to unwanted material in a liquid at a corresponding ionic cyclotron frequency of the unwanted material.

The present invention also provides the ability to service or otherwise maintain a liquid transport and treatment system. In one embodiment, the microcontroller 422 may be operable to communicate with a testing apparatus 4000 via connection or channel (collectively "channel") 4000a to allow information about the operation of the system 400 and of an electromagnetic waveform generator and probe described herein to be communicated to service or maintenance personnel. In response, testing apparatus 4000 may be operable to exchange specialized instructions with the microcontroller 422 in order to control the operation of system 400, a generator and/or probe, and/or otherwise obtain the status of system 400, generator or probe via channel 4000a. The microcontroller 422 may do so via a communications port 423 of the microcontroller 422 to name just one of many ways in which system 400 may communicate with testing apparatus 4000 via channel 4000a. When testing apparatus 4000 comprises a portable or handheld test set, the communications port 423 may comprise a serial port operable to allow for connection of the handheld or otherwise portable test to microcontroller 422 via channel 4000a by service or maintenance personnel. Alternatively, when testing apparatus 4000 comprises a remote station, the communications port 423 may comprise a modem or other necessary electronics necessary to transmit and receive information to/from such a remote station via channel 4000a. Such a remote station may include an interface (e.g., graphical user interface, "GUI") to permit information exchanged between the system 400, generator and probe to be viewed or otherwise accessed by service or maintenance personnel.

Figure 4B:
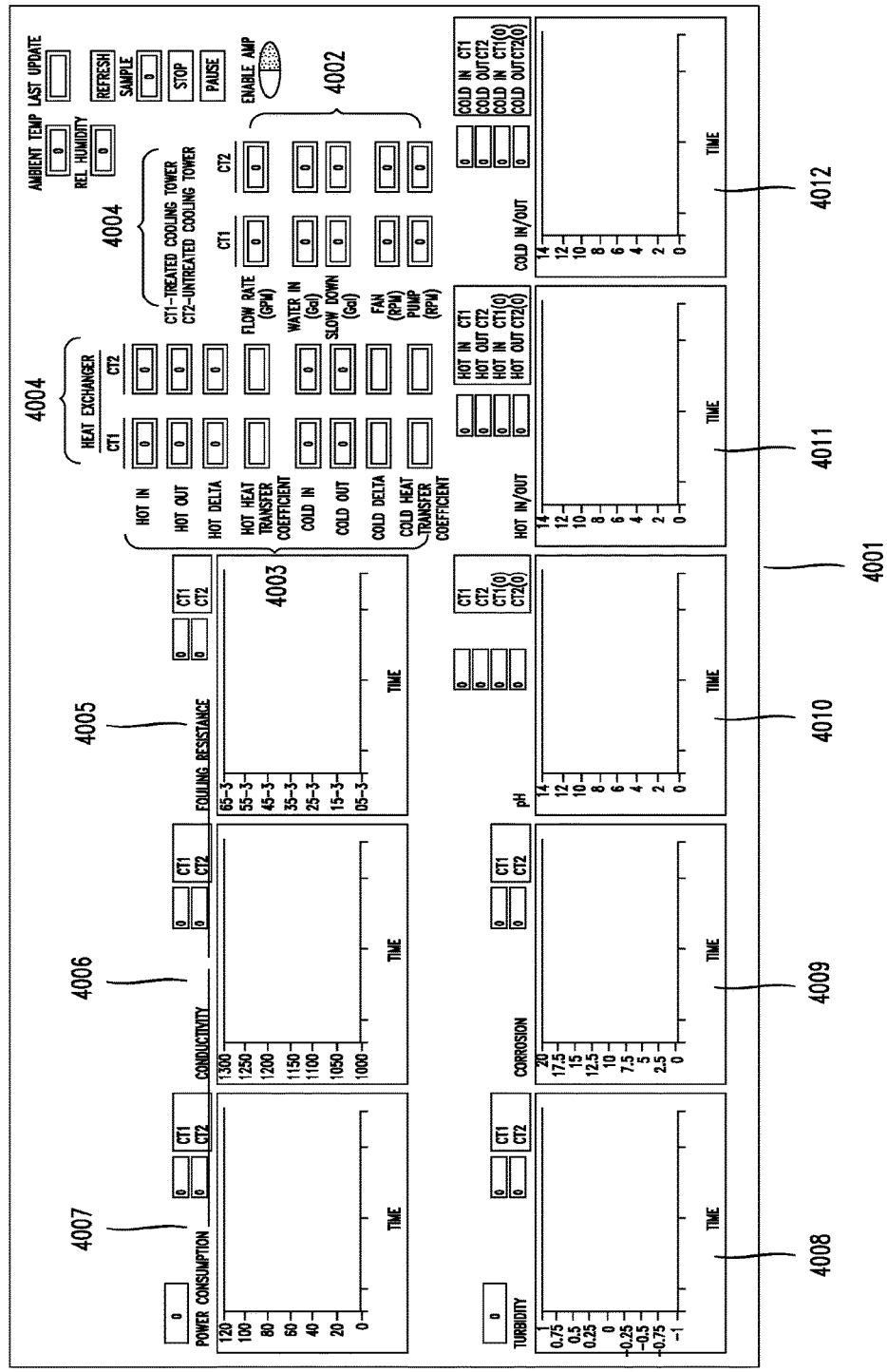
FIGS. 4B and 4C depict exemplary displays that may be generated and displayed in accordance with embodiments of the invention.
Figure 4C:
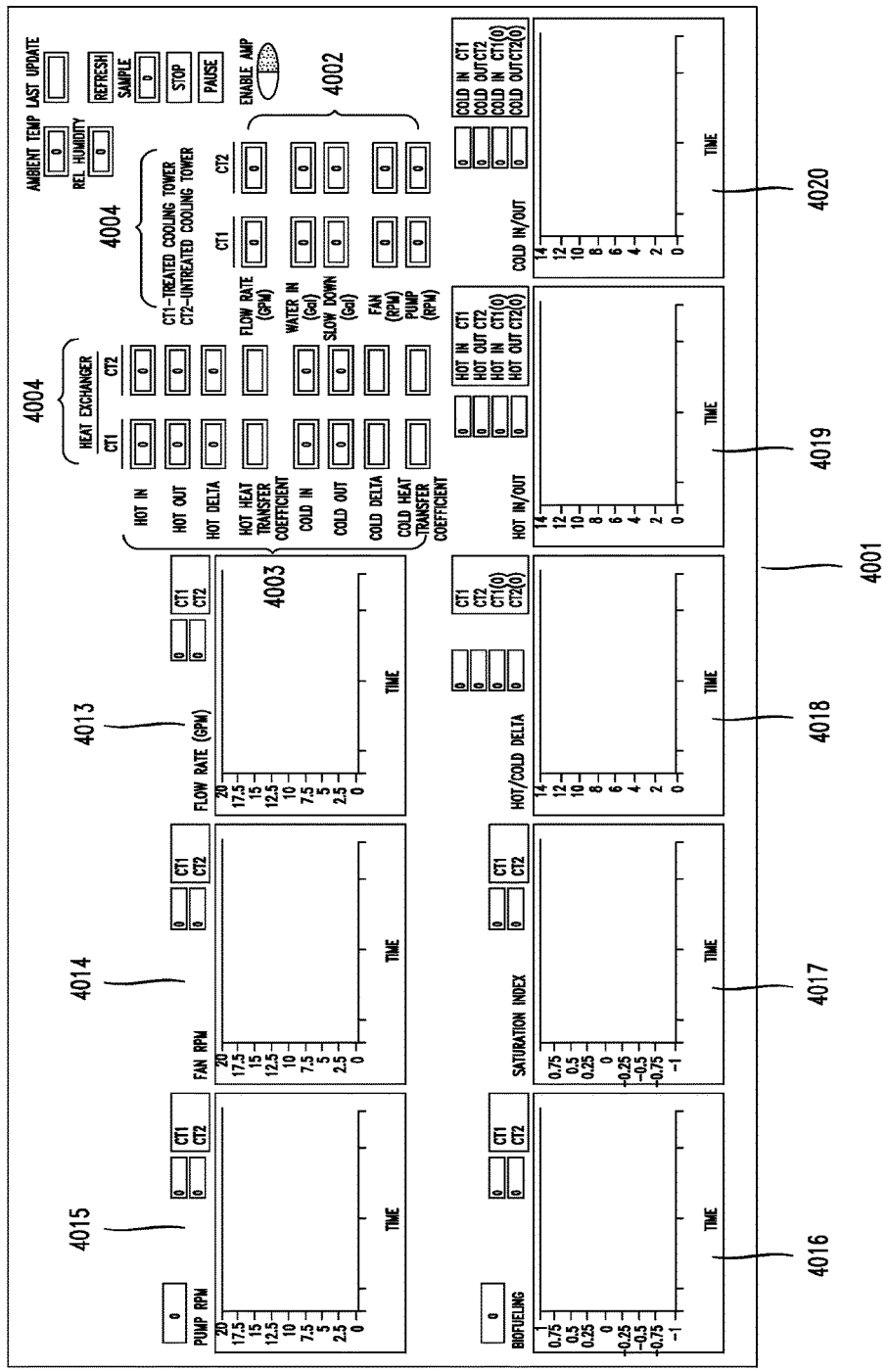

Referring now to FIGS. 4B and 4C, there is depicted exemplary displays of data that may be generated by apparatus 4000. In embodiments of the invention apparatus 4000 may comprise a controller or computer (collectively "controller") operable to generate displays to be displayed by a GUI 4001. Referring first to FIG. 4B, there is depicted exemplary displays that may be generated by the GUI 4001 or one or more similar components capable of displaying data that are a part of apparatus 4000. It should be understood that apparatus 4000 may receive and send (i.e., communicate with) signals and data from, and to, other components of a liquid transport and treatment system (e.g., system 400) other than the microcontroller 422 via channel 4000b. For example, signals and data may be received and/or sent from, and to, a probe, generator, valve, controllers, thermocouples, sensors and meters (e.g., see the description herein that refers to FIGS. 3A through 3F) appropriately configured to communicate with the apparatus 4000 to name just a few components that may send and and/or receive signals from/to apparatus 4000 via channel 4000b. In such embodiments apparatus 4000 and GUI 4001 may be located at, or near, a transport and treatment system that is equipped with an inventive device described herein, or their equivalents, or a system that is equipped with other devices for treating unwanted material in a liquid. Alternatively, apparatus 4000 and GUI 4001 may be located remote from such a system. In such a case, the apparatus is operable to communicate remotely with the transport system and inventive devices described herein such as immersible devices and integrated generators and the components associated with such devices via channels 4000a, 4000b.

As illustrated by the data depicted in FIGS. 4B and 4C, apparatus 4000 may be capable of receiving signals from components of a water transport and treatment system in order to collect data and monitor a plurality of parameters associated with characteristics of water and/or associated with the operation of components of such a system. In FIG. 4B the collected data may be associated with parameters 4002 from cold loops of one or more cooling towers 4004 and data that is associated with parameters 4003 from hot loops from the same cooling towers 4004. In the example depicted in FIGS. 4B and 4C the cooling towers 4004 are a treated cooling tower designated "CT 1" (i.e., a cooling tower that uses an inventive probe) and an untreated cooling tower designated "CT 2" (a cooling tower that does not use an inventive probe) though this is merely exemplary. Said another way, apparatus 4000 and GUI 4001 may be used with (i.e., connected to) any number of different water treatment systems other than the ones illustrated in FIGS. 4B and 4C.

Continuing, the GUI 4001 may be operable to display data and parameters associated with characteristics of a liquid in a transport system or operation of components of the transport system. For example, in an embodiment the apparatus 4000 may be operable to compute, and the GUI may be operable to display, a fouling resistance and the data and parameters related to such resistance on a chart or graph 4005 that is a part of GUI 4001 as shown in FIG. 4B. The fouling resistance (and its related data and parameters) may be visually displayed in a chart or graph 4005 to name just a few of the many ways such data and parameters may be displayed by GUI 4001 (e.g., tabular or text may be alternative methods). The displayed fouling resistance may be computed, for example, from parameters 4002 and 4003. The data associated with parameters 4002 and 4003 may be detected or otherwise collected by components described elsewhere herein, such as the thermocouples 302a through 302D, valves 303A through 303C, sensors 309A and 309B, meters 316, 318, controllers 307 and 323 and described with reference to FIGS. 3A through 3F to name just a few of the many types of components that may be used to collect the data associated with parameters desired to be computed.

In addition to fouling resistance, apparatus 4000 may be operable to compute, and GUI 4001 may be operable to display, a combination of data parameters as charts or graphs representative of a number of additional measurements, such as conductivity 4006, power consumption 4007, turbidity 4008, corrosion 4009, pH 4010 and temperature 4011,4012 (Hot In/Out, Cold In/Out) of a liquid transport and treatment system to name just a few of the many computations that may be computed by apparatus 4000 and displayed by GUI 4001.

Referring now to FIG. 4C there is depicted additional data and parameters that may be computed by apparatus 4000 and then displayed by GUI 4001 on charts or graphs, for example. As can be seen in FIG. 4C, the parameters may be based on data that is collected from components of a transport system, such as pumps and fans, in addition to data related to a characteristic of water. For example, the exemplary GUI 4001 in FIG. 4C may be operable to display a chart or graph of data and parameters related to pump(s) speed (RPMs) 4015 and, fan speed(s) (RPMs) 4014. In addition, the apparatus 4000 and GUI 4001 may be operable to compute and then display on charts or graphs, for example, a combination of additional data and parameters such as flow rates 4013, biofouling 4016, saturation index 4017, and hold/cold temperature differentials (deltas) 4018 shown in FIG. 4C.

Because apparatus 4000 and GUI 4001 are capable of computing and displaying a wide array of parameters related to a transport system it can also be used to improve the overall efficiency of components of such a system.

In additional embodiments of the invention, the data received, and computations generated, by apparatus 4000 may be stored in an associated memory (not shown in FIGS. 4A through 4C) and used as real-time or historical information by apparatus 4000 to further: (a) compute and generate maintenance schedules for components of a transport system, (b) compute and estimate times when failures may occur in the future in such components, and to (c) identify and isolate failures of components in such systems in real-time to name just a few of the many ways in which such collected data and computations may be used. Upon making such computations, a user of apparatus 4000 may be able to more efficiently schedule preventive and/or regularly scheduled maintenance visits by maintenance or service personnel to such a system. That is, instead of scheduling too many or too few maintenance or service visits that result in unnecessary costs or worse, component failures, systems and devices provided by the present invention allow a user to schedule visits in a smarter, more effective manner that may reduce the cost of operating a transport system and reduce the number of unexpected failures of components making up such a system.

In addition to receiving data related to the characteristics of a liquid and/or the operation of components of a water transport system the present inventors provide for means and ways to control such characteristics and components. In embodiments of the invention, upon receiving data, computing parameters and displaying such data and parameters, such as those depicted in FIGS. 4B and 4C, apparatus 4000 may be operable to transmit or otherwise send signals to components of a water transport system via channels 4000a, 4000b in order to control the operation of such components, which, in turn, may control the characteristics of a liquid. In one embodiment, apparatus 4000 may include a central controller that is operable to generate electrical signals based on the data collected and parameters computed and then send such signals to components within the system or to other controllers, such as motor controllers or temperature controllers via channels 4000a, 4000b in order to control the operation of such components and control the characteristics of a liquid in the system. For example, in one embodiment a central controller that is a part of apparatus 4000 may be operable to execute stored instructions in its memory to generate signals associated with data it has received concerning the speed of a pump or fan. Such signals may be sent to a pump or fan directly, or to a motor controller connected to the pump or fan. In either case, such signals, once received by the motor controller, pump or fan may cause a motor that is a part of such a pump or fan to either increase or decrease its speed (RPMs). By changing the speed of a pump or fan the characteristics of a liquid, such as water, may also be affected. For example, the flow rate of water in a system may be effected, which in, turn, may affect other characteristics.

In a similar fashion, the central controller may be operable to send signals to other components of the system via channels 4000a, 4000b in order to effect changes to other characteristics of water and/or to affect the efficiency and overall operation of the system.

Figure 5:
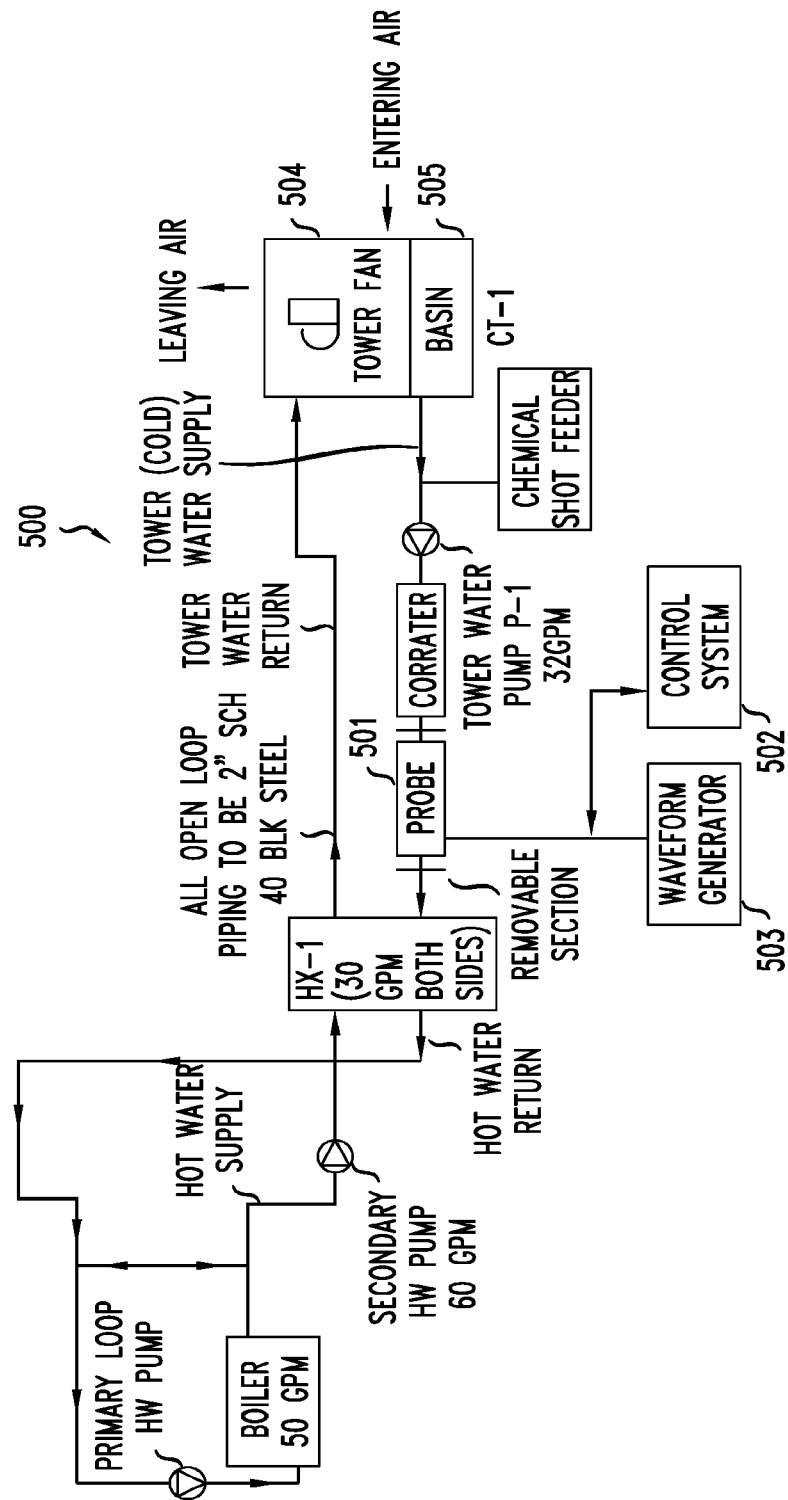
FIG. 5 depicts a block diagram of a cooling tower system in accordance with one embodiment.

FIG. 5 depicts a block diagram of a cooling tower system 500 used, for example, in a data center, industrial and commercial building or complex, and large residential building or complex.

Cooling towers use large amounts of water and other liquids for evaporative cooling. The evaporation process causes some portion of the liquids (e.g., water) to be evaporated, and other portions to remain in a basin 505 of a cooling tower 504. The portions that remain (i.e., are not evaporated) become highly concentrated with solids, such as calcium carbonate (scale), corrosive materials and other unwanted material. To reduce these unwanted materials, the unwanted materials must be periodically removed from the cooling tower 504 by a method referred to as "blow-down". Once some or all of the cooling tower liquid is drained, the original liquid level must be replenished; this includes the liquid lost through evaporation, blow-down, drift, and system leaks. As a result, the total dissolved solids, pH, temperature, and conductivity may be constantly changing, creating a dynamic liquid environment within the cooling tower 504.

In accordance with an embodiment of the invention, system 500 may include an exemplary, integrated inventive probe 501 (e.g., probes 160, 160b, 260, 310, 2601, 4601, 5600), smart probe control system 502 (with impedance matching circuitry) and an integrated exemplary electromagnetic generator 503 in accordance with one embodiment of the invention in order to treat a liquid in cooling tower 504 that contains unwanted material. Though not shown the system 500 may also be connected to a testing apparatus, such as testing apparatus 4000 depicted in FIG. 4A, and may include thermocouples, valves, sensors, meters and controllers (such as those shown in FIGS. 3A through 3F), for example, to allow information about the operation of the system 500 and of its integrated electromagnetic waveform generator, probe and smart probe control system to be communicated to service or maintenance personnel.

In the embodiments described above reference has been made to many different types of devices that are used to detect and collect current data related to the treatment of unwanted material in a liquid in a transport system, such as generators, valves, controllers, thermocouples, sensors and meters, for example (see FIGS. 2A, 3A through 3F and 4A through 4C). In additional embodiments, such collected data may be used by a system to measure an amount of a resource, or resources. Some non-limiting examples of a resource are energy, power, amount of chemicals (e.g., de-scaling chemicals) and device lifetime (e.g., operational lifetime, mean-time-before failure times). These resources may be measured by one of the controllers or computer systems described previously herein, or by a separate controller, computer system or measurement system (collectively "measurement system"). In either case, such a measurement system may be operable to receive data representative of one or more resources that are, or may be, affected by the treatment of unwanted material in a liquid using an inventive system or device described herein, such as an immersible, dual-field probe. For the sake of efficiency the features of such a probe will not be repeated, it being understood that the features previously described may be incorporated into such a probe.

The measurement system is typically operated by a user, or an agent of the user (e.g., service or maintenance company, consultant).

Upon receiving such current data the measurement system may be operable to compare the received, current data to stored, reference data and/or to a threshold level. The stored data may comprise historical data related to the resources associated with the transport system, for example. Yet further, the measurement system may operable to compute: (1) an indication of the difference between an amount of resources currently being used by the transport system based on the current data and the amount of resources previously used by the transport system (or a reference system) based on the historical data; (2); an indication of the difference between device lifetimes of components that are a part of the transport system based on the current data and previous lifetimes of components used in the transport system (or a reference system) based on the historical data; and (3) an indication of the difference between an amount of resources currently being used by the system based on the current data and a threshold amount of resources (e.g., a target or budgeted amount of resources).

Once a computed difference is completed a user may be able to determine a savings in resources, return on investment and/or extended component lifetimes, for example. Such computed differences may also be stored in a database or another memory for future use by the measurement system or other systems.

In addition to users and their agents, it may be desirable to grant additional entities access to the collected data or computed differences. For example, the construction and/or installation of a new transport system that incorporates an inventive device or system described herein, or the retrofit/modification of an existing transport system to include an inventive device or system described herein can be extremely expensive. Accordingly, an investment entity or individual may assist a user in financing the construction or installation of a new transport system that incorporates an inventive device or system described herein, or the retrofit/modification of an existing transport system to include an inventive device or system described herein.

One method of financing such a construction, installation, retrofit or modification includes a re-payment process that is based on the collected data or computed differences. More particularly, in additional embodiments a repayment system may be operable to receive collected data or computed differences representative of one or more resources that are, or may be, affected by the treatment of unwanted material in a liquid using an inventive system or device described herein, such as an immersible, dual-field probe. Again, for the sake of efficiency the features of such a probe will not be repeated, it being understood that the features previously described may be incorporated into such a dual-field probe.

The repayment system may include a controller or computer system that is operable to receive data and computed differences related to the operation of the transport system. The repayment system may be operated by the entity that financed the construction, installation, retrofit or modification of the water transport system or an agent of such an entity.

Upon receiving collected data or computed differences the repayment system may be further operable to compute a repayment amount. In one embodiment, the repayment amount may be computed by applying a percentage factor to an amount of a computed difference. In embodiments of the invention, the percentage factor may be the same for all resources, or may differ based on the resource that is associated with a computed difference. Alternatively, the repayment amount may be computed by applying a monetary amount to each unit or part thereof of a computed difference and then applying a percentage factor (e.g., 0 to 100%). Still further, the repayment factor may be computed by using a different method that applies a multiplication factor, and/or a percentage factor in another combination of steps.

Once a repayment amount is computed the entity that has financed the construction, installation, retrofit or modification may be able to distribute the repayment amounts to one or more investment entities or apply the amounts to one or more financial instruments. Such computed repayment amounts may also be stored in a database or another memory for future use by the repayment system or other systems.

In embodiments of the invention, one or both of the computed differences and repayment amounts may be proportional to the amount of unwanted material in a liquid that is treated by an inventive probe described herein, such as a dual-field probe, for example.

Figure 6:
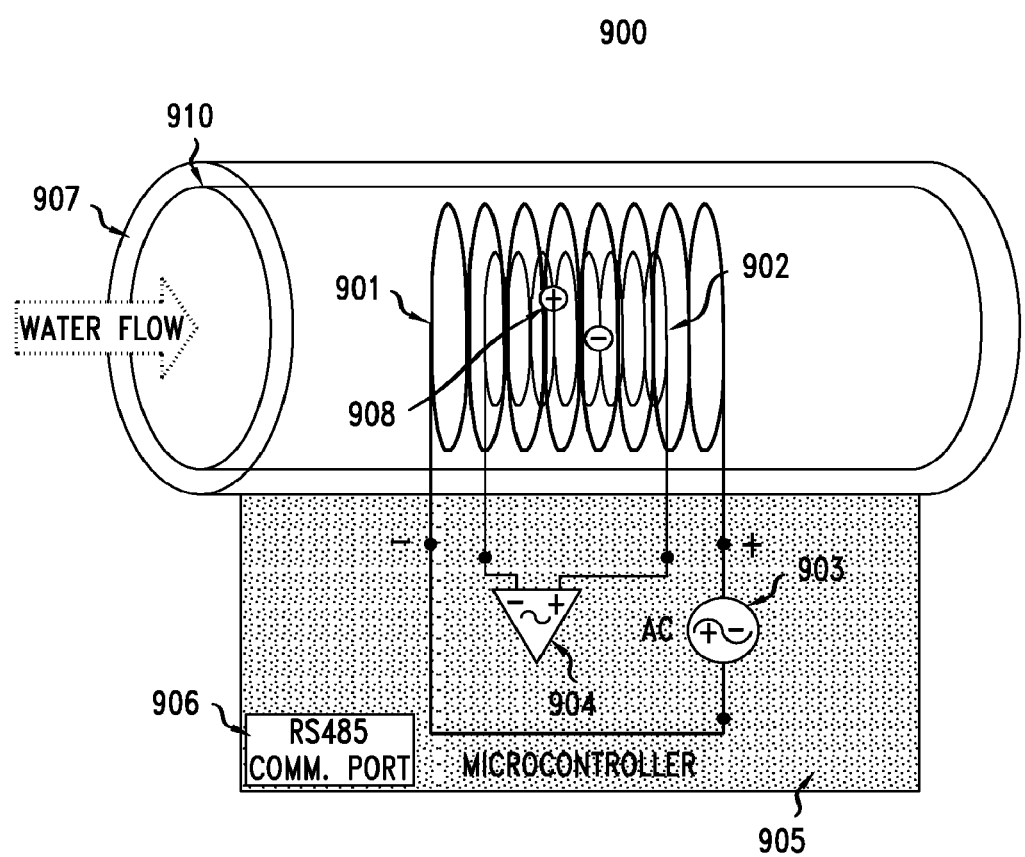
FIG. 6 depicts another probe that may be used to detect and determine unwanted material according to an embodiment of the invention.

Referring now to FIG. 6 there is depicted a susceptibility probe 900 is operable to detect and determine the type of trace elements or minerals in a liquid, such as water that form unwanted material (such as scale) in order to determine the appropriated ionic cyclic frequency. Because scale forming trace elements (ions) have different charges and masses, selecting the appropriate ionic cyclotron frequency value for a particular trace element or mineral.

Minerals may be categorized as magnetic if they cause magnetic induction in the presence of a magnetic field. In embodiments of the invention, probe 900 makes use of this phenomena to detect and determine the types of trace elements and minerals in a liquid. Mineral magnetism (M) is related to the applied field strength (H) by the equation $M=\chi H$; where $\chi$ is the magnetic susceptibility of the material. It is a dimensionless quantity which expresses the efficiency with which trace elements may be magnetized.

All mineral substances exhibit magnetic susceptibility at temperatures above absolute zero. Accordingly, probe 900 is operable to detect different types of scales based on magnetic susceptibility. The principal types of interaction of a substance with a magnetic field are classified into five major divisions: diamagnetism, para-magnetism, ferro-magnetism, ferri-magnetism and anti-ferromagnetism. The probe 900 uses the aforementioned magnetic phenomenon to determine the types of scale formation deposits, which comes in several forms.

For example, inorganic scale deposits are mostly from aqueous supersaturated type solutions, with cooling tower make-up water being one such type. In the petroleum industry, scale can be mineral, chemical, or organic type (as in the case of crude oil compounds) formed as a result of fluid-fluid (and fluid-substrate) interactions leading generally to their super-saturation. The two most common types of Ca scale found in hydrocarbon fields are calcium carbonate (CaCO3) and calcium sulphate (CaSO4).

Most inorganic scales can be classified by the anion type in one of the following seven classes:

The carbonate scales—formed by cations and bicarbonate (HCO3-) ion precipitation in fluids, and include CaCO3 and FeCO3.

The sulphate scales—formed as a result of precipitation of cations and sulphate ions (SO42-), which includes BaSO4, SrSO4, and CaSO4.

The sulphide scales—formed by cations and sulphide (S2-) ion precipitation, for example FeS, FeS2, PbS, and ZnS.

The chloride scales—formed mainly by brine evaporation and sodium (Na) and chloride (Cl) ion precipitation, yielding NaCl.

The fluoride scales—caused by reaction of cations and fluoride (F—) ions, including CaF2 and FeF2.

The aluminum-silicon group of scales—formed by reaction of cation-silicon or aluminum-silicon elements.

Native scales—formed exclusively by native cations or cation covalent bonds, including Pb, SiO2.

Magnetic susceptibility is the ratio of the intensity of magnetization to the applied magnetic field strength. The magnetic susceptibility mathematically equals:

$$\chi = \frac{M}{H}$$

where (M) is the magnetization of the material (magnetic dipole moment per unit volume), and (H) is the magnetic field strength measured in amperes per meter. The volume susceptibility is given as:

$$\chi_v = \frac{M}{H}$$

where $X_v$ is the volume susceptibility and M is the magnetization per unit volume. The molar susceptibility is the third type of susceptibility and is defined as:

where $\rho$ is density.

$$\chi_{mol} = \frac{M \chi_v}{\rho}$$

Magnetic susceptibility is dimensionless while M and H are in amperes per meter (A/m). A linear relationship exists between magnetization and magnetic field strength, as a result, a linear relationship also exists between magnetic induction (B) and field strength (H) as shown below:

$$B=\mu H$$

where $\mu$ is the magnetic permeability. The magnetic permeability ($\mu$) can be expressed mathematically as:

$$\mu/\mu_o=1+\chi$$

Where $\mu_o$ is magnetic permeability of air. Magnetic induction (B) is measured in Tesla (T) and its dimension in SI units is Newton per ampere-meter (N/Am). There are two other expressions used to demonstrate the relationship between B, J and H as follows:

$$B=\mu_o(J+H)$$

$$B=\mu_o(1+\chi)H$$

Generally, materials are paramagnetic, diamagnetic or ferromagnetic (ferro- and ferrimagnetic). Materials with positive susceptibility ($\chi$) where $(1+\chi)>1$ are called paramagnetic materials. This means the applied magnetic field is strengthened by the presence of the material. Molecularly speaking, it is the nature of the electrons in the material that determines the magnetic properties of the material. Since free electrons add to magnetic forces, a material becomes paramagnetic when the number of free unpaired electrons is high. In instances where susceptibility ($\chi$) is negative, that is where $(1+\chi)<1$, the material is said to be diamagnetic. When such is the case, the magnetic field is weakened by the presence of the diamagnetic material. Molecularly, the material lacks free unpaired electrons.

The measurement of magnetic susceptibility is achieved by quantifying the change of force felt upon the application of a magnetic field to a substance, in this case, trace elements. For trace elements in aqueous samples, the magnetic susceptibility is measured from the dependence of the natural magnetic resonance (NMR) frequency of the trace element on its shape and or orientation.

Accordingly, probe 900 may be operable to apply a uniform alternating field produced by a transmitting coil 901 carrying an alternating current. A pickup coil consisting of an inner winding, 902 is placed at the center of the transmitting coil. Known trace elements specimens are placed at the center of the pickup coil for calibration purposes using distilled as the aqueous medium. The trace elements cause an induced voltage output because of its closer coupling with the pick-up coil. By using a low-noise, high-gain amplifier 904, the pickup coil induced voltage is amplified and digitized by the micro-controller. The magnetic susceptibility values for each trace element are stored in the microcontroller's memory look-up table.

The probe 900 may be installed in a cooling tower makeup water path or an oil field well. The transmitting coil of probe 900 may be energized, and the pickup coil's induced voltages may be detected and then compared to stored look-up table trace element values by a microcontroller. By constantly measuring the pick-up coil induce voltage and comparing it with known trace elements look-up table induced voltages the probe 900 may be operable to determine the type of trace elements or minerals in a liquid, such as in a cooling tower's make-up water or oil field well. Once trace elements or minerals are determined by a combination of probe 900 and the microcontroller, this information may be used by the microcontroller in order to adjust the operating frequency and modulation frequency of a generator in order to optimize the treatment of the trace element or mineral (i.e., unwanted material) in a liquid (e.g., insure the modulation frequency corresponds to the ionic cyclotron frequency of the determined trace element of mineral). The microcontroller and generator (as well as other microcontrollers and generators described herein) may be connected via a communication bus.

It should be apparent that the foregoing describes only selected embodiments of the invention. Numerous changes and modifications may be made to the embodiments disclosed herein without departing from the general spirit and scope of the invention. For example, though water has been the liquid utilized in the description herein, other suitable liquids may be used such as those used in the heating and/or cooling systems of buildings or those transported in the petrochemical industry. That is, the inventive devices, systems and methods described herein may be used to partially or substantially treat these other liquids as well. Further, though the inventive devices and systems described herein are described as being used in non-living systems (e.g., an industrial water transport system) the scope of the present invention is not so limited. In additional embodiments the devices and systems described herein may be modified for use in treating unwanted material in the human bloodstream, for example. In more detail, inventive probes may be miniaturized for insertion into the human bloodstream, related organs, or circulatory system (collectively "circulatory system") or digestive system, using a cather, scope, surgical tool or other types of insertion devices. Structurally, the inventive probes may be formed as a stent or as a part of a stent to name just one example of an exemplary structure. Operationally, the inventive probes and associated generators may be modified to operate at frequencies that are not unduly harmful to the human body, yet include modulation frequencies that correspond to the ionic cyclotron frequencies of targeted, unwanted material in the circulatory or digestive system such as salts, fats, sugars, or cancer causing cells, for example.

What is claimed is:

1. A method for treating unwanted material in a liquid comprising:
    passing a liquid through an immersible electric field section and an immersible magnetic field section of a dual-field probe, the magnetic field section comprising immersible coils configured as Helmholtz coils;
    generating, by the electric field section, a time-varying electric field and an induced magnetic field;
    generating, by the magnetic field section, a time-varying magnetic field and an induced electric field; and
    wherein the passing of the liquid further comprises applying the generated time-varying electric field and an induced magnetic field and the generated time-varying magnetic field and an induced electric field to treat unwanted material in the liquid.

2. The method as in claim 1 further comprising applying, by the magnetic field section, the generated, time-varying magnetic field and an induced electric field to the unwanted material in the liquid substantially at the same time as the application of the time-varying electric field and an induced magnetic field.

3. The method as in claim 1 further comprising applying, by the magnetic field section, the generated, time-varying magnetic field and an induced electric field to the unwanted material in the liquid after the application of the time-varying electric field and an induced magnetic field.

4. The method as in claim 1 wherein the coils configured as Helmholtz coils comprise at least two immersible, radial coils.

5. The method as in claim 1 wherein the immersible electric field section comprises at least two immersible elements, wherein one of the elements is a positively charged element and the other element is a negatively charged element.

6. The method as in claim 5 wherein the at least two immersible elements of the electric field section are cylindrically shaped.

7. The method as in claim 1 further comprising generating, by the immersible magnetic field section, a time-varying magnetic field modulated at an ionic cyclotron frequency of the unwanted material in a liquid, and generating, by the immersible electric field section, a time-varying electric field modulated at the ionic cyclotron frequency.

8. The method as in claim 7 further comprising applying, by the immersible magnetic field section, the generated, time-varying magnetic field modulated at the ionic cyclotron frequency to the unwanted material in the liquid.

9. The method as in claim 1 wherein the unwanted material is one or more ions of calcium carbonate.

10. The method as in claim 1 further comprising:
maintaining, by impedance matching circuitry, an impedance of the dual-field probe, a signal generator and a transmission medium connecting the probe and generator at a matched impedance, and maintaining, a constant amplitude of the electric field generated by the electric field section and a constant amplitude of the magnetic field generated by the magnetic field section.

11. A method for treating unwanted material in a liquid comprising:
passing a liquid through an immersible electric field section and an immersible magnetic field section of a dual-field probe, the magnetic field section comprising immersible cons configured as Helmholtz coils;
generating, by the electric field section, a time-varying electric field modulated at the ionic cyclotron frequency of unwanted material in the liquid and an induced magnetic field;
generating, by the magnetic field section, a time-varying magnetic field modulated at the ionic cyclotron frequency and an induced electric field;
wherein the passing of the liquid further comprises applying the generated time-varying electric field and an induced magnetic field and the generated time-varying magnetic field and an induced electric field to treat the unwanted material in the liquid; and
outputting, from a signal generator, a time-varying signal modulated at the ionic cyclotron frequency to the immersible magnetic field section and the immersible electric field section.

12. The method as in claim 11 further comprising applying, by the magnetic field section, the generated, time-varying magnetic field and an induced electric field to the unwanted material in the liquid substantially at the same time as the application of the time-varying electric field and an induced magnetic field.

13. The method as in claim 11 further comprising applying, by the magnetic field section, the generated, time-varying magnetic field and an induced electric field to the unwanted material in the liquid after the application of the time-varying electric field and an induced magnetic field.

14. The method as in claim 11 wherein the unwanted material is one or more ions of calcium carbonate.

15. The method as in claim 11 further comprising outputting, by the signal generator, an oscillating or uniform time-varying signal modulated at the ionic cyclotron frequency to the immersible magnetic field section.

16. The method as in claim 15 wherein the signal generator is an integrated signal generator and the method further comprises generating or adjusting, by the signal generator, a carrier frequency, percentage of modulation, modulation frequency, modulation waveform, output gain or offset levels of the time-varying signal.

17. The method as in claim 11 further comprising determining, by a controller, a carrier frequency of the time-varying signal and a modulation signal corresponding to the ionic cyclotron frequency, and controlling the signal generator to output the time-varying signal at the determined carrier frequency and including the determined modulation signal.

18. The method as in claim 17 further comprising determining, by the controller, a percentage of modulation, a modulation frequency of the modulation signal, modulation waveform of the modulation signal, output gain or offset levels of the time-varying signal, and controlling the signal generator to output the time-varying signal and the modulation signal using the determined percentage of modulation, modulation frequency, modulation waveform, output gain and offset levels.

19. The method as in claim 11 further comprising displaying, by a graphical user interface (GUI), a combination of one or more of a fouling resistance, conductivity, power consumption, turbidity, corrosion, pH, temperatures of the liquid, pump speeds, fan speeds, flow rates, biofouling, saturation index, and hot/cold temperature differentials of components of the system used to treat the liquid.

20. The method as in claim 11 further comprising:
maintaining, by impedance matching circuitry, an impedance of the dual-field probe, the generator and a transmission medium connecting the probe and generator at a matched impedance, and maintaining a constant amplitude of the electric field and a constant amplitude of the magnetic field.

* * * * *